US012766585B2

(12) United States Patent
Wekwert et al.

(10) Patent No.: US 12,766,585 B2
(45) Date of Patent: *Oct. 20, 2026

(54) PEX EXPANSION TOOL

(71) Applicant: MILWAUKEE ELECTRIC TOOL CORPORATION, Brookfield, WI (US)

(72) Inventors: James Wekwert, Whitefish Bay, WI (US); Jacob Lindsey, Milwaukee, WI (US); Peter J. Davies, Milwaukee, WI (US); Justin Miller, Richfield, WI (US); Andrew J. Smith, Waukesha, WI (US); Troy C. Thorson, Cedarburg, WI (US); Ryan J. Denissen, Sussex, WI (US); John S. Scott, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 484 days.

This patent is subject to a terminal disclaimer.

(21) Appl. No.: 18/138,465

(22) Filed: Apr. 24, 2023

(65) Prior Publication Data

US 2023/0256498 A1 Aug. 17, 2023

Related U.S. Application Data

(63) Continuation of application No. 16/795,742, filed on Feb. 20, 2020, now Pat. No. 11,633,775.

(Continued)

(51) Int. Cl.

*B21D 41/02* (2006.01)
*B29C 57/04* (2006.01)

(Continued)

(52) U.S. Cl.

CPC .......... *B21D 41/028* (2013.01); *B29C 57/045* (2013.01); *B29C 57/06* (2013.01); *B29K 2023/0691* (2013.01); *B29L 2023/22* (2013.01)

(58) Field of Classification Search

CPC ................................ B21D 41/00; B29C 57/00
See application file for complete search history.

(56) References Cited

U.S. PATENT DOCUMENTS

| | | | |
|---|---|---|---|
| 1,404,819 | A | 1/1922 | Wiedeke |
| 1,752,408 | A | 4/1930 | Zein |

(Continued)

FOREIGN PATENT DOCUMENTS

| | | | |
|---|---|---|---|
| CN | 201346602 | Y | 11/2009 |
| CN | 204018564 | U | 12/2014 |

(Continued)

OTHER PUBLICATIONS

European Patent Office Partial Search Report for Application No. 20158590.8 dated Jun. 25, 2020 (16 pages).

(Continued)

*Primary Examiner* — Atul P. Khare
(74) *Attorney, Agent, or Firm* — Michael Best & Friedrich LLP

(57) ABSTRACT

An expansion tool includes a housing, a motor supported by the housing and including a motor, a mandrel, and a drive mechanism configured to convert a rotational input from a motor shaft into translational movement of the mandrel. The expansion tool includes a first operating mode and a second operating mode. When the expansion tool is operated in the first operating mode, the drive mechanism is configured to reciprocate the mandrel between a retracted position and a first extended position. When the expansion tool is operated in the second operating mode, the drive mechanism is configured to reciprocate the mandrel between the retracted position and a second extended position different than the first extended position.

21 Claims, 32 Drawing Sheets

Related U.S. Application Data

(60) Provisional application No. 62/908,988, filed on Oct. 1, 2019, provisional application No. 62/879,707, filed on Jul. 29, 2019, provisional application No. 62/832,922, filed on Apr. 12, 2019, provisional application No. 62/807,876, filed on Feb. 20, 2019.

(51) Int. Cl.
*B29C 57/06* (2006.01)
*B29K 23/00* (2006.01)
*B29L 23/00* (2006.01)

(56) References Cited

U.S. PATENT DOCUMENTS

| | | | |
|---|---|---|---|
| 2,085,447 | A | 6/1937 | Plaine |
| 2,725,918 | A | 12/1955 | Deshler |
| 2,737,996 | A | 3/1956 | Toth |
| 2,835,307 | A | 5/1958 | Jorgensen |
| 2,999,529 | A | 9/1961 | Rast |
| 3,550,424 | A | 12/1970 | Rast |
| 3,677,684 | A | 7/1972 | Platz |
| 3,753,635 | A | 8/1973 | Barnett |
| 3,857,666 | A | 12/1974 | Barnett |
| 3,861,847 | A | 1/1975 | Barnett |
| 3,888,102 | A | 6/1975 | Nigido |
| 3,940,227 | A | 2/1976 | Strasser |
| 3,947,950 | A | 4/1976 | Adams |
| 4,034,591 | A | 7/1977 | Rothenberger |
| 4,107,249 | A | 8/1978 | Murai et al. |
| 4,144,735 | A | 3/1979 | Rothenberger |
| 4,154,083 | A | 5/1979 | Rothenberger |
| 4,397,173 | A | 8/1983 | Eftefield et al. |
| 4,425,783 | A | 1/1984 | Rast |
| 4,603,890 | A | 8/1986 | Huppee |
| 4,733,551 | A | 3/1988 | Bryant et al. |
| 4,735,078 | A | 4/1988 | Wesebaum |
| 4,888,975 | A | 12/1989 | Soward et al. |
| 4,890,472 | A | 1/1990 | Rothenberger |
| 5,046,349 | A | 9/1991 | Velte |
| 5,090,226 | A | 2/1992 | Takeoka et al. |
| 5,090,230 | A | 2/1992 | Koskinen |
| 5,135,268 | A | 8/1992 | McNaughton et al. |
| 5,243,845 | A | 9/1993 | Velte |
| 5,261,709 | A | 11/1993 | McNaughton et al. |
| 5,704,244 | A | 1/1998 | Halasz et al. |
| 5,727,414 | A | 3/1998 | Halasz et al. |
| 5,744,085 | A | 4/1998 | Soberg |
| 5,879,033 | A | 3/1999 | Hansel et al. |
| 5,943,891 | A | 8/1999 | Takagi et al. |
| 6,199,915 | B1 | 3/2001 | Becker |
| 6,783,160 | B2 | 8/2004 | Rowley |
| 6,862,766 | B2 | 3/2005 | Geurts |
| 7,014,214 | B2 | 3/2006 | Kaneko |
| 7,065,995 | B2 | 6/2006 | Frenken |
| 7,128,560 | B2 | 10/2006 | Tandart |
| 7,325,436 | B2 | 2/2008 | Cheng |
| 7,490,499 | B2 | 2/2009 | Suzuki et al. |
| 7,516,990 | B2 | 4/2009 | Jamison et al. |
| 7,681,636 | B2 | 3/2010 | Roggeband et al. |
| 7,735,877 | B2 | 6/2010 | Ito et al. |
| 7,806,213 | B2 | 10/2010 | Inoue et al. |
| 7,922,475 | B2 | 4/2011 | Gueit |
| 8,302,448 | B2 | 11/2012 | Woelcken et al. |
| 8,303,295 | B2 | 11/2012 | Gueit |
| 8,371,409 | B2 | 2/2013 | Inoue et al. |
| 8,511,133 | B1 | 8/2013 | Chen |
| 8,517,715 | B2 | 8/2013 | Thorson et al. |
| 8,534,711 | B2 | 9/2013 | Inoue et al. |
| 8,562,331 | B2 | 10/2013 | Schramm et al. |
| 8,763,439 | B2 | 7/2014 | Thorson et al. |
| 9,027,966 | B2 | 5/2015 | Altmann et al. |
| 9,089,889 | B2 | 7/2015 | Kohnen |
| 9,248,617 | B2 | 2/2016 | Lundequist et al. |
| 9,555,577 | B2 * | 1/2017 | Greding ................. B21D 39/20 |
| 9,808,852 | B2 | 11/2017 | Frenken |
| 9,862,137 | B2 | 1/2018 | Dickert et al. |
| 9,914,260 | B2 | 3/2018 | Ellice |
| 9,975,289 | B2 | 5/2018 | Li et al. |
| 9,993,961 | B2 | 6/2018 | Dickert et al. |
| 10,000,007 | B2 | 6/2018 | Dickert et al. |
| 10,173,310 | B2 * | 1/2019 | Wyler ...................... B25C 1/06 |
| 10,195,783 | B2 | 2/2019 | Dickert et al. |
| 10,406,586 | B2 | 9/2019 | Frenken |
| 2005/0093298 | A1 | 5/2005 | Takayanagi |
| 2006/0201228 | A1 | 9/2006 | Rothenberger |
| 2007/0057393 | A1 | 3/2007 | Hartmann et al. |
| 2008/0122222 | A1 | 5/2008 | Sheppard |
| 2008/0160130 | A1 | 7/2008 | Gueit |
| 2010/0308503 | A1 | 12/2010 | Schramm et al. |
| 2011/0239674 | A1 | 10/2011 | Defilippi |
| 2012/0217674 | A1 | 8/2012 | Greding |
| 2013/0341831 | A1 | 12/2013 | Thorson et al. |
| 2018/0029286 | A1 | 2/2018 | Li et al. |
| 2018/0128323 | A1 | 5/2018 | Carlson |
| 2019/0351605 | A1 | 11/2019 | Trickle |
| 2020/0094306 | A1 | 3/2020 | Savolainen et al. |
| 2020/0094465 | A1 | 3/2020 | Lindsey et al. |
| 2020/0261958 | A1 | 8/2020 | Davies |
| 2020/0261959 | A1 | 8/2020 | Wekwert et al. |
| 2021/0023767 | A1 | 1/2021 | Brochman |
| 2021/0254773 | A1 | 8/2021 | Adelman et al. |
| 2022/0168793 | A1 | 6/2022 | Davies et al. |
| 2023/0031227 | A1 * | 2/2023 | Brochman ............ B29C 53/083 |

FOREIGN PATENT DOCUMENTS

| | | | |
|---|---|---|---|
| CN | 107838304 | A | 3/2018 |
| CN | 207308769 | U | 5/2018 |
| DE | 497609 | C | 5/1930 |
| DE | 2800079 | A1 | 7/1978 |
| DE | 3439522 | A1 | 8/1985 |
| DE | 4003994 | A1 | 8/1991 |
| DE | 4005474 | A1 | 9/1991 |
| DE | 19730054 | C1 | 3/1999 |
| DE | 19924695 | A1 | 11/2000 |
| DE | 19963885 | C1 | 5/2001 |
| DE | 10063517 | A1 | 7/2002 |
| DE | 20301139 | U1 | 6/2004 |
| DE | 102005033482 | A1 | 1/2007 |
| DE | 102006015368 | A1 | 10/2007 |
| DE | 202008002265 | U1 | 4/2008 |
| DE | 202008002266 | U1 | 4/2008 |
| DE | 102007053518 | A1 | 5/2009 |
| DE | 102008061441 | A1 | 7/2009 |
| DE | 102008064320 | A1 | 6/2010 |
| DE | 102013208330 | A1 | 11/2014 |
| EP | 0234283 | A1 | 9/1987 |
| EP | 0397570 | A1 | 11/1990 |
| EP | 0462719 | A2 | 12/1991 |
| EP | 0567742 | A2 | 11/1993 |
| EP | 0718057 | A2 | 6/1996 |
| EP | 0878287 | A1 | 11/1998 |
| EP | 0967427 | A2 | 12/1999 |
| EP | 1118401 | A1 | 7/2001 |
| EP | 1278001 | A2 | 1/2003 |
| EP | 1930640 | A1 | 6/2008 |
| EP | 2090384 | A2 | 8/2009 |
| EP | 3520923 | A1 | 8/2019 |
| FR | 2451235 | A1 | 10/1980 |
| FR | 2645052 | A1 | 10/1990 |
| GB | 1485098 | A | 9/1977 |
| GB | 1524149 | A | 9/1978 |
| WO | 8800503 | A1 | 1/1988 |
| WO | 96020798 | A1 | 7/1996 |

(56) References Cited

FOREIGN PATENT DOCUMENTS

| | | | |
|---|---|---|---|
| WO | 96040457 | A2 | 12/1996 |
| WO | 0189736 | A1 | 11/2001 |

OTHER PUBLICATIONS

European Patent Office Extended Search Report for Application No. 20158590.8 dated Sep. 29, 2020 (15 pages).

* cited by examiner

PEX EXPANSION TOOL

CROSS-REFERENCE TO RELATED APPLICATIONS

This application is a continuation of U.S. patent application Ser. No. 16/795,742, filed Feb. 20, 2020, now U.S. Pat. No. 11,633,775, which claims priority to U.S. Provisional Patent Application No. 62/807,876, filed Feb. 20, 2019, U.S. Provisional Patent Application No. 62/832,922, filed Apr. 12, 2019, U.S. Provisional Patent Application No. 62/879,707, filed Jul. 29, 2019, and U.S. Provisional Patent Application No. 62/908,988, filed Oct. 1, 2019, the entire contents of all of which are incorporated herein by reference.

FIELD OF THE INVENTION

The present disclosure relates to pipe and tubing expansion tools. More particularly, the present disclosure relates to PEX (cross-linked polyethylene) expansion tools.

BACKGROUND OF THE INVENTION

PEX tubing is commonly used in plumbing applications as a substitute for copper pipe. PEX tubing can be coupled to fittings in various ways. Crimp rings or clamp rings can be compressed onto the outside of PEX tubing over a fitting to couple the PEX tubing to the fitting. Alternatively, the PEX tube can be expanded and the fitting inserted into the expanded end of the PEX tube. The PEX tube elastically recovers around the fitting to form a tight connection. Tools used to expand PEX tube for this purpose are referred to as PEX expansion tools.

SUMMARY OF THE INVENTION

The present invention provides, in one aspect, an expansion tool including a housing, a motor supported by the housing and including a motor shaft, a mandrel, and a drive mechanism configured to convert a rotational input from the motor shaft into translational movement of the mandrel. The expansion tool includes a first operating mode and a second operating mode. The drive mechanism is configured to reciprocate the mandrel between a retracted position and a first extended position when the expansion tool is operated in a first operating mode, and the drive mechanism is configured to reciprocate the mandrel between the retracted position and a second extended position different than the first extended position when the expansion tool is operated in the second operating mode.

The present invention provides, in another aspect, an expansion tool including a housing, a motor supported by the housing and including a motor shaft, a mandrel, a transmission having an input member configured to receive a rotational input from the motor shaft and an output member rotatable in response to rotation of the input member, and a drive mechanism configured to convert rotation of the output member into translational movement of the mandrel. The transmission is configured to provide a first gear ratio from the input member to the output member in response to rotation of the motor shaft in a first direction, and the transmission is configured to provide a second gear ratio from the input member to the output member in response to rotation of the motor shaft in a second direction opposite the first direction, the second gear ratio being different than the first gear ratio.

The present invention provides, in another aspect, a tubing expansion system including an expansion tool with a reader, a first head selectively attachable to the expansion tool and including a first identifier, the first head configured for expanding PEX tubing to a first diameter, and a second head selectively attachable to the expansion tool and including a second identifier, the second head configured for expanding PEX tubing to a second diameter different than the first diameter. The reader is configured to receive first identifying information from the first identifier when the first head is attached to the expansion tool, and the reader is configured to receive second identifying information from the second identifier when the second head is alternatively attached to the expansion tool.

The present invention provides, in another aspect, a fitting configured to be inserted into an expanded end of a tubing segment. The fitting includes a main body having a passageway extending through the main body from a leading edge of the main body, and an O-ring surrounding the main body adjacent the leading edge. The leading edge of the main body is insertable into the expanded end of the tubing segment, and the O-ring is configured to establish a seal between the fitting and an internal wall of the tubing segment in response to elastic contraction of the tubing segment.

The present invention provides, in another aspect, an expansion tool operable to expand an end of a tube. The expansion tool includes a housing, a motor supported by the housing, a battery coupled to the housing, the battery configured to power the motor, a plurality of jaws insertable into the end of the tube, and a mandrel movable between a retracted position and an extended position, the mandrel engageable with the plurality of jaws to expand the jaws in response to movement of the mandrel from the retracted position toward the extended position. A distance from the retracted position to the extended position defines a stroke length of the expansion tool. The tube has a nominal size between 1.25 inches and 1.5 inches, and the stroke length is 20 millimeters or less.

The present invention provides, in another aspect, an expansion tool including a housing, a head assembly including a plurality of jaws and a collar surrounding the jaws, wherein the collar is rotatably coupled to the housing, and a mandrel movable relative to the housing between a retracted position and an extended position, the mandrel engageable with the jaws to expand the jaws in response to movement of the mandrel to the extended position. The collar is rotatable in a first direction to move the jaws toward the housing and in a second direction opposite the first direction to move the jaws away from the housing.

The present invention provides, in another aspect, a mandrel assembly for an expansion tool including a drive assembly and a plurality of expandable jaws for insertion into a segment of PEX tubing. The mandrel assembly includes a jaw engaging portion engageable with the jaws to expand the jaws radially outward, a drive engaging portion configured to be coupled to the drive assembly such that operation of the expansion tool reciprocates the drive engaging portion, and a spring interconnecting the drive engaging portion and the jaw engaging portion such that reciprocating motion of the drive engaging portion is transmitted to the jaw engaging portion via the spring.

The present invention provides, in another aspect, an expansion tool including a housing, a jaw mounting ring rotatably coupled to the housing, a plurality of jaws coupled for co-rotation with the jaw mounting ring, a mandrel movable relative to the housing between a retracted position and an extended position, the mandrel engageable with the jaws to expand the jaws in response to movement of the mandrel to the extended position, and a collar surrounding the mandrel, the collar configured to rotate in a first direction in response to movement of the mandrel toward one of the retracted position and the extended position and to rotate in a second direction opposite the first direction in response to movement of the mandrel toward the other of the retracted position and the extended position. The jaw mounting ring is coupled to the collar such that jaw mounting ring co-rotates with the collar in the first direction, and the collar is rotatable relative to the jaw mounting ring in the second direction.

The present invention provides, in another aspect, an expansion tool including a housing, a jaw mounting ring rotatably coupled to the housing, a plurality of jaws coupled for co-rotation with the jaw mounting ring, a mandrel movable relative to the housing between a retracted position and an extended position, the mandrel engageable with the jaws to expand the jaws in response to movement of the mandrel to the extended position, a collar surrounding the mandrel and coupled for co-rotation with the jaw mounting ring, and a gear assembly configured to rotate the collar in response to movement of the mandrel toward one of the retracted position or the extended position.

The present invention provides, in another aspect, an expansion tool including a plurality of jaws, a mandrel movable between a retracted position and an extended position, the mandrel engageable with the jaws to expand the jaws in response to movement of the mandrel toward the extended position, a drive mechanism including a cam, wherein rotation of the cam moves the mandrel between the retracted position and the extended position, a sensor configured to detect rotation of the cam, and a controller in communication with the sensor. The controller is configured to receive feedback from the sensor to count a number of rotations of the cam during operation of the expansion tool.

The present invention provides, in another aspect, a working element for expanding a tube. The working element includes a first plurality of jaw segments, each of the first plurality of jaw segments including an inner surface engageable with a mandrel to move the working element from an initial configuration to an expanded configuration and an outer surface engageable with an interior wall of the tube in the expanded configuration. The working element also includes a second plurality of jaw segments, each of the second plurality of jaw segments including an outer surface engageable with the interior wall of the tube in the expanded configuration. The outer surfaces of the second plurality of jaw segments are positioned radially outwardly of the outer surfaces of the first plurality of jaw segments when the working element is in the initial configuration, and the outer surfaces of the second plurality of jaw segments are radially aligned with the outer surfaces of the first plurality of jaw segments when the working element is in the expanded configuration.

The present invention provides, in another aspect, an expansion tool including a mandrel configured to reciprocate along an axis between a retracted position and an extended position, a plurality of jaws engageable with the mandrel such that movement of the mandrel toward the extended position expands the jaws, each jaw including a distal end insertable into the tube, a tapered portion extending from the distal end at an oblique angle relative to the axis, and a sizing portion extending parallel to the axis, a first biasing member surrounding the tapered portions of the jaws, and a second biasing member spaced from the first biasing member along the axis, the second biasing member surrounding the sizing portions of the jaws. The first biasing member and the second biasing member are configured to bias the jaws toward a closed position.

The present invention provides, in another aspect, an expansion tool including a frame, a rotation collar rotatable relative to the frame, a working element coupled to the frame, the working element including a plurality of jaws coupled for co-rotation with the rotation collar, a mandrel movable between a retracted position and an extended position, the mandrel engageable with the jaws to expand the jaws in response to movement of the mandrel toward the extended position, the mandrel including a cam slot having a first ramp and a second ramp, a shuttle surrounding the mandrel, and a pin extending through the cam slot. The pin is configured to engage the first ramp to rotate the shuttle in a first direction in response to movement of the mandrel toward the extended position, and the pin configured to engage the second ramp to rotate the shuttle in a second direction opposite the first direction in response to movement of the mandrel toward the retracted position. The shuttle is rotatable relative to the rotation collar in the first direction, and rotation of the shuttle in the second direction rotates the rotation collar and the jaws in the second direction.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
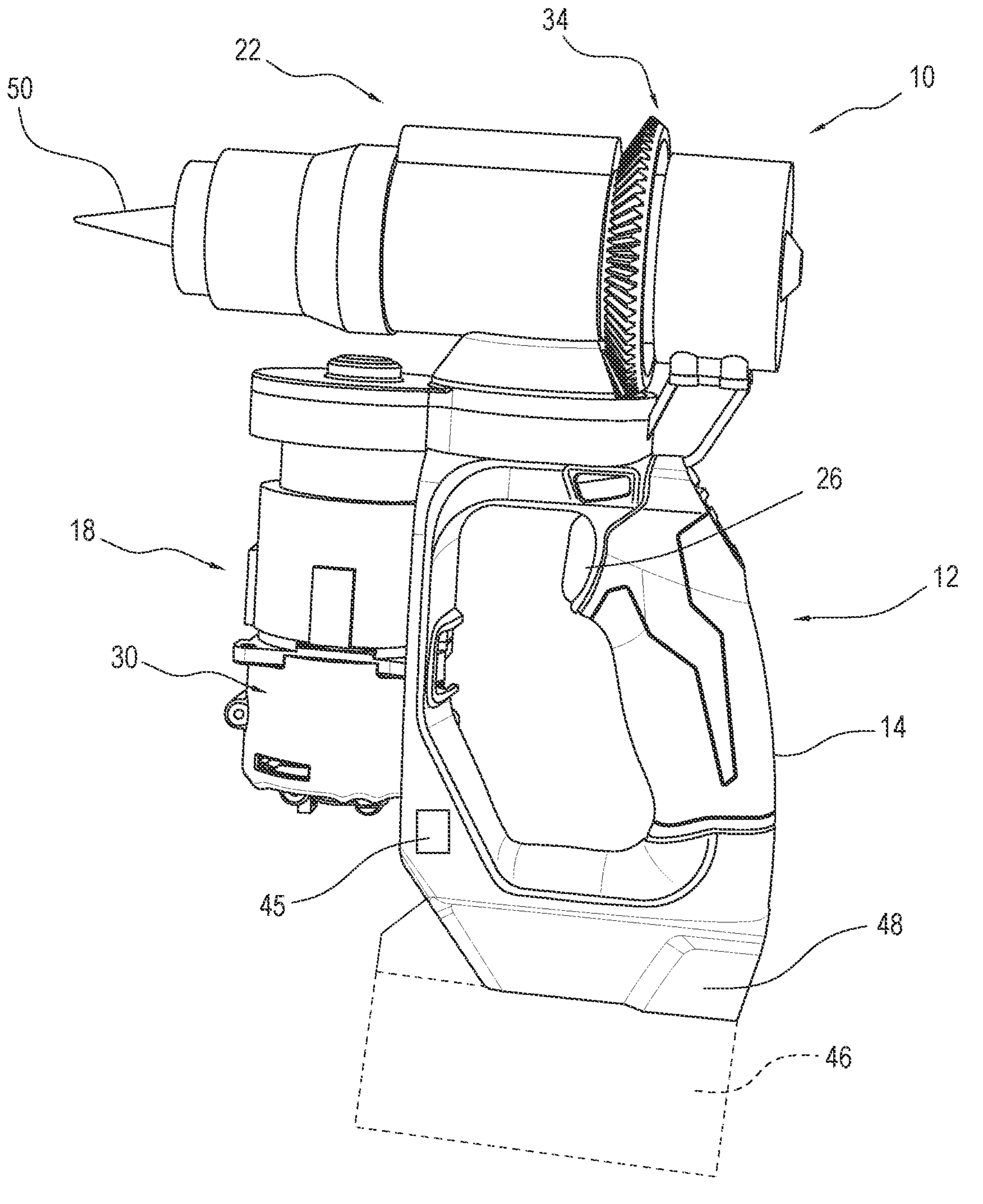
FIG. 1 is a perspective view of an expansion tool according to an embodiment of the present disclosure.

FIG. 1 illustrates an expansion tool 10 usable to expand PEX tubing prior to inserting a fitting. The expansion tool 10 includes a housing 12 (only a portion of which is illustrated in FIG. 1) with a handle 14 configured to be gripped by a user during operation of the expansion tool 10. The housing 12 supports a motor casing 18 and a drive casing 22. An actuator 26 (e.g., a trigger) for operating the expansion tool 10 is positioned on the handle 14. A motor 30 (e.g., a brushless DC electric motor) is supported within the motor casing 18, and a drive mechanism 34 is supported at least partially within the drive casing 22.

Figure 2:
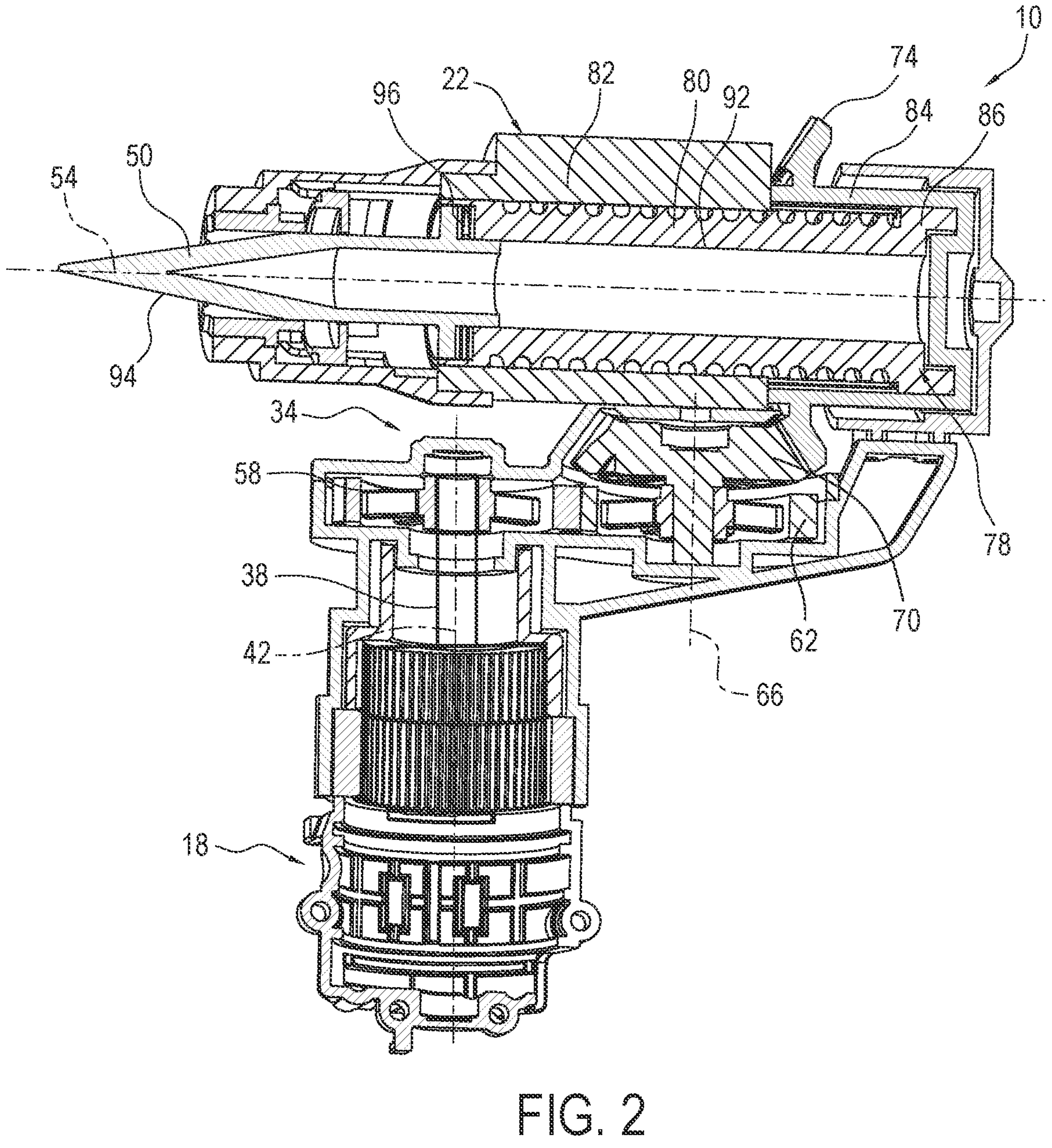
FIG. 2 is a cross-sectional view of the expansion tool of FIG. 1.

The illustrated expansion tool includes a battery 46 (FIG. 1) configured to provide electrical power to the motor 30 (e.g., in response to the actuation of the actuator 26). The battery 46 is a rechargeable battery pack with a plurality of lithium-based cells and is removably coupled to a battery receptacle 48 located at a base of the handle 14. In some embodiments, the battery 46 has a nominal output voltage of about 12 volts. In other embodiments, the battery 46 has a nominal output voltage of about 18 volts. In other embodiments, the battery 46 may have other nominal output voltages (e.g., 24 volts, 36 volts, 40 volts, etc.). Referring to FIG. 2, a shaft 38, which may be an output shaft of the motor 30 (i.e. a motor shaft), extends along a first axis 42 or motor axis and provides a rotational input to the drive mechanism 34.

Figure 3:
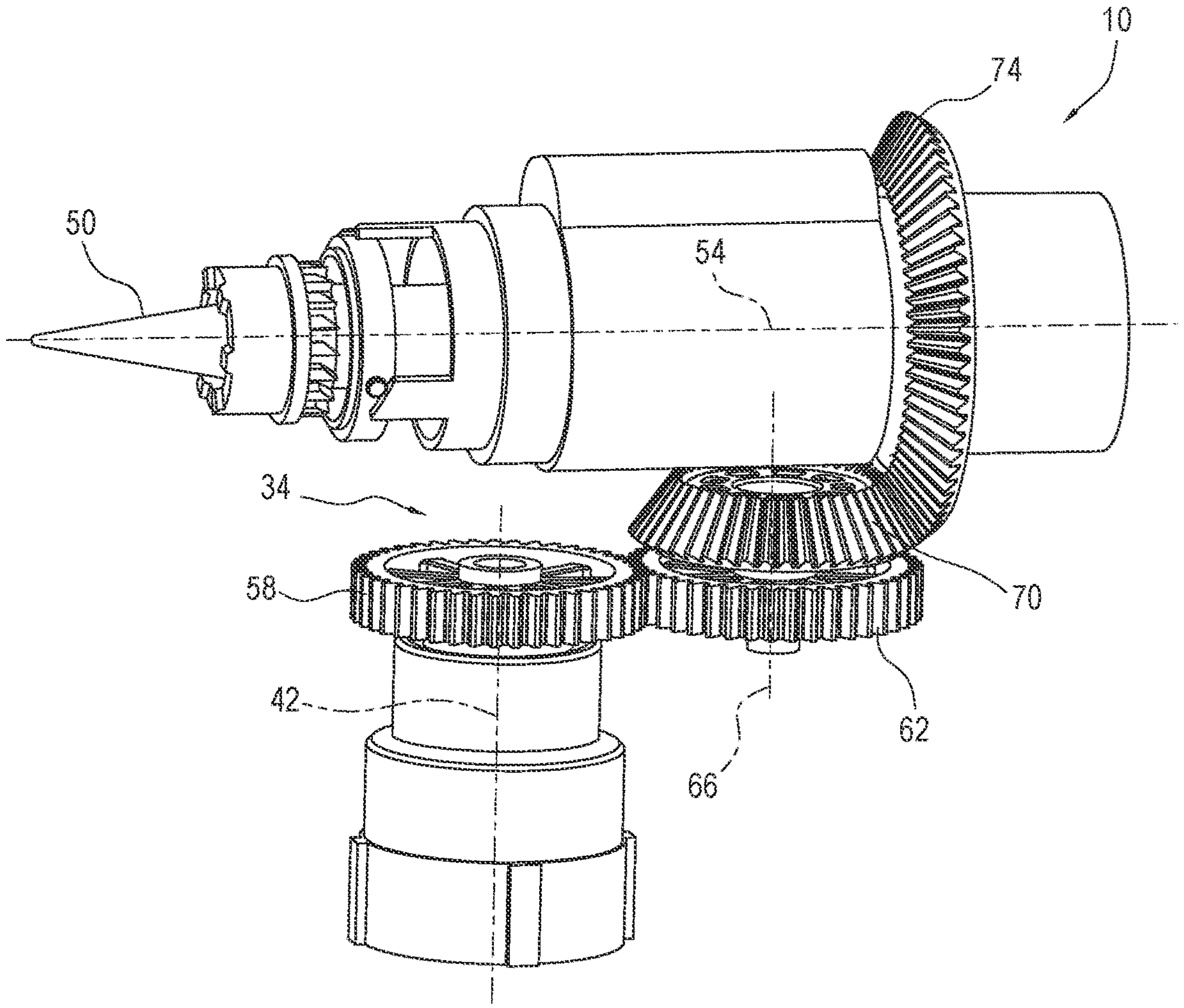
FIG. 3 is a perspective view of a portion of the expansion tool of FIG. 1.

With reference to FIGS. 2-3, the drive mechanism 34 converts the rotational input from the shaft 38 into a translational movement of a mandrel 50 along a second axis or mandrel axis 54. In the illustrated embodiment, the mandrel axis 54 is perpendicular to the motor axis 42, which contributes to a compact overall length of the expansion tool 10.

The illustrated drive mechanism 34 includes a first gear 58 coupled for co-rotation with the shaft 38 about the motor axis 42, a second gear 62 meshed with the first gear 58 and rotatable about a third axis 66 parallel to the motor axis 42, a third gear 70 coupled for co-rotation with the second gear 62 about the third axis 66, and a fourth gear 74 meshed with the third gear 70 and rotatable about the mandrel axis 54. In the illustrated embodiment, the third gear 70 and the fourth gear 74 are bevel gears.

The drive mechanism 34 provides a speed reduction and torque increase from the shaft 38 to the fourth gear 74. In other embodiments, the drive mechanism 34 may include other gear arrangements. In some embodiments, the drive mechanism 34 may include a transmission 76 (FIG. 4), such as a single or multi-stage planetary transmission.

Referring to FIG. 2, the fourth gear 74 drives a power screw mechanism 78, which converts the rotation input from the fourth gear 74 into translational movement of the mandrel 50 along the mandrel axis 54. The illustrated power screw mechanism 78 includes an externally-threaded screw shaft 80 in threaded engagement with an internally-threaded collar 82 or nut fixed to or integral with the drive casing 22. The fourth gear 74 is fixed to a splined sleeve 84 that surrounds an end portion 86 of the screw shaft 80. The end portion 86 of the screw shaft 80 includes corresponding splines that are mated with the splined sleeve 84. The splined connection couples the screw shaft 80 for co-rotation with the sleeve 84 while permitting the screw shaft 80 to move axially relative to the sleeve 84. Accordingly, the fourth gear 74 rotates the screw shaft 80 (via the splined sleeve 84) relative to the collar 82, which advances (i.e. moves to the left in FIG. 2) or retracts (i.e. moves to the right in FIG. 2) the screw shaft 80 along the mandrel axis 54.

The mandrel 50 is coupled to an end of the screw shaft 80 opposite the end portion 86 and is configured to translate with the screw shaft 80 along the mandrel axis 54. In the illustrated embodiment, the screw shaft 80 is hollow and includes a central bore 92 in which the mandrel 50 is partially received. The mandrel 50 includes a conical outer surface 94 engageable with a working element or head 100 (FIGS. 5-6), described in greater detail below. A thrust bearing 96 is disposed between the mandrel 50 and the screw shaft 80 to permit the screw shaft 80 to rotate relative to the mandrel 50.

The mandrel 50 is driven by the screw shaft 80 in a reciprocating manner, to expand and retract the working element 100 (FIGS. 5 and 6), which is configured to be attached to the expansion tool 10. The working element 100 is movable from an initial or closed position (illustrated in FIG. 5) towards an expanded position (FIG. 6) in response to movement of the mandrel 50 along the axis 54 toward an extended position. The working element 100 may be biased toward the initial position by a spring (e.g., an o-ring), such that the working element 100 returns to the initial position when the mandrel 50 retracts.

Figure 5:
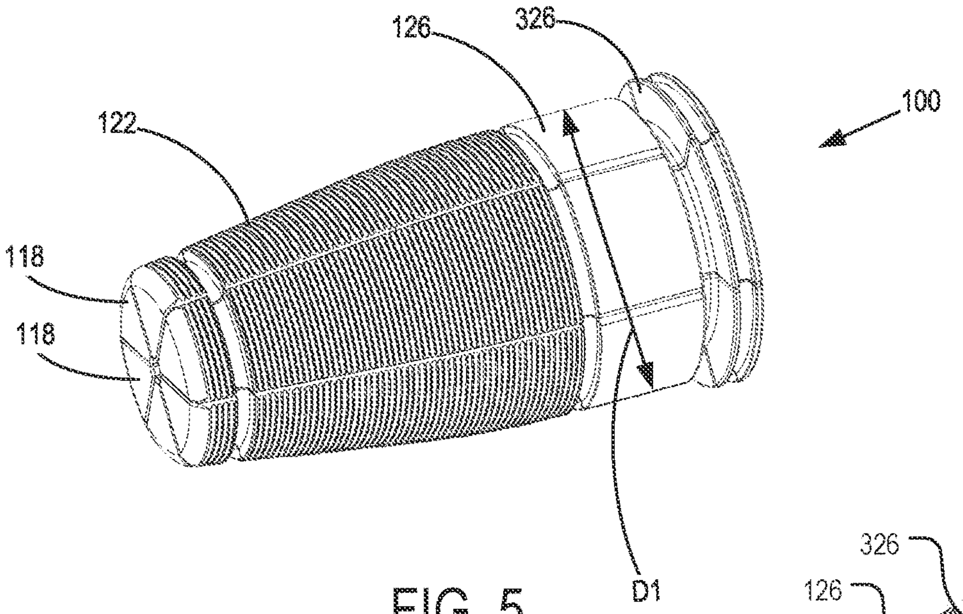
FIG. 5 is a perspective view illustrating a working element according to one embodiment of the present disclosure, usable with the expansion tool of FIG. 1 and illustrated in an initial state.
Figure 6:
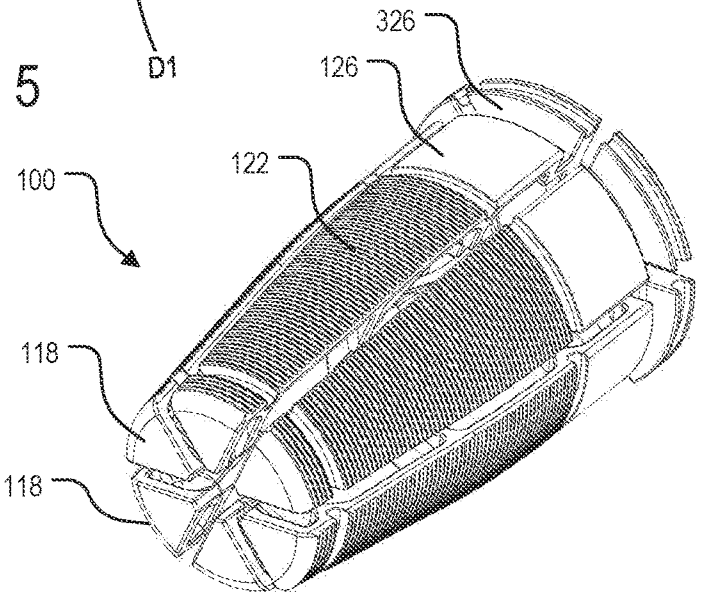
FIG. 6 is a perspective view illustrating the working element of FIG. 5 in an expanded state.

Referring to FIGS. 5 and 6, the working element 100 includes a plurality of jaws 118, each having an exterior side with a tapered portion 122 and a sizing portion 126. When the working element 100 is in the closed position (FIG. 5), adjacent jaws 118 abut one another to define a generally conical shape. In other embodiments, the jaws 118 may be formed with non-linear profiles along the length of each jaw 118.

In the illustrated embodiment, the sizing portions 126 of each of the jaws 118 collectively define a diameter or maximum cross-sectional dimension D1 when the jaws 118 are in the closed position. The dimension D1 is sized for proper expansion of PEX tubing of a nominal size when the jaws are inserted into an end of the PEX tubing.

In some embodiments (not shown), the working element 100 may include a first sizing portion and a second sizing portion. That is, in addition to the maximum cross-sectional dimension D1 as shown in the illustrated embodiment, each of the jaws may collectively define a second maximum cross-sectional dimension positioned on the second sizing portion when the jaws are in the closed position. The second dimension may be greater than the first dimension D1, such that the jaws have a stepped outer profile. The first dimension D1 may be sized for proper expansion of PEX tubing of a first nominal size when the jaws are inserted into an end of the PEX tubing. The second dimension may be sized for proper expansion of PEX tubing of a second, greater nominal size when the jaws are inserted into an end of the PEX tubing. In some embodiments, the first nominal size is ½-inch, and the second nominal size is ¾-inch; however, the first dimension D1 and the second dimension may be configured for proper expansion of PEX tubing of other nominal sizes.

Figure 7:
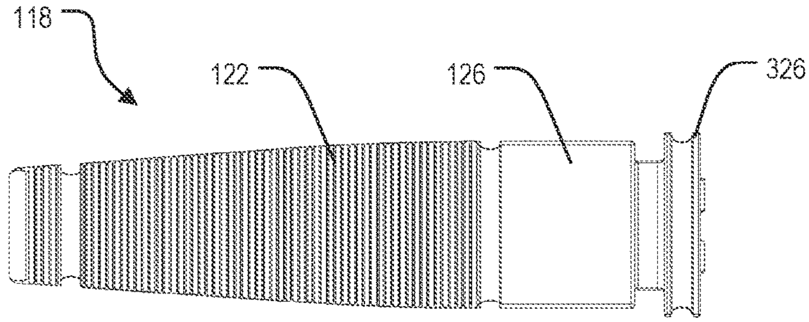
FIG. 7 is a top view of a jaw of the working element of FIG. 5.
Figure 7A:
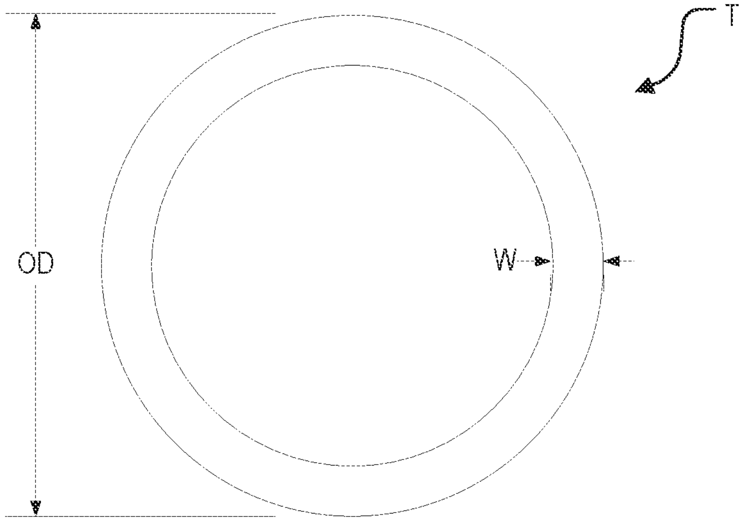
FIG. 7A is an end view of an exemplary PEX tubing segment.

Nominal sizes of PEX tubing are specified by ASTM F876. For example, referring to FIG. 7A, a PEX tubing segment T with a nominal size of ½-inch may have an outer diameter OD of 0.625 inches and a wall thickness W between 0.07 inches and 0.08 inches. A PEX tubing segment T with a nominal size of ¾-inch may have an outer diameter OD of 0.875 inches and a wall thickness W between 0.097 and 0.107 inches. A PEX tubing segment T with a nominal size of 1-inch may have an outer diameter OD of 1.125 inches and a wall thickness W of 0.125 inches to 0.138 inches. A PEX tubing segment T with a nominal size of 1.5 inches may have an outer diameter OD of 1.625 inches and a wall thickness W of 0.181 inches to 0.2 inches. A PEX tubing segment T with a nominal size of 2.0 inches may have an outer diameter OD of 2.125 inches and a wall thickness W of 0.236 to 0.260 inches.

In some embodiments, the mandrel 50, and/or the working element 100 may be configured to rotate about the mandrel axis 54 before, during, or after expansion of the working element 100. For example, the expansion tool 10 may include a rotation assembly with a rotation collar as described and illustrated in U.S. Pat. No. 8,763,439 to Milwaukee Electric Tool Corporation, the entire content of which is incorporated herein by reference.

Figure 4:
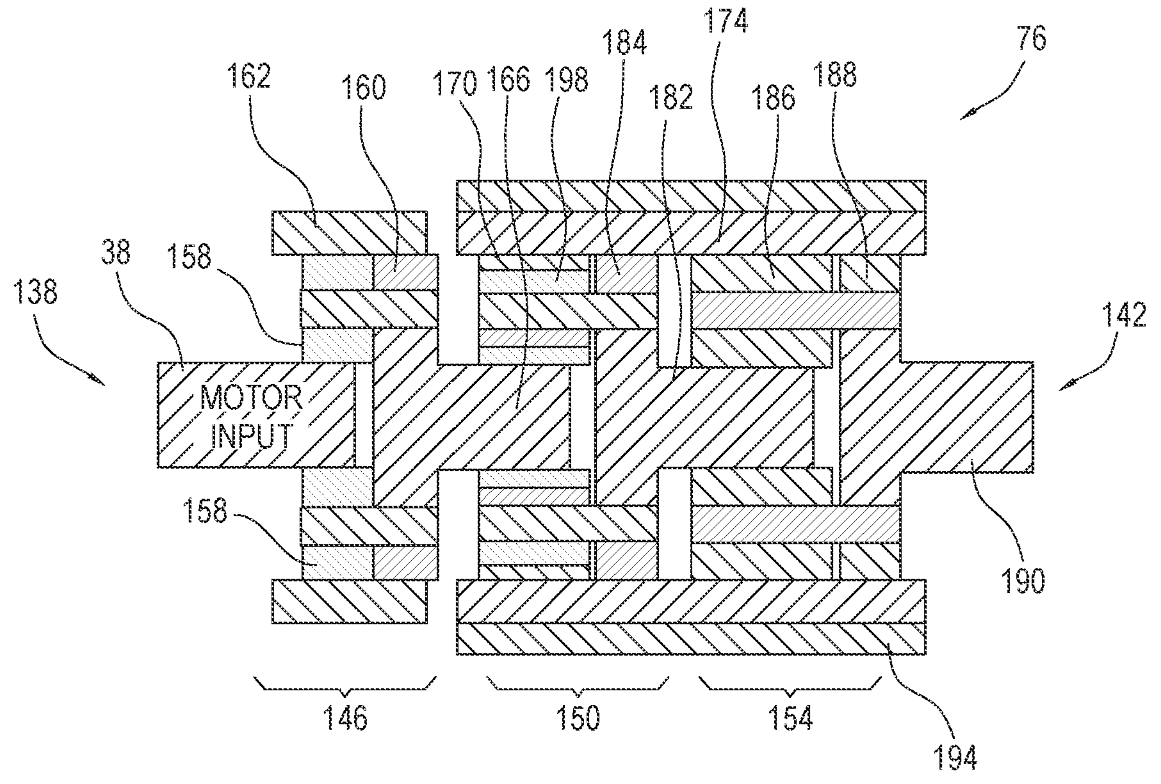
FIG. 4 is a cross-sectional schematic view of a transmission usable with the expansion tool of FIG. 1.

FIG. 4 illustrates a transmission 76 that may be incorporated into the drive mechanism 34 of the expansion tool 10. The transmission 76 may be positioned along the motor axis 42, between the first gear 58 and the motor 30. Alternatively, one or more gears of the drive mechanism 34 may be replaced by the transmission 76. As described in greater detail below, the transmission 76 is configured to receive rotational input from the motor 30 and selectively set a gear ratio between the motor 30 and an output of the transmission 76 based on a rotational direction of the shaft 38.

The transmission 76 includes an input side 138 that receives the rotational input (directly or indirectly) from the shaft 38 and an output side 142 coupled to the drive mechanism 34. In some embodiments, the transmission 76 may be a shiftable multi-speed transmission configured to adjust the speed of the working element 100 based on the use of the expansion tool 10 (i.e., different sizes, diameters, or thickness of the pipe, etc., or at different stages of the process).

The illustrated transmission 76 includes a plurality of stages of gear reduction. In the illustrated embodiment, the transmission 76 includes a first stage 146, a second stage 150, and a third stage 154. The first stage 146 includes a plurality of first planet gears 158 meshed with a pinion on the shaft 38 that defines an input member of the transmission 76. The first planet gears 158 are meshed with a first ring gear 162 fixed to the drive casing 22 and are coupled to a first carrier 160. A first sun gear 166 is coupled for co-rotation with the first carrier 160. The first sun gear 166 is meshed with a plurality of second planet gears 170 of the second stage 150. The second planet gears 170 are meshed with a second ring gear 174 and coupled to a second carrier 184. A second sun gear 182 is coupled for co-rotation with the second carrier 184. The second sun gear 182 is meshed with a plurality of third planet gears 186 of the third stage 154. The third planet gears 186 are meshed with the second ring gear 174 and coupled to a third carrier 188. A third sun gear 190 is coupled for co-rotation with the third carrier 188 and defines an output member of the transmission 76.

The transmission 76 further includes a first one-way needle bearing 194 positioned outside the second ring gear 174, and a plurality of second one-way needle bearings 198 positioned inside each of the respective second planet gears 170. The first and second one-way needle bearings 194, 198 selectively engage (i.e., allow the rotation of the bearings) and disengage (i.e., lock the rotation of the bearings), depending on the direction torque is applied to the supported gears.

The illustrated expansion tool 10 includes cycles of axially extending and retracting the mandrel 50, which includes reversing the operating direction of the motor 30. The transmission 76 provides a first gear ratio in a forward direction of the motor 30 (corresponding with the extension of the mandrel 50 and expansion of the working element 100), and a second gear ratio in a reverse direction of the motor 30 (corresponding with the retraction of the working element 100 and retraction of the mandrel 50). The first gear ratio is greater than the second gear ratio to provide a greater speed reduction and higher torque during expansion, when the working element 100 is pressing against the PEX tubing. The smaller second gear ratio provides a lesser numeral reduction that allows for a faster retraction of the working element 100, advantageously reducing the cycle time of the expansion tool 10.

In particular, when the motor 30 is operated in a first or forward direction, the first one-way needle bearing 194 locks to prevent the second ring gear 174 from rotating. The second one-way needle bearings 198 unlock and permit the second planet gears 170 to rotate about their respective axes in response to rotation of the first sun gear 166. As such, the second planet gears 170 and the third planet gears 186 orbit along the interior of the second ring gear 174 and provide a first gear ratio across the second and third stages (150, 154). Effectively, the transmission 76 provides a gear reduction through the first stage 146, the second stage 150, and the third stage 154 in the first direction of the motor 30. In some embodiments, the gear ratio provided by the second and third stages is about 4.5:1.

When the motor 30 is operated in the second or reverse direction, the first one way needle bearing 194 unlocks to permit the second ring gear 174 to rotate. At the same time, the second one-way needle bearings 198 lock. Thus, the second planet gears 170, the second carrier 178, the third planet gears 186, the third carrier, and the second ring gear 174 all co-rotate together with the first sun gear 166. Effectively, the transmission 76 only reduces the rotational input from the motor 30 with the first stage 146 when the motor 30 is operated in reverse. That is, the second and third stages 150, 154 provide a 1:1 gear ratio. Accordingly, the transmission 76 provides a first gear ratio when the motor 30 is operated in the first direction and a second gear ratio with a lower numeral reduction/lesser speed reduction from the input side 138 to the output side 142 when the motor 30 is operated in the second direction. In other embodiments, the transmission 76 may include any other number of gear reduction stages, and the one way bearings 194, 198 may support elements of one or more other stages in order to provide any desired gear ratios in the first and second operating directions of the motor 30.

While the transmission 76 is described herein in the context of the expansion tool 10, the transmission 76 may be used in other tools where it is desirable to have different gear reductions depending on the direction of rotation of a motor. Several non-limiting examples of advantageous applications of the transmission 76 are described below.

For example, in one embodiment, a fish tape includes the transmission 76 coupled to a tape spool. The transmission 76 advantageously provides for a faster speed when tape is being fed off of the spool, and a slower speed when the tape is being retracted and pulling wires.

In another embodiment, a cutoff saw includes the transmission 76 coupled to a blade spindle. The transmission 76 may thus provide different speeds in forward and in reverse, which may allow different cutting speeds for different types of saw blades.

In another embodiment, a powered cutting tool, such as a PVC cutter, metal shears, reciprocating saw, jigsaw, or the like, includes the transmission 76 coupled to an actuation mechanism of a cutting element. The transmission 76 may advantageously provide for a slower speed with higher torque while cutting, and faster speed when retracting the cutting element.

In another embodiment, fastener and/or material application tools, such as rivet tools or caulk/adhesive applicator tools, may include the transmission 76. In such tools, the transmission 76 may reduce cycle times by more quickly returning the tool to its initial state to load a new rivet into the tool (in the case of a powered rivet tool) or load a new tube of caulk or adhesive into the tool (in the case of a powered material applicator tool).

In another embodiment, a powered ratchet tool includes the transmission 76 coupled to a fastener driver element. The transmission 76 allows for different gear ratios (and therefore speeds) in forward and reverse directions, which may facilitate removal and installation of fasteners.

In another embodiment, the transmission 76 is incorporated into a hydraulic power tool. The transmission 76 may be coupled to a hydraulic pump to provide higher torque when pressurizing a downstream cylinder and faster recovery when releasing the compressed fluid from the cylinder.

The expansion tool 10 further includes a controller (not shown) configured to control operation of the expansion tool 10 (i.e., energize the motor 30 to rotate the drive mechanism 34 a predetermined number of cycles; expand the working element 100 a predetermined diameter, etc.). The predetermined expansion of the working element 100 may be adjustable to allow the expansion tool 10 to expand the PEX tubing to a variety of different sizes. The functions of the controller will be described in further detail below in the operation of the expansion tool 10.

In operation, the working element 100 (FIGS. 5-6) is inserted into an end of a segment of PEX tubing to be expanded. The tapered portion 122 abuts an interior wall of the PEX tubing. The operator depresses the actuator 26, and the motor 30 and the drive mechanism 34 perform a cycle of axially extending and retracting the mandrel 50, thereby expanding and contracting the jaws 118 of the working element 100. More specifically, the motor 30 drives the drive mechanism 34 in a first direction (e.g., a forward direction) to advance the conical outer surface 94 of the mandrel 50 (FIG. 2) to abut against corresponding interior surface of the jaws 118 and expand the jaws 118 radially outward. The motor 30 drives the drive mechanism 34 in a second direction (e.g., a reverse direction) to retract the mandrel 50, allowing the jaws 118 to retract (e.g., under the influence of a spring).

The elapsed time for a cycle of axially extending and retracting the mandrel 50 defines a cycle time TC of the expansion tool 10. More specifically, the mandrel 50 is movable from a retracted position to an extended position in a first time period T1 in response to operation of the motor 30 in the first direction. The mandrel 50 is movable from the extended position to the retracted position in a second time period T2 in response to operation of the motor 30 in the second direction. The first time period T1 and the second time period T2 collectively define the cycle time TC of the expansion tool 10.

In some embodiments, the second time period T2 is less than the first time period T1. That is, the mandrel 50 retracts at a faster rate than it extends to take advantage of the reduced load on the mandrel 50 when moving toward the retracted position. In some embodiments, the controller may operate the motor 30 at two different speeds. Alternatively, a transmission (e.g., the transmission 76) may be provided that produces different gear ratios depending on a direction of rotation of the motor 30. Retracting the mandrel 50 more quickly contributes to a short cycle time TC, which advantageously minimizes the time required to fully expand the PEX tubing to receive a fitting.

As the jaws 118 expand, the tapered portions 122 engage with the interior wall of the PEX tubing to gradually expand the PEX tubing. The expansion tool 10 continues the cycles of axially extending and retracting the mandrel 50. The operator pushes the jaws 118 deeper into the PEX tubing with each successive expansion until the sizing portion 126 is received within the PEX tubing. This indicates to the operator that expansion is complete (e.g., to a dimension D1). The jaws 118 are withdrawn from the PEX tubing, and the operator inserts a fitting into the end of the PEX tubing. The interior of the PEX tubing then elastically recovers and secures the fitting in place.

In some embodiments, the controller may optimize the performance of the expansion tool 10. In such embodiments, the controller may detect or measure values such as a number of cycles, revolutions of the shaft 38, position of the mandrel 50, or the like. Using the measured values, the controller may be configured to expand the PEX tubing to a predetermined expansion (e.g., to dimension D1).

For example, in some embodiments, the expansion tool 10 may include one or more sensors (e.g., rotation sensors configured to measure angular displacement of one or more components of the drive mechanism 34, position sensors configured to measure an axial position of the mandrel 50, etc.) in communication with the controller. The controller may use feedback from these sensors to determine and control the stroke length of the mandrel 50. Thus, the expansion tool 10 may have a variable stroke length that can be optimized for the type of working assembly 100 coupled to the expansion tool 10, the type or brand of PEX tubing being expanded, the size of the PEX tubing, and the like.

In some embodiments, the controller may also optimize performance of the expansion tool 10 by controlling the stroke length based on ambient temperature conditions. The expansion and recovery behavior of PEX tubing is temperature dependent. PEX tubing recovers more slowly (and thus, takes longer to establish a seal with an inserted fitting) as the ambient temperature decreases. Likewise, PEX tubing recovers more quickly as the ambient temperature increases. If the ambient temperature is high, the PEX tubing may recover too quickly, making it difficult to insert a fitting before the PEX tubing contracts.

In some embodiments, the expansion tool 10 includes a temperature sensor 45 (FIG. 1). The temperature sensor 45 is configured to sense a temperature of the ambient environment surrounding the expansion tool 10 and may include a thermocouple, thermistor, RTD, or the like. The temperature sensor 45 is in communication with the controller, such that the controller may continuously or periodically monitor the temperature sensor 45 to determine whether the ambient temperature is below a predetermined threshold temperature (e.g., 40 degrees Fahrenheit). If so, the controller automatically initiates a cold operating mode.

In the cold operating mode, the controller decreases the amount of expansion that the expansion tool 10 imparts to the PEX tubing by decreasing the forward travel distance of the mandrel 50. For example, in the cold operating mode, the controller may reduce the expansion of the jaws 118 by about 1 mm. In some embodiments, the controller may similarly initiate a warm temperature operating mode if the ambient temperature is above a second predetermined threshold temperature (e.g., 80 degrees Fahrenheit). In the warm operating mode, the controller increases the amount that the jaws 118 expand by about 1 mm by increasing the forward travel of the mandrel 50. When the measured ambient temperature is greater than or equal to the first threshold temperature and less than or equal to the second threshold temperature, the controller may operate the expansion tool 10 in a normal operating mode. In other embodiments, the expansion tool 10 may include only two temperature-related operating modes (e.g., a normal operating mode and a cold temperature or warm temperature operating mode), or the expansion tool 10 may include more than three temperature-related operating modes.

In some embodiments, the expansion tool 10 may include a switch to enable a user to manually switch between the normal operating mode, the cold operating mode, and the warm operating mode. In some embodiments, the expansion tool may include a display to indicate the ambient temperature measured by the temperature sensor 45 to the user. In some embodiments, the user may set the expansion tool 10 to operate in the normal operating mode, the cold operating mode, or the warm operating mode via an external interface (e.g., a smart phone, computer, or the like) that communicates with the expansion tool 10 remotely (e.g., via BLUETOOTH, near field communication, or the like). In some embodiments, the first and second threshold temperatures may be preprogrammed. In other embodiments, the first and second threshold temperatures may be set and adjusted by the user.

In some embodiments, the controller may receive feedback from the temperature sensor 45 to dynamically adjust operation of the expansion tool 10 using closed loop control. For example, the controller may vary the expansion rate (i.e. the speed of the mandrel 50) as a function of temperature to optimize the time required for the PEX tubing to seal to the fitting. In particular, as the ambient temperature measured by the temperature sensor 45 decreases, the controller may reduce the speed of the mandrel 50 and thereby reduce the expansion rate. Reducing the expansion rate allows the PEX tubing to recover more quickly, counteracting the slowing effects of cold temperatures.

In some embodiments, the expansion tool 10 may operate using closed loop control at multiple different speed modes (e.g., high speed mode and low speed mode). In other embodiments, closed loop control may be activated at only one of a plurality of speed modes (e.g., the high speed mode). In other embodiments, closed loop control may be selectively activated by a user (e.g., by pushing a button or switch, wirelessly sending a command to the controller, or the like).

In some embodiments, the controller may detect a last cycle (e.g., when the PEX tubing is expanded to the predetermined expansion). The controller may be configured to set a last cycle time (e.g., a period of time longer than the cycle time), which holds the working element 100 in the expanded position for a longer period of time. Holding the working element 100 in the expanded position for a longer period of time on the last cycle has been found to decrease the time required for the PEX tubing to seal to the fitting.

In another embodiment, the user may indicate to the controller (i.e., by pushing a button, letting go of the trigger, etc.) that the expansion tool 10 has reached the last cycle. Similar to the embodiment described above, the controller may be configured set a last cycle time (e.g., a period of time longer than the cycle time), which holds the working element 100 in the expanded position for a predetermined period of time.

In another embodiment, after the PEX tubing has been expanded and the fitting has been inserted, the user may crimp the PEX tubing to decrease the sealing time. The user may crimp the PEX tubing with a hand-held crimper or a crimper working element (not shown) that attaches to the expansion tool 10. For example, the working element 100 may be removed from the expansion tool 10 and replaced with a crimper working element, with jaws 118 that are driven closed in response to extension of the spindle.

In another embodiment, the expansion tool 10 may be configured to expand the PEX tubing in a single stroke or cycle. In such embodiments, the expansion tool 10 may include rollers or an expandable core that fills the gaps between adjacent jaws 118 when the jaws 118 are in the expanded configuration. In such embodiments, the jaws 118 are maintained in the expanded position for a predetermined time period (e.g., 5-30 seconds) that is longer than the cycle time of the expansion tool 10.

Figure 8:
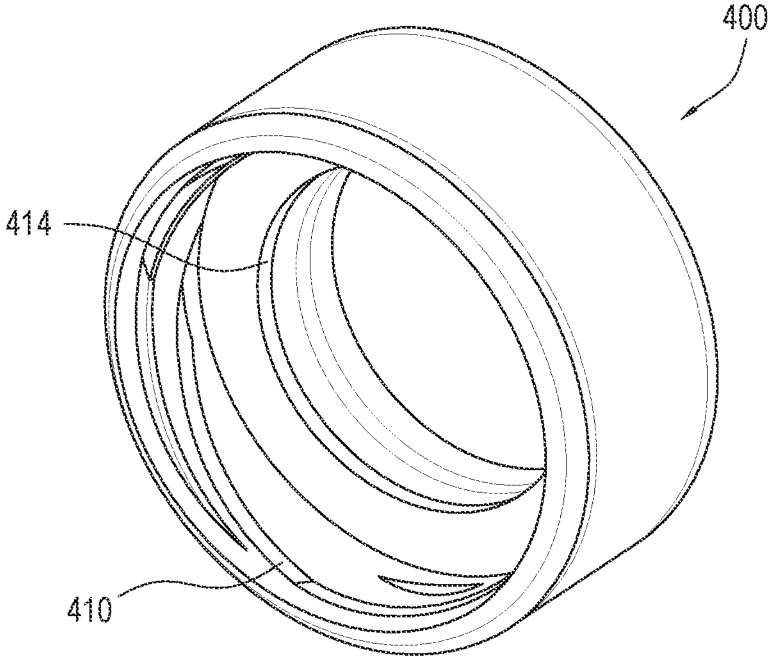
FIG. 8 is a perspective view illustrating a quick connection attachment usable with the expansion tool of FIG. 1.

FIG. 8 illustrates a quick connection attachment 400 configured to releasably attach a working element, such as the working element 100, to the expansion tool 10. In the illustrated embodiment, the quick connection attachment 400 includes an internal annular groove configured to receive a radial projection 326 extending from each of the jaws 118 (FIGS. 5-6).

The illustrated attachment 400 includes a four-start thread 410 that is engageable with corresponding threads (not shown) on a front portion of the expansion tool 10. The four-start thread 410 allows for the user to rotate the attachment 400 only a quarter turn (i.e. 90 degrees) to connect or disconnect the attachment 400 from the expansion tool 10. In some embodiments, the attachment 400 may allow for differently sized and configured working elements (e.g., the working element 100, a crimper working element, and the like) to be interchangeably coupled to the expansion tool 10.

FIGS. 9-15 illustrate an expansion tool 510 according to another embodiment. The expansion tool 510 is similar in some aspects to the expansion tool 10 described above, and the following description focuses primarily on differences between the expansion tool 510 and the expansion tool 10. Features and elements of the expansion tool 510 corresponding with features and elements of the expansion tool 10 are given identical reference numbers plus '500.' In addition, features, elements, and control systems and methods described above with reference to the expansion tool 10 may be incorporated into the expansion tool 510, and vice versa.

Figure 9:
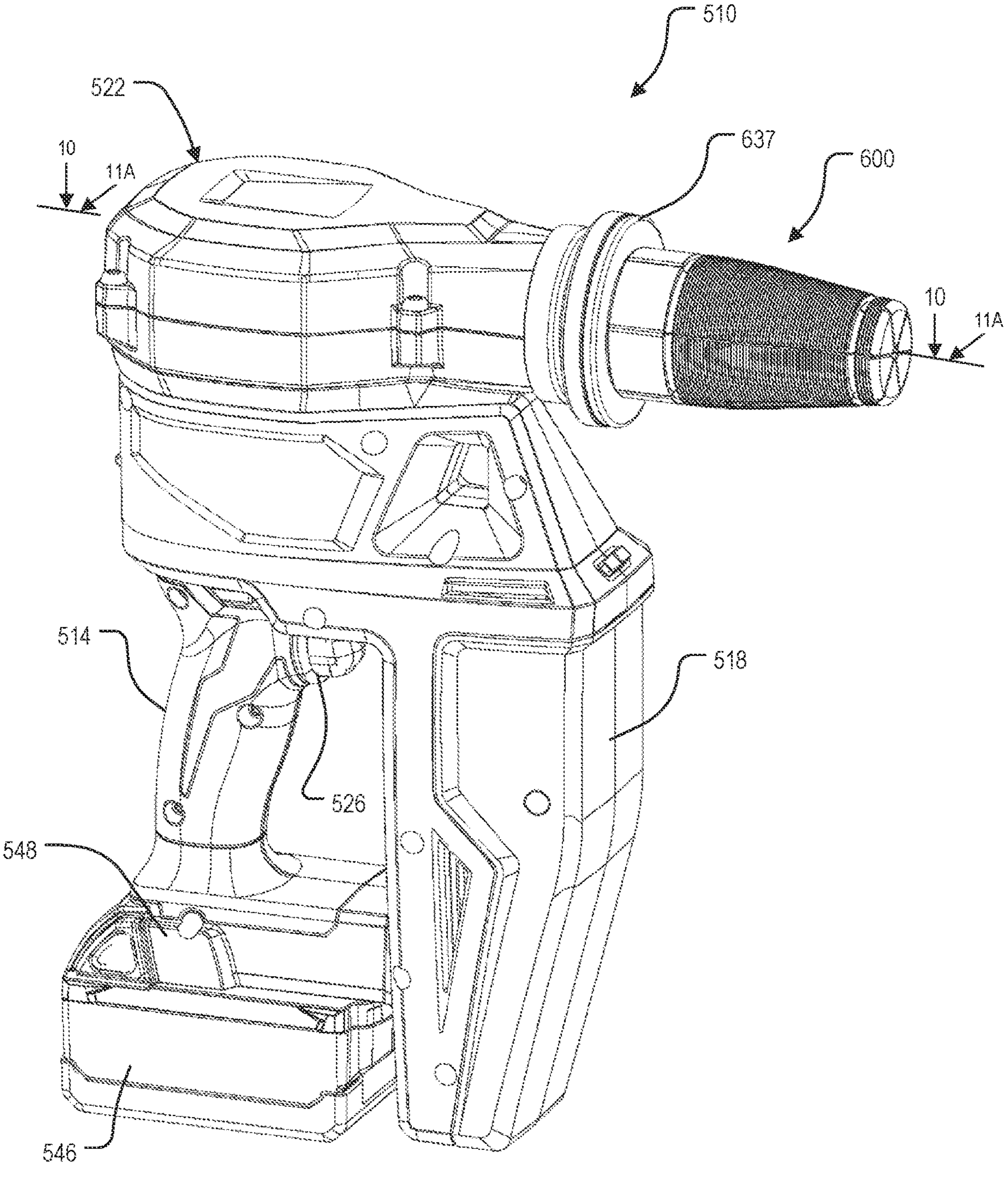
FIG. 9 is a perspective view of an expansion tool according to another embodiment of the present disclosure.
Figure 11A:
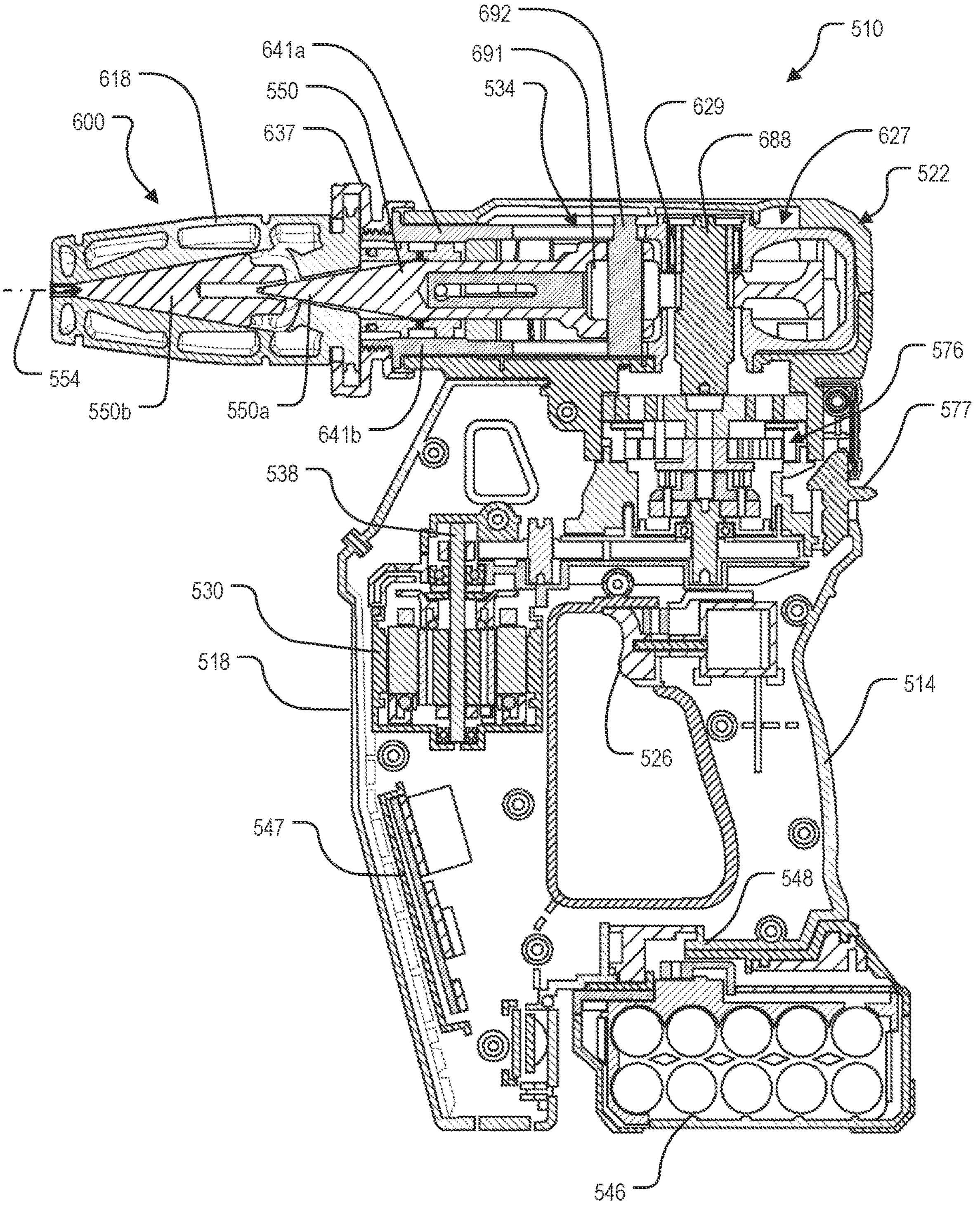
FIG. 11A is cross-sectional view of the expansion tool of FIG. 9, taken along line 11A-11A in FIG. 9.

Referring to FIGS. 9 and 11A, the expansion tool 510 includes a housing 512 with a handle 514 configured to be gripped by a user during operation of the expansion tool 10. An actuator 526 (e.g., a trigger) for operating the expansion tool 510 is positioned on the handle 514. The housing 512 includes a motor housing portion 518 enclosing a motor 530 (e.g., a brushless DC electric motor) having a motor shaft 538 (FIG. 11A). A battery receptacle 548 at the bottom end of the handle 514 is configured to receive a battery 546 for providing electrical power to the motor 530. The expansion tool 510 also includes a printed circuit board assembly (PCBA) 547 electrically connected to the motor 530. The PCBA 547 includes a controller (e.g., one or more microprocessors) and other electronics (e.g., switches, sensors, memory, etc.) to provide operational control for the expansion tool 510.

Figure 10:
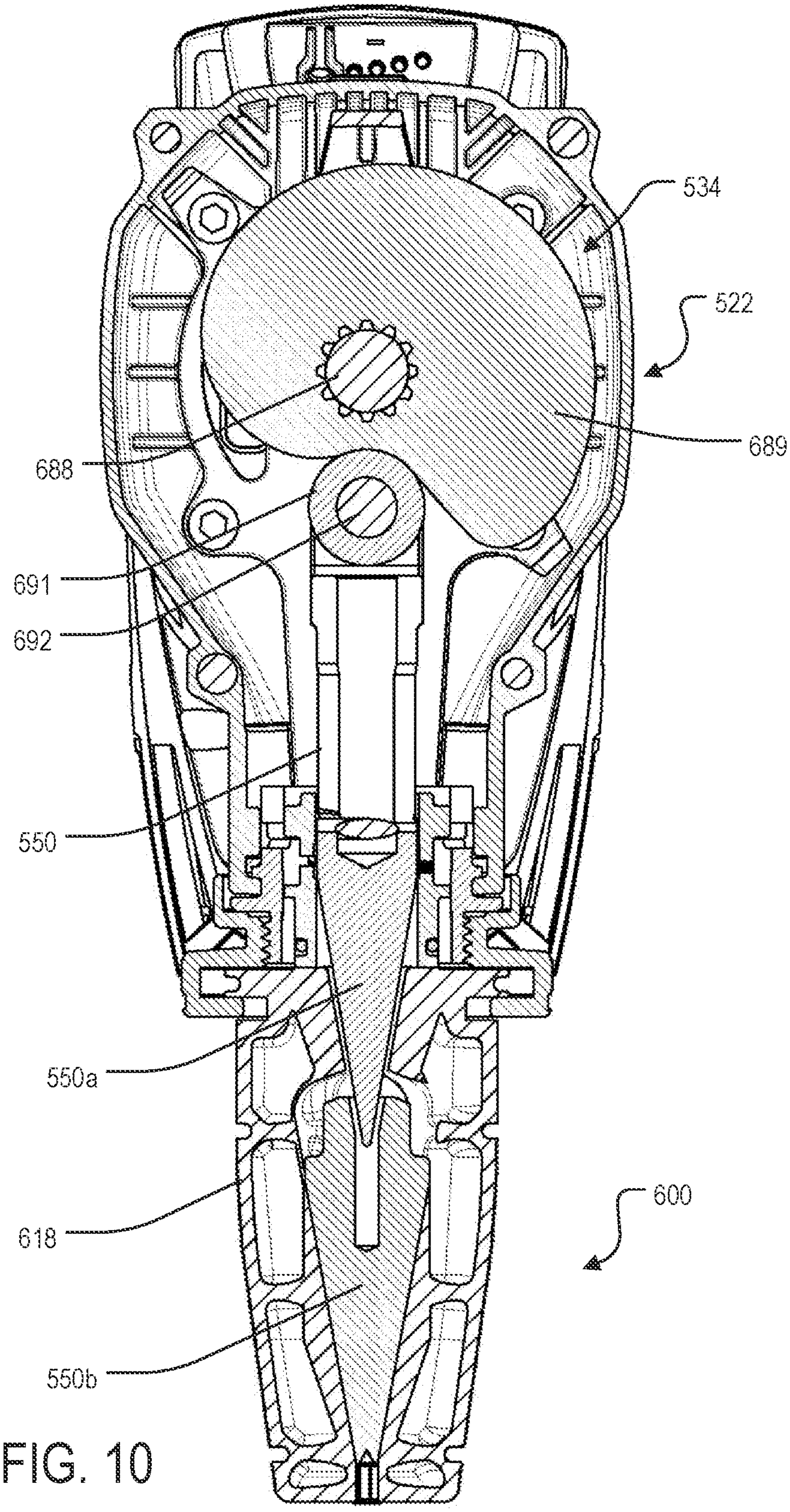
FIG. 10 is a cross-sectional view illustrating a drive mechanism of the expansion tool of FIG. 9, taken along line 10-10 in FIG. 9.

With reference to FIGS. 10 and 11A, a drive casing 522 is coupled to the upper end of the housing 512, above the handle 514 and the motor housing portion 518. The drive casing 522 encloses a drive mechanism 534 that converts a rotational input from the motor 530 into reciprocating movement of a mandrel 550. The illustrated drive mechanism 534 is driven by a multi-stage planetary transmission 576. A drive shaft 688, which is coupled to an output of the transmission 576, is coupled to a rotatable cam 689 of the drive mechanism 534. The cam 689 is engageable with a follower 691, which in turn is coupled to the mandrel 550 via a pin 692 extending vertically through the mandrel 550. Rotation of the cam 689 moves the follower 691 to reciprocate the mandrel 550 along a mandrel axis 554. The cam 689 may be similar to the cam 4 described and illustrated in U.S. Pat. No. 8,763,439 to Milwaukee Electric Tool Corporation, which, as previously indicated, is incorporated herein by reference. The expansion tool 510 may also include a rotation assembly with a rotation collar as described and illustrated in U.S. Pat. No. 8,763,439.

The expansion tool 510 includes a working element 600 with a plurality of jaws 618. The working element 600 may be similar, for example, to the working element 100 described above with reference to FIGS. 5-6. The mandrel 550 is engageable with the jaws 618 as the mandrel 550 moves from a retracted position to an extended position to expand the jaws 618 radially outward from a closed position to an expanded position. In the illustrated embodiment, the mandrel 550 includes a first portion 550*a* and a second portion 550*b* formed separately from the first portion 550*a*. In other embodiments, both portions 550*a*, 550*b* of the mandrel 550 may be integrally formed together as a single piece.

Figure 11B:
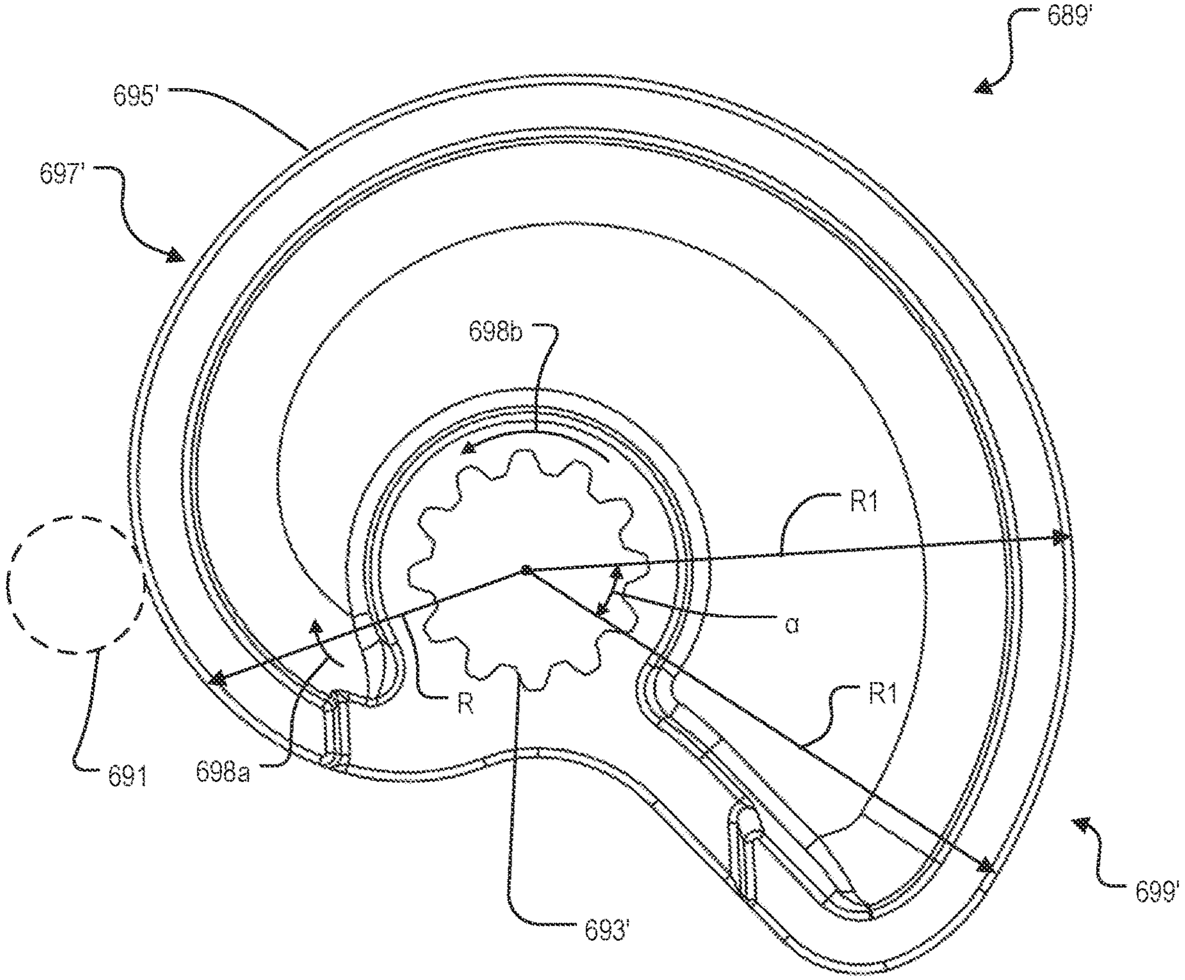
FIG. 11B is a top view of a cam of the drive mechanism of the expansion tool of FIG. 9.

FIG. 11B illustrates a cam 689' that may be incorporated into the drive mechanism 534 of the expansion tool 510 (i.e. as the rotatable cam 689). The cam 689' includes a drive opening 693' and an outer cam surface 695'. The drive opening 693' is configured to receive a rotational input (e.g., via the drive shaft 688 of the transmission 576; FIG. 11A), and the cam surface 695' is engageable with a follower (e.g., the follower 691) to linearly displace the follower in response to rotation of the cam 689'.

With continued reference to FIG. 11B, the cam 689' has a cam radius R (i.e. the transverse distance between the center of the drive opening 693' and a point along the outer cam surface 695') that varies along at least a portion of the circumference of the cam 689'. In the illustrated embodiment, the cam 689' includes a first region 697' in which the cam radius R continuously increases in a first rotational direction 698*a*. The cam 689' further includes a second region 699' in which the cam radius R remains constant in the first rotational direction 698*a*. That is, the cam radius R is equal to a constant value R1 in the second region 699'. In the illustrated embodiment, the second region 699' defines a sector angle $\alpha$ of about 36 degrees, and the second region is disposed adjacent the first region 697'. In other embodiments, the second region 699' may define a sector angle $\alpha$ between about 25 degrees and about 45 degrees.

In operation, to expand an end of a PEX tube, the cam 689' is driven continuously in a second rotational direction 698*b* opposite the first rotational direction 698*a*. The follower 691 travels along the outer cam surface 695', which causes the mandrel (e.g., the mandrel 550; FIG. 10) to reciprocate. Specifically, as the follower 691 travels along the first region 697' of the cam 689', the cam radius R continuously increases, which displaces the follower 691 and the mandrel 550 in a forward direction corresponding with an expansion stroke of the mandrel 550. As the cam 689' continues to rotate, the follower 691 reaches the second region 699'. Because the cam radius R remains a constant R1 along the second region 699', the follower 691 and the mandrel 550 are maintained in their forwardmost position as the follower 691 travels along the second region 699'. Thus, the constant cam radius R1 in the second region 699' of the cam 689' provides a delay or dwell time when the mandrel 550 is in its extended position, prior to beginning to retract.

In some embodiments, the sector angle $\alpha$ and the rotational speed of the cam 689' in the second direction 698*b* provide a dwell time of about 1/10 of a second per rotation of the cam 689'. That is, the mandrel 550 is configured to pause at the extended position for about 1/10 of a second before retracting in each cycle of extension and retraction. This results in improved sealing performance and time to seal when a fitting is placed in the PEX tube after expansion. In other embodiments, the sector angle $\alpha$ and/or the rotational speed of the cam 689' may differ to provide other dwell times that improve sealing performance.

Figure 13:
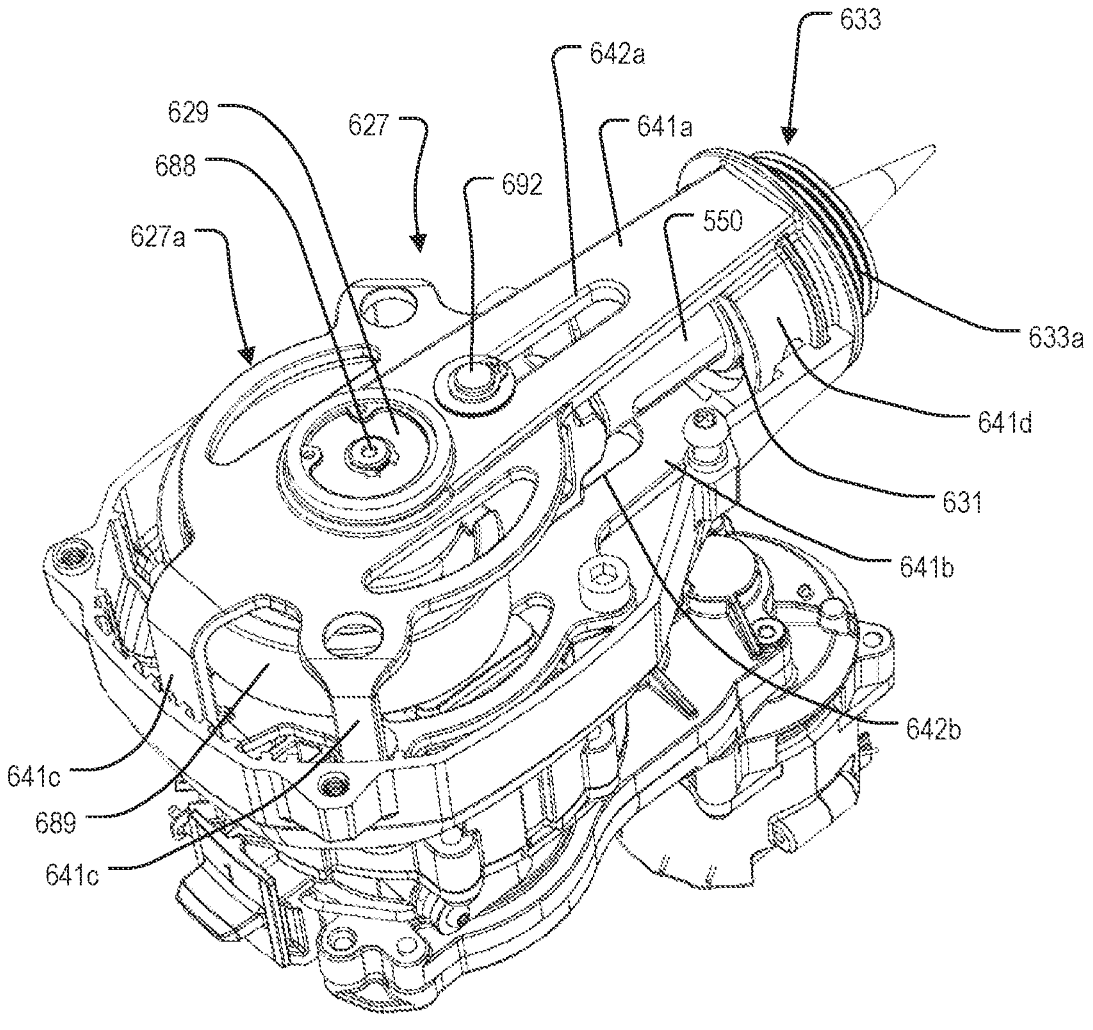
FIG. 13 is a perspective view illustrating a frame of the expansion tool of FIG. 9.
Figure 14:
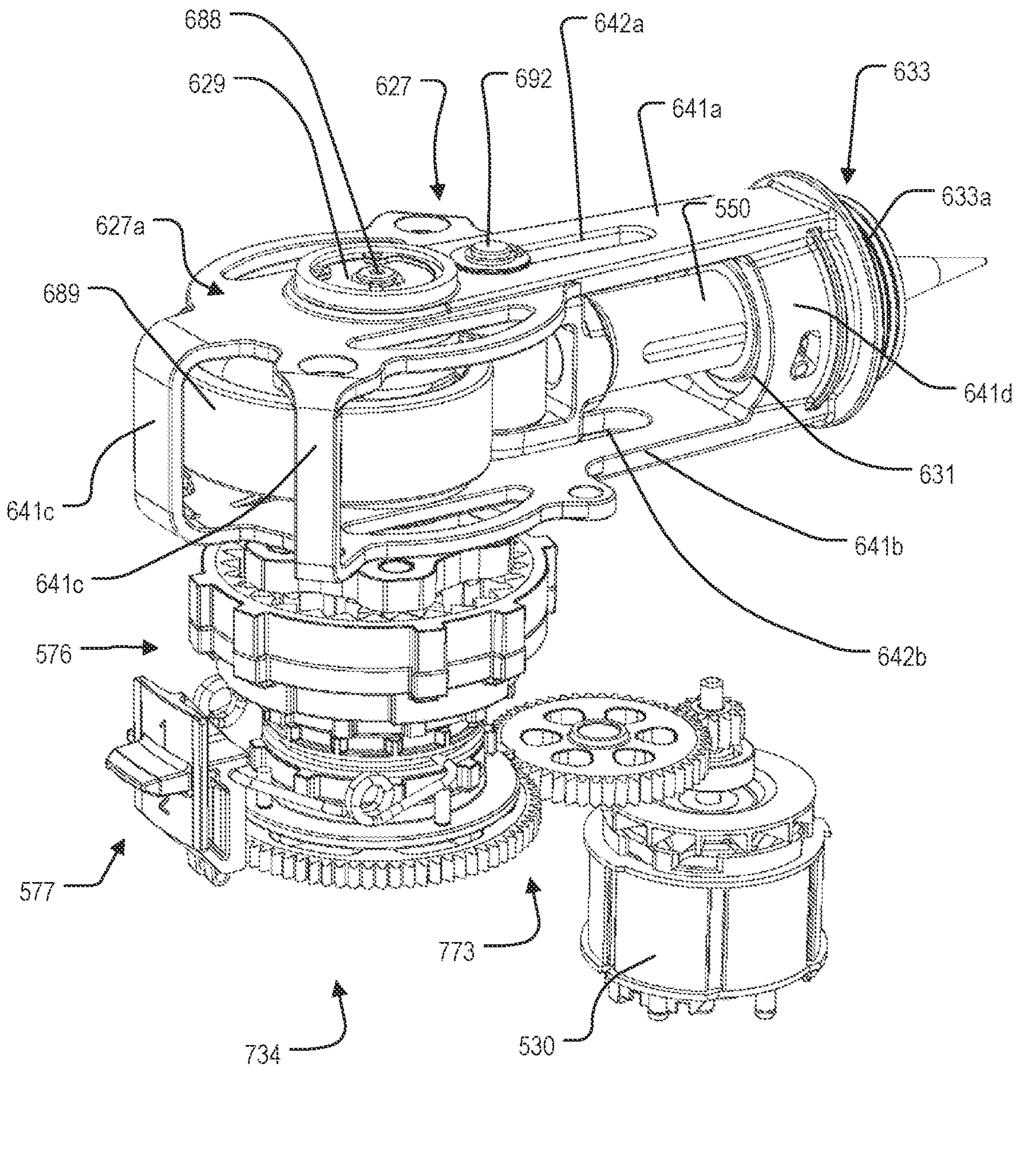
FIG. 14 is a perspective view of the drive mechanism of the expansion tool of FIG. 9, with a gear case of the expansion tool hidden.

With reference to FIGS. 13-14, the expansion tool 510 further includes a frame 627 having a hub 627*a* and a neck 627*b* extending from the hub 627*a*. The hub 627*a* rotatably supports the drive shaft 688 (e.g., via one or more bearings 629 fixed to the hub 627*a*). The neck 627*b* includes an opening 631 through which the mandrel 550 extends. A distal end of the neck 627*b* (opposite the hub 627*a*) includes an attachment portion 633. The working element 600 is removably coupled to the attachment portion 633. In the illustrated embodiment, the attachment portion 633 includes threads 633*a*, and the working element 600 includes a collar 637 surrounding the rear ends of the jaws 618 (FIG. 11A). The collar 637 is threadably coupled to the attachment portion 633 to couple the working element 600 to the expansion tool 510. In other embodiments, the attachment point 633 and the working element 600 may include other cooperating structures for coupling the working element 600 to the attachment point 633.

With continued reference to FIGS. 13-14, the illustrated frame 627 includes an upper plate 641*a*, a lower plate 641*b*, a plurality of connecting elements 641*c*, and a ring 641*d*. The upper plate 641*a* extends parallel to the lower plate 641*b*, and the connecting elements 641*c* and the ring 641*d* interconnect the upper and lower plates 641*a*, 641*b*. The upper plate 641*a* and the lower plate 641*b* each at least partially define the hub 627*a* and the neck 627*b*, and the ring 641*d* defines the opening 631. The cam 689, the follower 691, and the mandrel 550 are each positioned between the upper plate 641*a* and the lower plate 641*b*. The upper plate 641*a* includes a first slot 642*a*, and the lower plate 641*b* includes a second slot 642*b* aligned with the first slot 642*a*. The pin 692 extends through the first and second slots 642*a*, 642*b*. The engagement between the pin 692 and the slots 642*a*, 642*b* may guide movement of the mandrel 550 as the mandrel 550 reciprocates between the extended and retracted positions.

The illustrated frame 627 may be integrally formed as a single piece via any suitable process (e.g., casting, metal injection molding, powdered metal sintering, stamping and bending, machining, or the like). This advantageously minimizes both the cost and weight of the frame 627 (as compared to a multi-part frame secured together with fasteners or the like). In addition, because the frame 627 supports the drive shaft 688 (which in turn supports the cam 689), as well as the working element 600, the axial forces produced during operation of the expansion tool 510 are borne entirely by the frame 627. The housing 512 and drive casing 522 may therefore be advantageously made of thinner, lighter, and/or less expensive materials.

Figure 12:
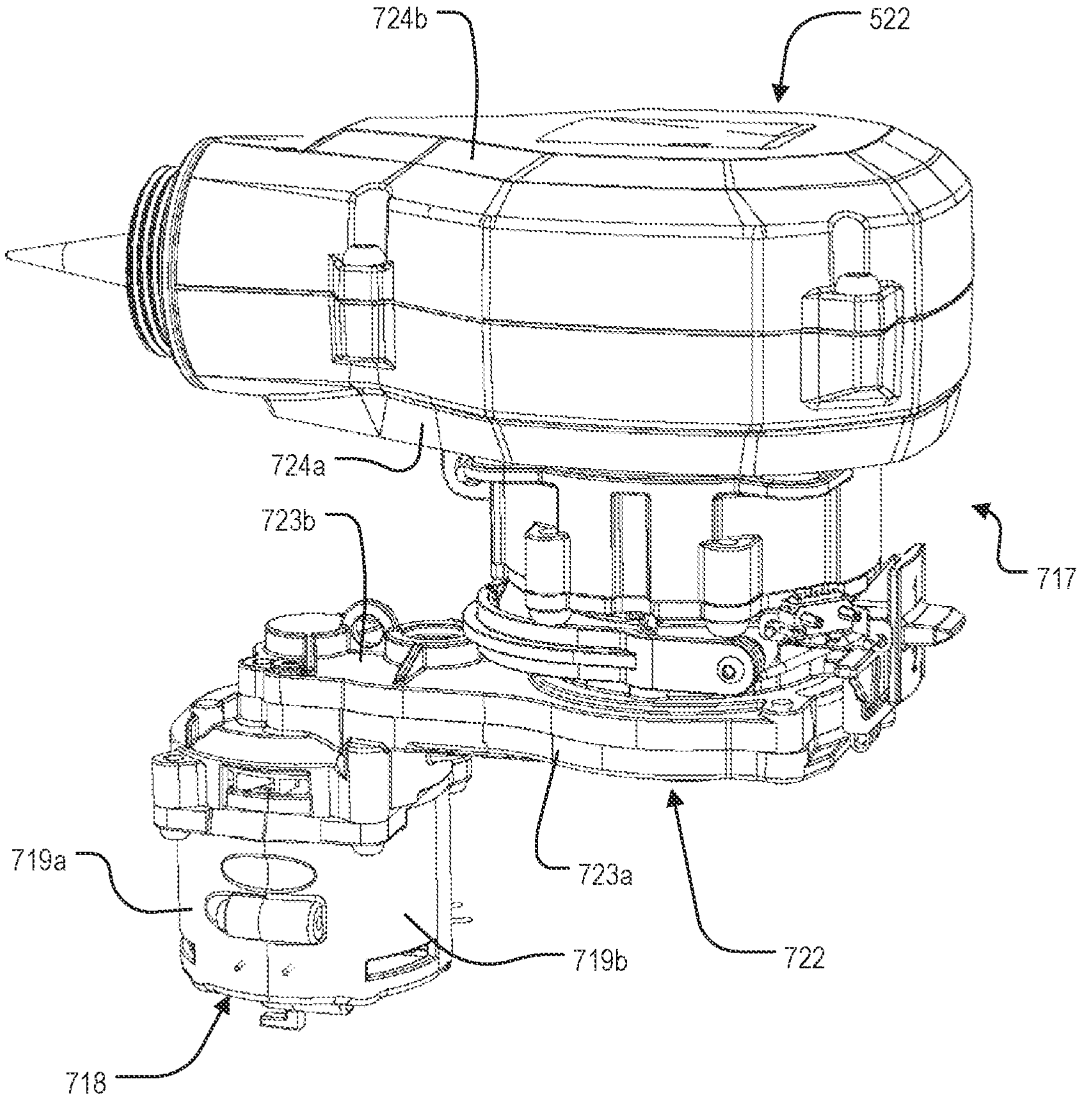
FIG. 12 is a perspective view of a portion of the expansion tool of FIG. 9 with a housing of the expansion tool hidden.

Referring to FIG. 12, the drive casing 522 in the illustrated embodiment is part of a casing assembly 717 that also includes a motor casing 718 and a gear casing 722. The motor casing 718 at least partially encloses and supports the electric motor 530 (FIG. 11A). The illustrated motor casing 718 includes a first motor casing portion 719*a* and a second motor casing portion 719*b* coupled to the first motor casing portion 719*a* (e.g., by fasteners or any other suitable means). The illustrated gear casing 722 includes a first gear casing portion 723*a* and a second gear casing portion 723*b* coupled to the first gear casing portion 723*a* (e.g., by fasteners or any other suitable means). The drive casing 522 includes a first drive casing portion 724*a* and a second drive casing portion 724*b* coupled to the first drive casing portion 724*a* (e.g., by fasteners or any other suitable means). The drive casing 522 and the gear casing 722 are each coupled to the motor casing 718 (e.g., by fasteners or any other suitable means). The multi-part and modular construction of the casing assembly 717 advantageously facilitates manufacturing and assembly.

The illustrated drive mechanism 534 is part of a drive assembly 734 that includes the transmission 576 and a gear assembly 773 operatively coupled between the motor 530 and the transmission 576 (FIG. 14). The gear casing 722 (FIG. 12) at least partially encloses and supports the gear assembly 773.

Figure 15:
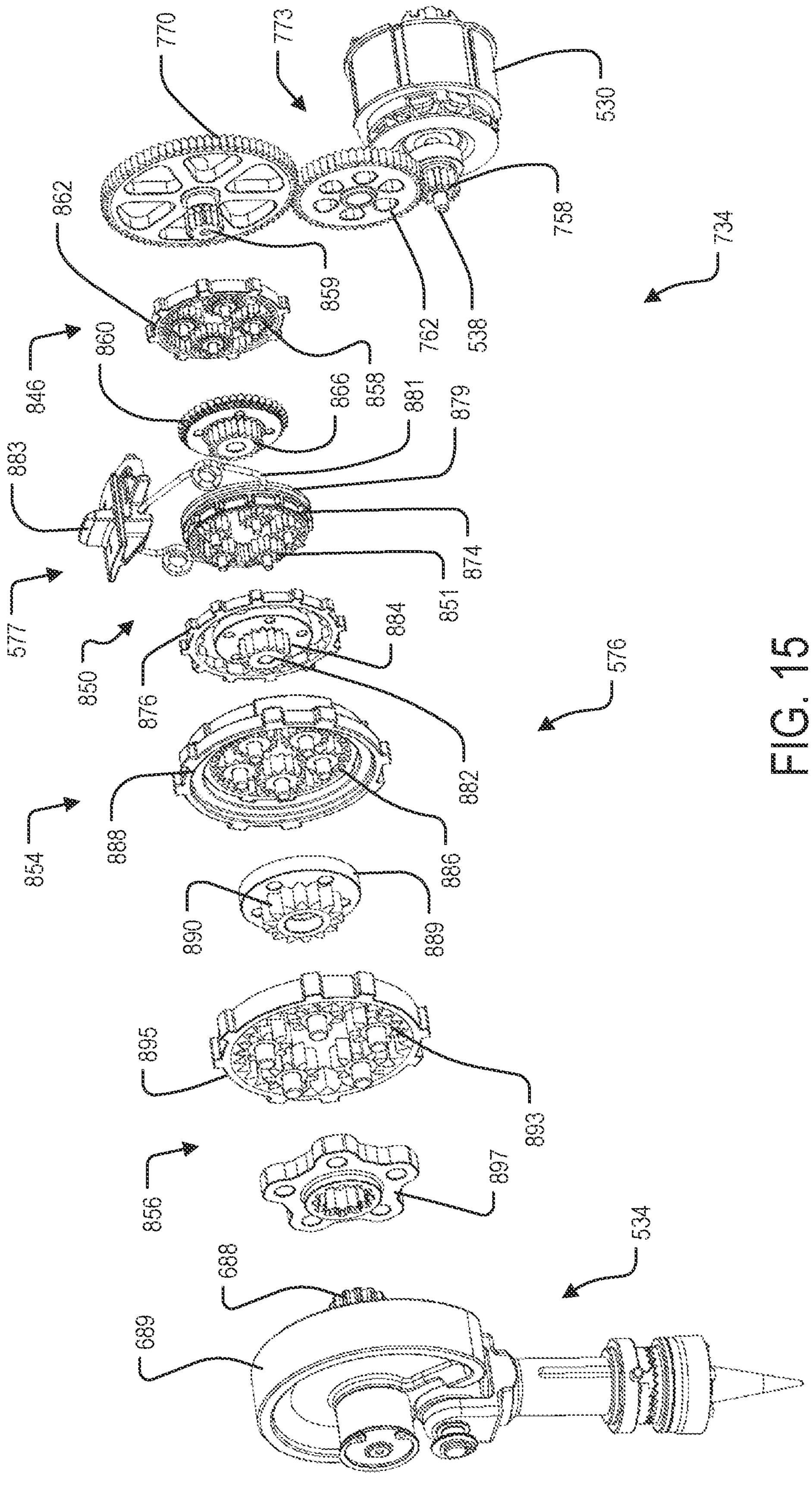
FIG. 15 is an exploded view of the drive mechanism of the expansion tool of FIG. 9.

Referring to FIG. 15, the gear assembly 773 includes a first gear 758 coupled for co-rotation with the motor output shaft 538, a second gear 762 meshed with the first gear 758, and a third gear 770 meshed with the second gear 762. The second gear 762 is larger (and includes a greater number of teeth) than the first gear 758, and the third gear 770 is larger (and includes a greater number of teeth) than the second gear 762. This provides two stages of gear reduction (i.e. speed reduction and torque increase) from the motor shaft 538 to the third gear 770.

The transmission 576 receives a rotational input from the gear assembly 773. In the illustrated embodiment, the transmission 576 is a four-stage planetary transmission having a first stage 846, a second stage 850, a third stage 854, and a fourth stage 856. The transmission 576 also includes a speed selector 577 actuatable to vary a gear ratio of the transmission 576. For example, the speed selector 577 may be actuated between a first or high speed position in which three of the four stages of the planetary transmission 576 provide a gear reduction, and a second or low speed position in which all four stages of the planetary transmission 576 provide a gear reduction. In other embodiments, the planetary transmission 576 may include two stages, three stages, or more than four stages.

In some embodiments, the controller of the expansion tool 510 may be operable to shift the speed selector 577 automatically (e.g., in a response to a direction of rotation of the motor shaft 538). Alternatively, the speed selector 577 may be actuated manually by a user. In yet other embodiments, the transmission 576 may be configured similar to the transmission 76 described above, capable of providing different gear ratios depending on a direction of rotation of the motor shaft 538 without requiring actuation of the speed selector 577. The first stage 846 includes a plurality of first planet gears 858 meshed with a first sun gear 859 that is coupled for co-rotation with the third gear 770 of the gear assembly 773. The first planet gears 858 are also meshed with a first ring gear 862 and coupled to a first carrier 860. The first ring gear 862 is rotationally fixed to the transmission casing 724.

With continued reference to FIG. 15, the second stage 850 includes a second sun gear 866 coupled for co-rotation with the first carrier 860. The second sun gear 866 is meshed with a plurality of second planet gears 851 of the second stage

850. The second planet gears 851 are also meshed with a second ring gear 874 and coupled to a second carrier 884.

The third stage 854 includes a third sun gear 882 coupled for co-rotation with the second carrier 884. The third sun gear 882 is meshed with a plurality of third planet gears 886 of the third stage 854. The third planet gears 886 are also meshed with a third ring gear 888 and coupled to a third carrier 889. The third ring gear 888 is rotationally fixed to the transmission casing 724.

The fourth stage 856 includes a fourth sun gear 890 coupled for co-rotation with the third carrier 889 The fourth sun gear 890 is meshed with a plurality of fourth planet gears 893 of the fourth stage 856. The fourth planet gears 893 are also meshed with a fourth ring gear 895 and coupled to a fourth carrier 897. The fourth ring gear 895 is rotationally fixed to the transmission casing 724. The fourth carrier 897 defines an output member of the transmission 576.

In the illustrated embodiment, the second ring gear 874 is axially movable for selective engagement with a locking ring 876, which in turn is rotationally fixed to the drive casing 522. The second ring gear 874 includes a peripheral groove 879. The shifter 777 includes a pair of resilient arms 881 with ends that are received in the groove 879. The arms 881 are coupled to an actuator 883, such that movement of the actuator 883 results in axial movement of the ring gear 874 relative to the locking ring 876.

In operation, the motor 730 drives the gear assembly 773, which provides a rotational input to the transmission 576. The transmission 576 provides a further gear reduction from the input to the output of the transmission 576. The transmission 576 is operable in a high speed mode when the second ring gear 874 is disengaged from the locking ring 876. This permits the ring gear 874 to rotate relative to the drive casing 522, and the second stage 850 provides no gear reduction. That is, only three of the four planetary stages of the transmission 576 provide a gear reduction in the high speed mode. The actuator 883 is movable to shift the ring gear 874 to a second position in which the second ring gear 874 engages the locking ring 876 to prevent rotation of the ring gear 874. The second stage 850 is thus enabled to provide a gear reduction (along with the other three stages 846, 850, 856) such that the transmission 576 operates in the low speed mode. The shifter 777 may be actuated manually (e.g., by a user manipulating the actuator 883), or in some embodiments, the shifter 777 may be actuated automatically (e.g., in response to a signal from a controller).

The brushless DC motor 530 and the drive assembly 734 of the expansion tool 510 are capable of providing a high expansion force and larger radial expansion capacity compared to typical expansion tools, within a shorter stroke length of the mandrel 550. For example, the illustrated expansion tool 510 may expand a working assembly (e.g., the working assembly 100) by about two inches by displacing the mandrel 550 forward by only about 25 millimeters.

Figure 16:
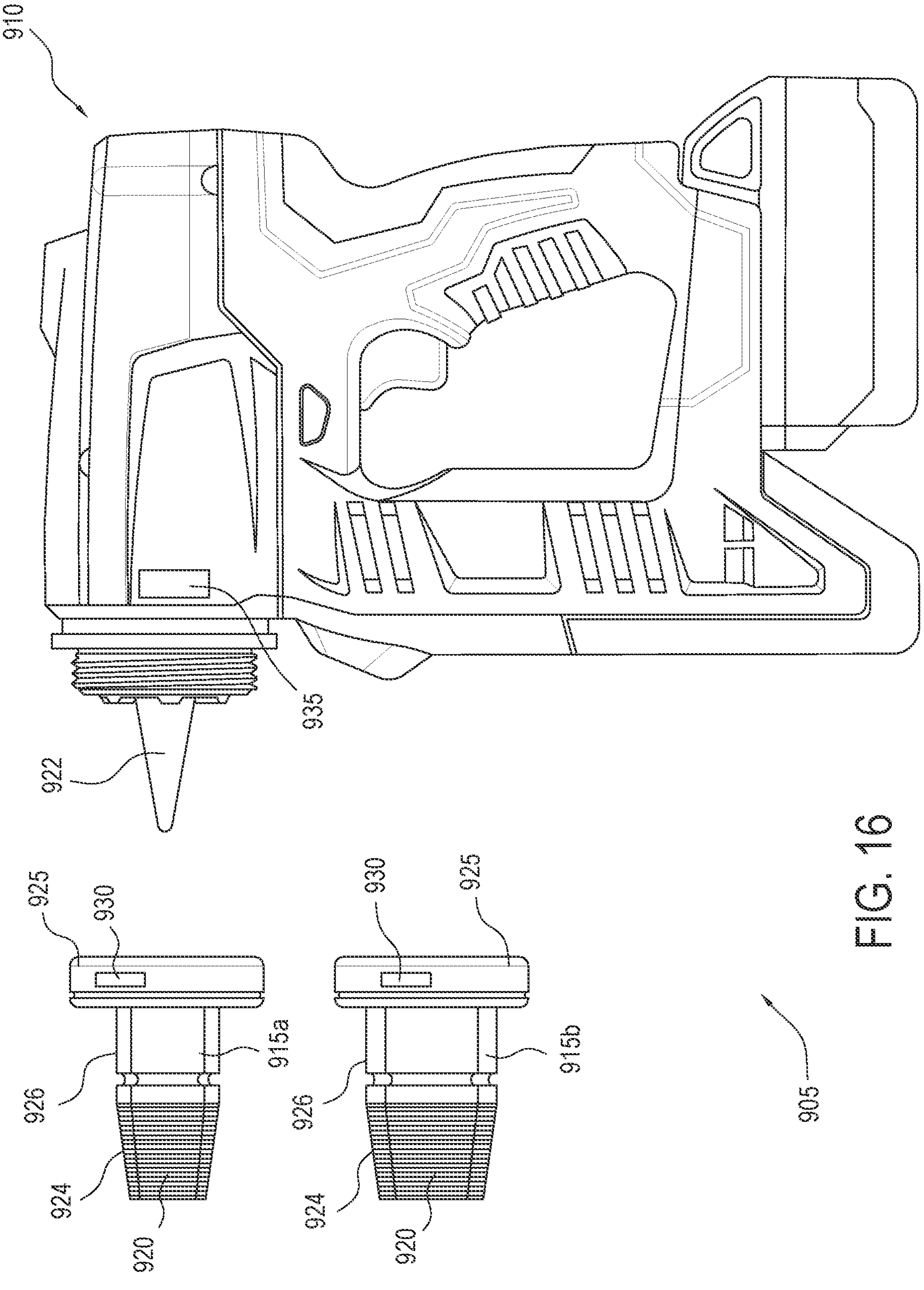
FIG. 16 illustrates an expansion tool system according to an embodiment of the present disclosure.

FIG. 16 illustrates an expansion tool system 905 according to one embodiment. The expansion tool system 905 includes an expansion tool 910 and a plurality of interchangeable heads or working elements 915*a*, 915*b*. The expansion tool 910 may be similar to either of the expansion tools 10, 510 described above with reference to FIGS. 1 and 9, and it should be understood that features and elements of the expansion tool 910 could be incorporated into the expansion tools 10, 510, and vice versa. In the illustrated embodiment, the expansion tool system 905 includes two interchangeable heads 915*a*, 915*b*, but the expansion tool system 905 may include a greater number of interchangeable heads.

Each of the interchangeable heads 915*a*, 915*b* includes a plurality of expandable jaws 920 similar, for example, to the working element 100 described above with reference to FIGS. 6 and 7. In particular, each of the jaws 920 has a tapered portion 924 and a sizing portion 926, and the jaws 920 are expandable in response to reciprocation of a mandrel 922 of the expansion tool 910. Each of the heads 915*a*, 915*b* also includes a quick connection attachment 925, such as the quick connection attachment 400 described above with reference to FIG. 8. In the illustrated embodiment, the interchangeable heads 915*a*, 915*b* are configured to expand different sizes of PEX tubing when coupled to the expansion tool 910. For example, the first head 915*a* may be configured to expand ½-inch PEX tubing, and the second head 915*b* may be configured to expand ¾-inch PEX tubing. In other embodiments, the expansion tool system 905 may include other heads configured to expand other sizes of PEX tubing (e.g., ⅜-inch, 1-inch, etc.). In yet other embodiments, the expansion tool system 905 may include other heads configured to perform other operations (e.g., crimping, cutting, etc.).

Figure 17A:
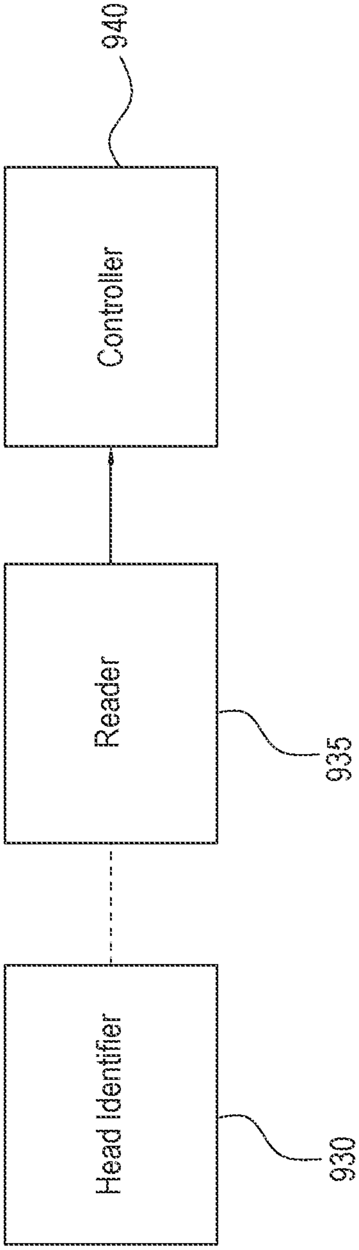
FIG. 17A is a control schematic of the expansion tool system of FIG. 16.

Each of the heads 915*a*, 915*b* further includes an identifier 930 that interacts with a sensor or reader 935 on the expansion tool 910. The expansion tool 910 includes a controller 940 in communication with the reader 935 (FIG. 17A). When one of the heads 915*a*, 915*b* is coupled to the expansion tool 910, the identifier 930 provides identifying information to the reader 935. The reader 935 communicates the identifying information to the controller 940, which then uses the identifying information to determine which type of head 915*a*, 915*b* is coupled to the expansion tool 910.

In some embodiments, the identifier 930 includes an active or passive RFID tag that stores the identifying information (e.g., a serial number, size, etc.), and the reader 935 includes an RFID reader that obtains the identifying information from the RFID tag. In other embodiments, the identifier 930 includes a magnetic element, and the reader 935 includes a Hall-effect sensor that obtains identifying information from the magnetic element (e.g., by measuring the field strength, characteristics, or placement of the magnetic element). In other embodiments, the identifier 930 includes one or more symbols, and the reader 935 includes an optical sensor that obtains the identifying information from the symbols.

In some embodiments, the identifier 930 may electronically store the identifying information and communicate the identifying information to the reader 935 via a BLUETOOTH wireless transmission protocol, wireless networking, radio frequencies, or any other suitable wireless communication means. In other embodiments, the identifier may electronically store the identifying information and communicate the identifying information to the reader 935 by a wired connection or via engagement between electrical contacts. In yet other embodiments, the identifier 930 may include a physical feature (e.g., a keyed projection or recess) containing the identifying information, and the reader 935 may include switches (e.g., dip switches), pressure sensors, electrical conductors, or the like in order to obtain the identifying information from the physical feature.

The controller 940 includes a plurality of electrical and electronic components (not shown) that provide power, operational control, and protection to the components and modules within the controller 940. For example, the controller 940 may include, among other things, an electronic processor (e.g., a programmable microprocessor, microcontroller, or similar device), non-transitory, machine-readable memory, and an input/output interface that provides for communication between the controller 940, the reader 935, and other components of the expansion tool 910. The electronic processor is communicatively coupled to the memory and configured to retrieve from memory and execute, among other things, instructions related to the control processes and methods described herein. In other embodiments, the controller 940 may include additional, fewer, or different components.

In operation, the user couples one of the interchangeable heads 915*a*, 915*b* to the expansion tool 510. The identifier 930 on the selected head 915*a*, 915*b* communicates the identifying information to the reader 935 on the expansion tool 910. The controller 940 receives the identifying information from the reader 935 and determines the type of head 915*a*, 915*b* that is coupled to the expansion tool 910 based on the identifying information. The controller 940 may then control one or more operating parameters of the expansion tool 910 to automatically optimize operation of the tool 910 for expanding PEX tubing of the size associated with each respective head 915*a*, 915*b*.

For example, the controller 940 may control operation of the expansion tool 910 in similar ways as the controller of the expansion tool 10 described above, but with various operating parameters being controlled based on the type of head 915*a*, 915*b* coupled to the expansion tool 910. In particular, the controller 940 may control the cycle time TC of the expansion tool 910 by varying the speed of the motor and/or shifting the transmission between different speed settings. As such, the controller 940 may increase or decrease the first time period T1 for extending the mandrel 922, and increase or decrease the second time period T2 for retracting the mandrel 922. In some embodiments, the controller 940 may automatically increase the cycle time TC when a head configured to expand larger diameter PEX tubing (e.g., the head 915*b*) is coupled to the expansion tool 910, and the controller 940 may decrease the cycle time TC when a head configured to expand smaller diameter PEX tubing (e.g., the head 915*a*) is coupled to the expansion tool.

In some embodiments, the controller may also optimize the performance of the expansion tool by varying a number of cycles, revolutions of the motor shaft, ending position of the mandrel 922, stroke length of the mandrel 922, or the like, to expand the PEX tubing to a predetermined expansion that is determined based on the type of head 915*a*, 915*b* coupled to the expansion tool 910.

In some embodiments, the expansion tool system 905 may include interchangeable heads that correspond with different ambient operating temperatures. For example, a first head may be configured for use in a first ambient temperature range (e.g., between 40 degrees Fahrenheit and 80 degrees Fahrenheit), and a second head may be configured for use in a second, colder ambient temperature range (e.g., between 0 degrees Fahrenheit and 40 degrees Fahrenheit). In some embodiments, a third head may be provided and configured for use in a third, warmer ambient temperature range (e.g., between 80 degrees Fahrenheit and 120 degrees Fahrenheit). In other embodiments, a different number of interchangeable heads may be provided corresponding with different temperature ranges.

In such embodiments, each of the heads is configured to expand the same nominal size of PEX tubing, but the sizing portions 926 of the respective heads define slightly different diameters. In particular, the sizing portions 926 of the first head define a first diameter, the second head (for cold temperatures) define a second diameter less than the first diameter, and the third head (for hot temperatures) define a third diameter greater than the first diameter. For example, each of the heads may be configured to expand ½-inch nominal diameter PEX tubing. The sizing portions 926 of the first head define a diameter of about 18.3 mm, the sizing portions 926 of the second head define a diameter of about 17.3 mm, and the sizing portions 926 of the third head define a diameter of about 19.3 mm.

Because the expansion and recovery behavior of PEX tubing is temperature dependent, the expansion tool system 905 may advantageously provide a user with consistent PEX expansion/recovery performance by including interchangeable heads that correspond with different operating temperature ranges. That is, the slightly smaller diameter of the second head results in less expansion of the PEX tubing, which reduces sealing time at low temperatures. Similarly, the slightly larger diameter of the third head results in more expansion of the PEX tubing to give the user sufficient time to insert the fitting.

In some embodiments, the interchangeable heads for different temperature ranges may also include identifiers 930 that communicate with the reader 935 of the expansion tool 910 to allow the controller 940 to determine which type of head is attached to the expansion tool 910. The controller 940 may then adjust one or more operating parameters of the expansion tool 910 (e.g., stroke length, speed, number of strokes, etc.) in order to further optimize expansion performance in different temperature ranges.

Figure 17B:
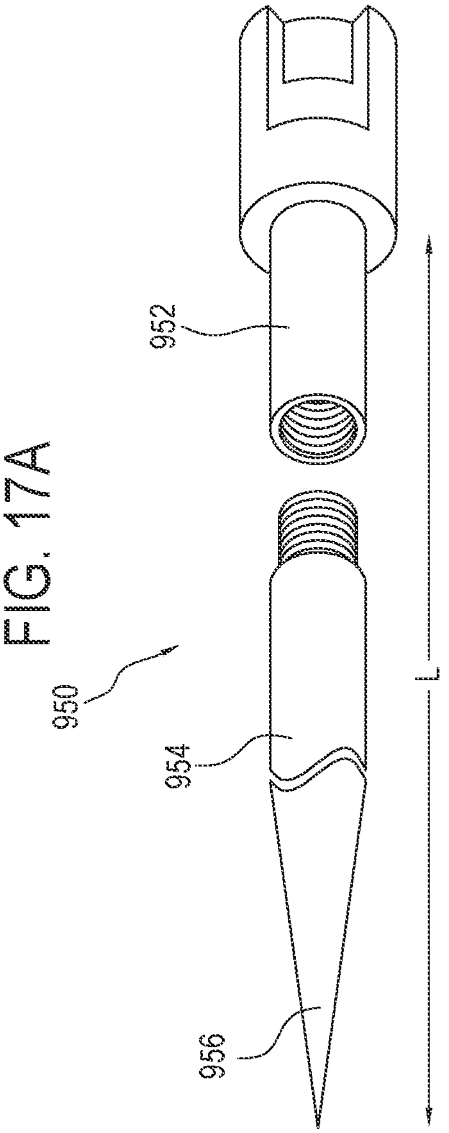
FIG. 17B illustrates an adjustable mandrel assembly according to an embodiment of the present disclosure.

With reference to FIG. 17B, in some embodiments, the expansion tool 910 may include an adjustable mandrel assembly 950. The mandrel assembly 950 includes a first portion 952 coupled to a drive assembly of the expansion tool 910 and a second portion 954 coupled to the first portion 952. The second portion 954 includes an angled outer surface 956 that is engageable with the jaws 920 (FIG. 16) to expand the jaws 920.

In the illustrated embodiment, the second portion 954 is threadably coupled to the first portion 952. As such, relative rotation between the first portion 952 and the second portion 954 causes the second portion 954 to move linearly relative to the first portion 952, thereby increasing or decreasing the overall length L of the mandrel assembly 950. In other embodiments, the second portion 954 may be coupled to the first portion 952 in other ways that permit selective adjustment of the overall length L of the mandrel assembly 950. For example, the first portion 952 may include one or more detents, set screws, or the like engageable with corresponding recesses on the second portion 954 to define different overall lengths L of the mandrel assembly 950.

The adjustable mandrel assembly 950 advantageously allows an operator of the expansion tool 910 to adjust the characteristics and extent of expansion imparted by the expansion tool 910. That is, by increasing the overall length L of the mandrel assembly 950, the angled outer surface 956 of the second portion 954 will engage the jaws 920 earlier in the forward stroke of the mandrel assembly 950 and expand the jaws 920 radially outward by a greater distance. Likewise, by decreasing the overall length L of the mandrel assembly 950, the angled outer surface 956 of the second portion 954 will engage the jaws 920 later in the forward stroke of the mandrel assembly 950 and expand the jaws 920 radially outward by a lesser distance.

In some embodiments, the expansion tool 910 may be configured to automatically adjust the overall length L of the mandrel assembly 950 in response to different heads (e.g., 915*a*, 915*b*; FIG. 16) being coupled to the expansion tool 910. As such, the expansion characteristics of the tool 910 may be varied to best suit a particular size of head 915*a*, 915*b*.

Figure 18:
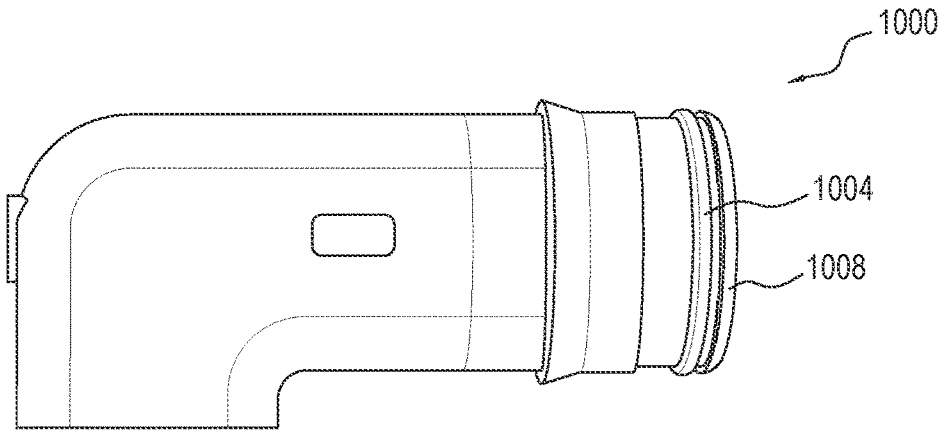
FIG. 18 is a side view of a PEX tubing fitting according to an embodiment of the present disclosure.

FIG. 18 illustrates a fitting 1000 configured to be inserted within PEX tubing (e.g., by first expanding the tubing using the expansion tool 10, 510, or 910). The fitting 1000 includes an O-ring 1004 positioned adjacent an insertion end 1008 of the fitting 1000. The O-ring 1004 may be made of rubber, nitrile, polyurethane, or any other suitable resilient material. The fitting 1000 may be configured as an elbow fitting, a tee fitting, an adapter, or any other type of PEX fitting. Although only a single O-ring 1004 is illustrated, the fitting 1000 may include multiple insertion ends 1008, each with a respective O-Ring 1004.

Figure 19:
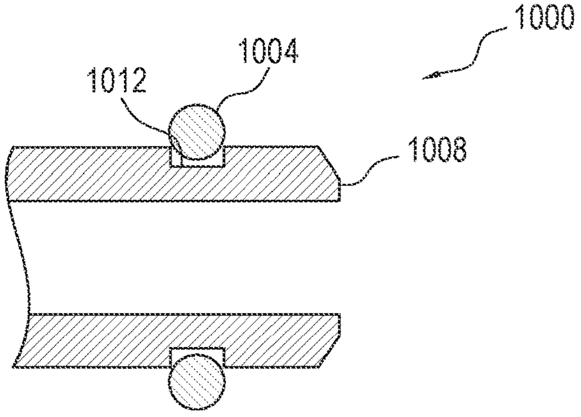
FIG. 19 is a cross-sectional view of a PEX tubing fitting according to another embodiment.
Figure 20:
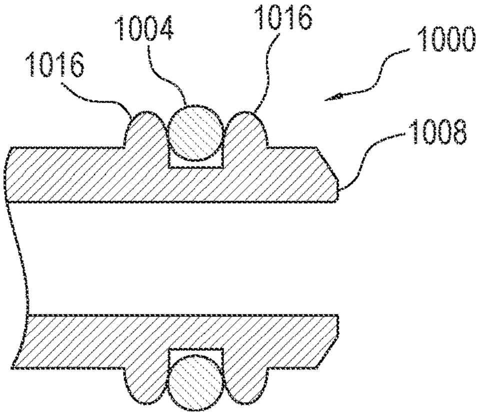
FIG. 20 is a cross-sectional view of a PEX tubing fitting according to another embodiment.
Figure 21:
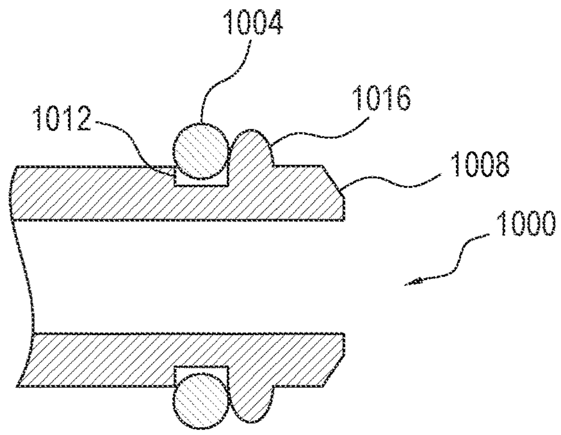
FIG. 21 is a cross-sectional view of a PEX tubing fitting according to another embodiment.

Referring to FIGS. 19-21, the insertion end 1008 of the fitting 1000 may be chamfered to facilitate inserting the fitting 1000 into PEX tubing. In addition, the fitting 1000 may include one or more radial projections or ridges 1016, one or more grooves 1012, or a combination of ridges 1016 and grooves 1012. For example, in one embodiment, the O-ring 1004 is seated in a groove 1012, which retains the O-ring 1004 in position on the fitting 1000 (FIG. 19). In another embodiment, the O-ring 1004 is positioned between two spaced projections 1016 (FIG. 20). The projections 1016 retain the O-ring 1004 in position on the fitting 1000, and may also strengthen the connection between the fitting 1000 and the PEX tubing. In yet another embodiment, the O-ring 1004 is seated in a groove 1012 and adjacent a projection 1016 (FIG. 21). The groove 1012 retains the O-ring 1004 in position, and the projection 1016 both retains the O-ring 1004 and may also strengthen the connection between the fitting 1000 and the PEX tubing.

In use, a PEX tubing segment is expanded (e.g., using the expansion tool 10 or the expansion tool 510 as described above). Once the tubing segment is expanded, the insertion end 1008 of the fitting 1000 is inserted into the open end of the tubing. The tubing then elastically recovers around the fitting 1000 and creates a seal. The O-ring 1004 is sized such that when the PEX tubing is in the expanded state there is a minimal interference or slight clearance between the inner wall of the tubing and the O-ring 1004 as the user presses the fitting 1000 into the tubing. The tubing then shrinks due to elastic recovery to create a tight seal.

The inventors have found that the O-ring 1004 advantageously reduces the amount of time required for the PEX tubing to seal around the fitting 1000. In order to test that a fitting is sealed after the fitting has been inserted into the PEX tubing, a user may pressurize the PEX tubing and place the PEX tubing under water. When the PEX tubing is not sealed, bubbles will come out of the fitting. Therefore, once there are no bubbles coming out of the fitting, the fitting is sealed. Testing showed that typical fittings (not including an O-Ring) seal within half an hour to six hours. However, the fitting 1000 with the O-Ring 1004 created a seal in about five minutes or less.

Figure 22:
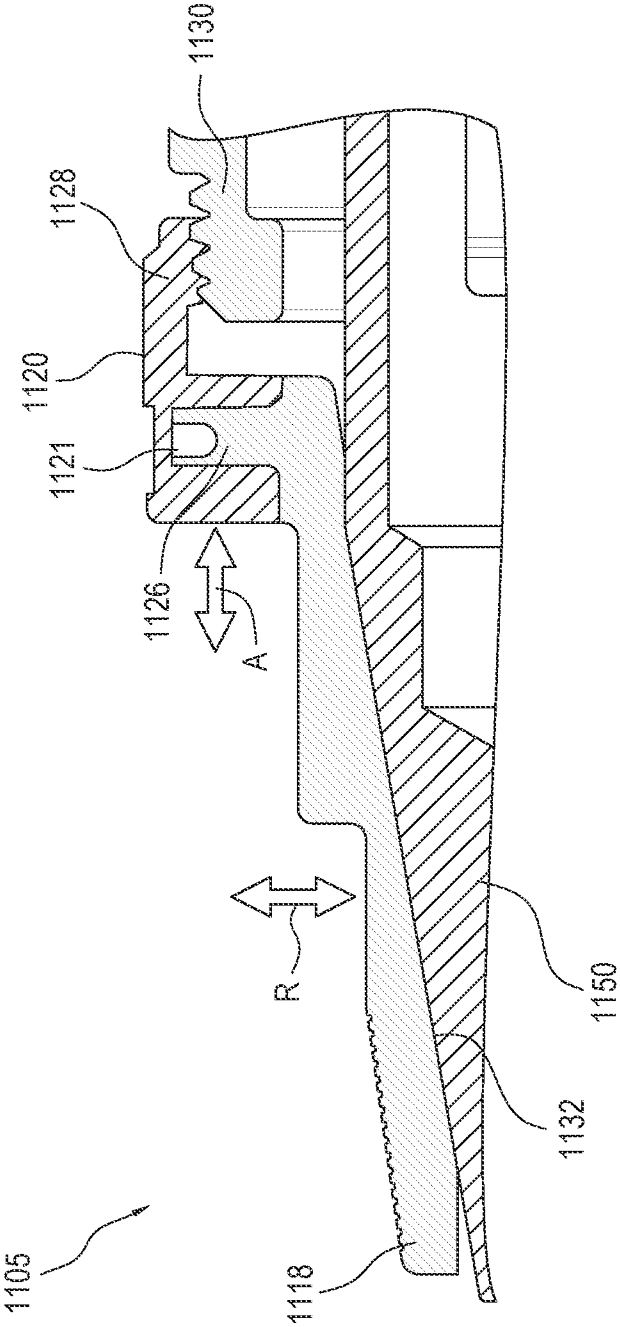
FIG. 22 is a cross-sectional view illustrating a portion of a head assembly according to an embodiment of the present disclosure.

FIG. 22 illustrates a head assembly 1105 according to another embodiment, which may be incorporated into an expansion tool, such as any of the expansion tools 10, 510, 910 described above. The illustrated head assembly 1105 includes a plurality of jaws 1118 and a collar 1120 with an annular groove 1121 that receives a radial projection 1126 extending from each of the jaws 1118. The collar 1120 further includes an internally threaded portion 1128 adjacent the annular groove 1121. The internally threaded portion 1128 of the collar 1120 is coupled to an externally threaded portion 1130 of the expansion tool.

Each of the jaws 1118 includes an angled interior surface 1132 that is engageable with a mandrel 1150 of the expansion tool to expand that jaws 1118. The collar 1120 may be rotated to adjust a position of the jaws 1118 relative to the housing of the expansion tool in an axial direction A. That is, rotation of the collar 1120 in a first direction causes the collar 1120 and the jaws 1118 to move axially toward the housing, and rotation of the collar 1120 in a second, opposite direction causes the collar 1120 and the jaws 1118 to move axially away from the housing. The distance the jaws 1118 expand in a radial direction R in response to extension of the mandrel 1150 (by a fixed distance) can thus be varied by rotating the collar 1120 and varying the axial position of the jaws 1118 relative to the housing.

The illustrated head assembly 1105 thus allows a user to adjust the expansion distance of the jaws 1118 to a desired setting. In some embodiments, the collar 1120 and/or the housing of the expansion tool may include indicia that represent a cold operating mode, a normal operating mode, and a warm operating mode, thereby facilitating adjustment of the radial expansion distance to correspond with different ambient operating conditions. In some embodiments, the collar 1120 and/or the housing of the expansion tool may include cooperating detents and recesses to provide tactile feedback to the user and to retain the collar 1120 when the collar 1120 reaches a position corresponding with the cold operating mode, the normal operating mode, or the warm operating mode.

Figure 23:
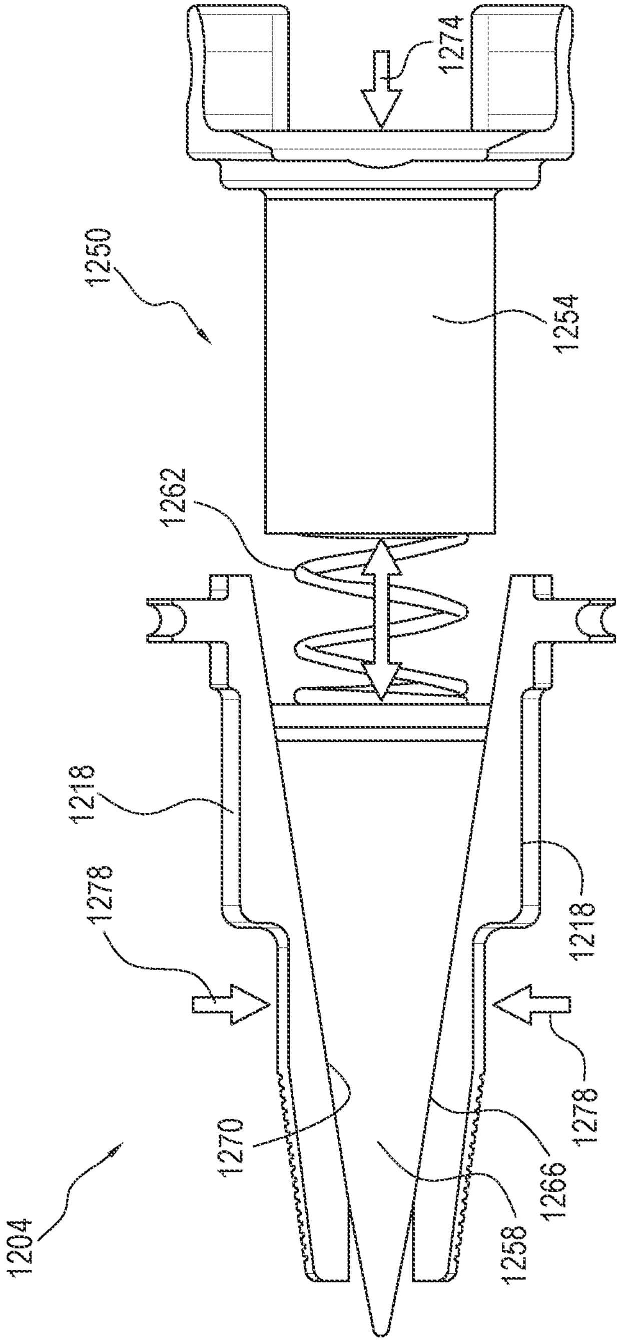
FIG. 23 is a side view of a temperature compensation assembly according to an embodiment of the present disclosure.

FIG. 23 illustrates a temperature compensation assembly 1204 that may be incorporated into an expansion tool, such as any of the expansion tools 10, 510, 910 described above. The temperature compensation assembly 1204 includes a plurality of jaws 1218 and mandrel assembly 1250. The mandrel assembly 1250 includes a drive engaging portion 1254, a jaw engaging portion 1258, and a spring 1262 extending between the drive engaging portion 1254 and the jaw engaging portion 1258.

With continued reference to FIG. 23, the drive engaging portion 1254 is configured to be coupled to a drive assembly of the expansion tool (not shown), which imparts a reciprocating motion to the drive engaging portion 1254. The spring 1262 interconnects the drive engaging portion 1254 and the jaw engaging portion 1258, such that the reciprocating motion of the drive engaging portion 1254 is transmitted to the jaw engaging portion 1258 via the spring 1262. The jaw engaging portion 1258 includes an obliquely oriented exterior surface 1266 configured to engage an angled interior surface 1270 of each of the jaws 1218, such that the jaws 1218 are expanded radially outward in response to forward movement of the jaw engaging portion 1258 in the direction of arrow 1274.

During operation, when the jaws 1218 are inserted into the end of a PEX tube and expanded, the PEX tubing resists expansion and exerts radially inward reaction forces 1278 on the jaws 1218. This reaction force produces an axial force component on the jaw engaging portion 1258, which causes the spring 1262 to compress a distance equal to the axial force component divided by the rate of the spring 1262. In other words, the compression of the spring 1262 is proportional to the expansion resistance of the PEX tube.

PEX tubing is temperature sensitive. That is, PEX tubing requires more force to expand at cold temperatures than at warmer temperatures. In addition, as discussed above, cold PEX tubing recovers from expansion more slowly than warmer PEX tubing, and it may be desirable to expand colder PEX tubing to a lesser extent in order to speed up recovery time required to seal around an inserted fitting.

Because the compression of the spring 1262 is proportional to the expansion resistance of the PEX tubing, the mandrel assembly 1250 automatically adjusts the forward stroke length in response to variations in the temperature (and thus, the expansion resistance) of the PEX tubing. That is, the spring 1262 compresses a greater amount when the PEX tubing being expanded is cold and offers greater resistance. Thus, the stroke length is shortened (the jaw engaging portion 1258 does not move as far in the forward direction 1274), and the jaws 1218 are expanded radially outward to a smaller effective diameter. This reduced expansion results in a faster recovery time required to seal around an inserted fitting. Conversely, the spring 1262 compresses a lesser amount when the PEX tubing being expanded is warm and offers less resistance. Thus, the stroke length is increased (the jaw engaging portion 1258 moves further in the forward direction 1274 due to the longer length of the spring 1262), and the jaws 1218 are expanded radially outward to a larger effective diameter. This increased expansion provides the user with sufficient time to insert a fitting into the PEX tubing before it recovers.

Figure 24B:
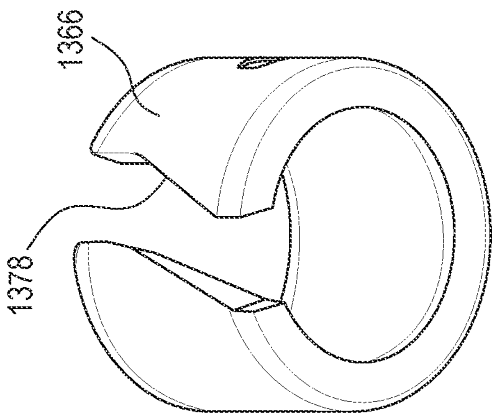
FIG. 24B is a perspective view of a collar of the automatic rotation assembly of FIG. 24A.
Figure 24A:
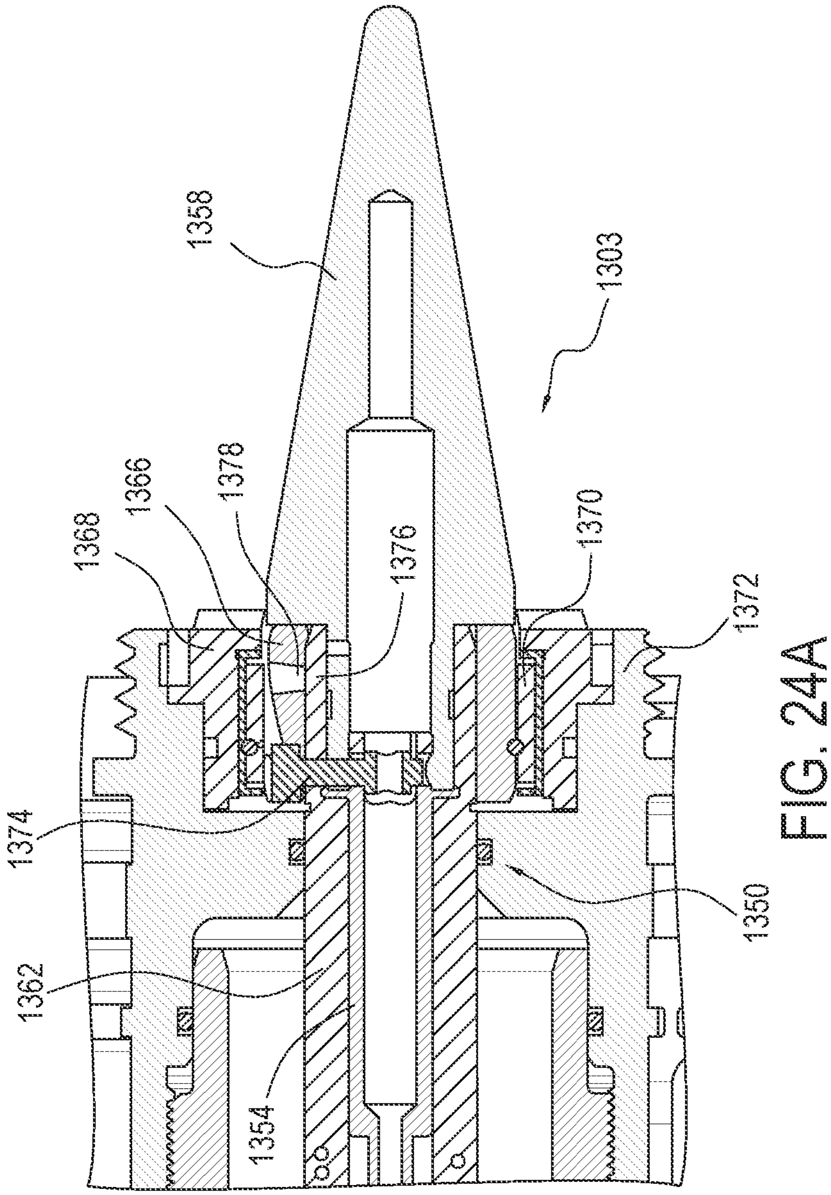
FIG. 24A is a cross-sectional view of an automatic rotation assembly according to an embodiment of the present disclosure.

FIG. 24A illustrates an automatic rotation assembly 1303 that may be incorporated into an expansion tool, such as any of the expansion tools 10, 510, 910 described above. The illustrated automatic rotation assembly 1303 includes a mandrel assembly 1350, a sleeve 1362, a collar 1366, and a jaw mounting ring 1368.

The mandrel assembly 1350 includes a drive engaging portion 1354 and a jaw engaging portion 1358. The drive engaging portion 1354 is configured to be coupled to a drive assembly (not shown) of the expansion tool, which imparts a reciprocating motion to the drive engaging portion 1354. The jaw engaging portion 1358 is coupled to the drive engaging portion 1354 for reciprocation therewith relative to the sleeve 1362. The sleeve 1362 surrounds the drive engaging portion 1354 and a rear portion of the jaw engaging portion 1358. The collar 1366 surrounds a front portion of the sleeve 1362.

With continued reference to FIG. 24A, the collar 1366 is coupled to the jaw mounting ring 1368 by a sprag clutch or one-way bearing 1370, and the jaw mounting ring 1368 is rotatably coupled to a front portion of a housing 1372 of the expansion tool. The jaw mounting ring 1368 is coupled to the rear ends of a plurality of jaws (not shown), such that the jaws are rotationally fixed to the ring 1368 but movable in a radial direction relative to the ring 1368 (e.g., in response to reciprocation of the mandrel assembly 1350). Accordingly, rotation of the collar 1366 in a first direction (i.e. a locked direction of the bearing 1370) causes rotation of the jaw mounting ring 1368 and the jaws relative to the housing 1372. Rotation of the collar 1366 in a second direction opposite the first direction (i.e. an unlocked direction of the bearing 1370) does not rotate the jaw mounting ring 1368 and the jaws, since the collar 1366 is rotatable relative to the jaw mounting ring 1368 in the second direction.

The automatic rotation assembly 1303 further includes a pin 1374 fixed to the mandrel assembly 1350 for reciprocation therewith. The pin 1374 extends radially outward through a slot 1376 in the sleeve 1362 and into a helical groove 1378 formed in the collar 1366 (FIG. 24B). The pin 1374 is engageable with the helical groove 1378 to rotate the collar 1366 in response to reciprocating movement of the mandrel assembly 1350 (FIG. 24A).

In operation, the mandrel assembly 1350 is driven forward by a drive assembly of the expansion tool. As the mandrel assembly 1350 moves forward, the pin 1374 engages the helical groove 1378 and rotates the collar 1366 in the first direction. Because the bearing 1370 is locked in the first direction, the bearing 1370, the jaw mounting ring 1368, and the jaws rotate together with the collar 1366 an angular distance determined by the geometry of the helical groove 1378. The jaw engaging portion 1358 of the mandrel assembly 1350 bears against the jaws to expand the jaws radially outward.

When the mandrel assembly 1350 reaches the end of its forward stroke, it reverses direction and begins to retract. As the mandrel assembly 1350 moves rearward, the pin 1374 engages the helical groove 1378 and rotates the collar 1366 in the second direction. Because the bearing 1370 is unlocked in the second direction, the collar 1366 rotates relative to the jaw mounting ring 1368, and the angular position of the jaws remains unchanged until the mandrel assembly 1350 begins its next forward stroke.

The automatic rotation assembly 1303 thus provides for automatic incremental rotation of the jaws during the extension of the mandrel assembly 1350. In other embodiments, the one way bearing 1370 may be reversed, such that the automatic rotation assembly 1303 may provide for automatic incremental rotation of the jaws during retraction of the mandrel assembly 1350.

In some embodiments, the collar 1366, the bearing 1370, the jaw mounting ring 1368, and the jaws may all be part of a removable and interchangeable head (such as the interchangeable heads 915*a*, 915*b* described above with reference to FIG. 16). In such embodiments, the helical groove 1378 may have a different geometry for each interchangeable head to provide a different amount of automatic rotation. As such, heads of different sizes (i.e. heads configured to expand PEX tubing of different nominal diameters) can be automatically rotated different amounts when coupled to the expansion tool to optimize performance.

Figure 25:
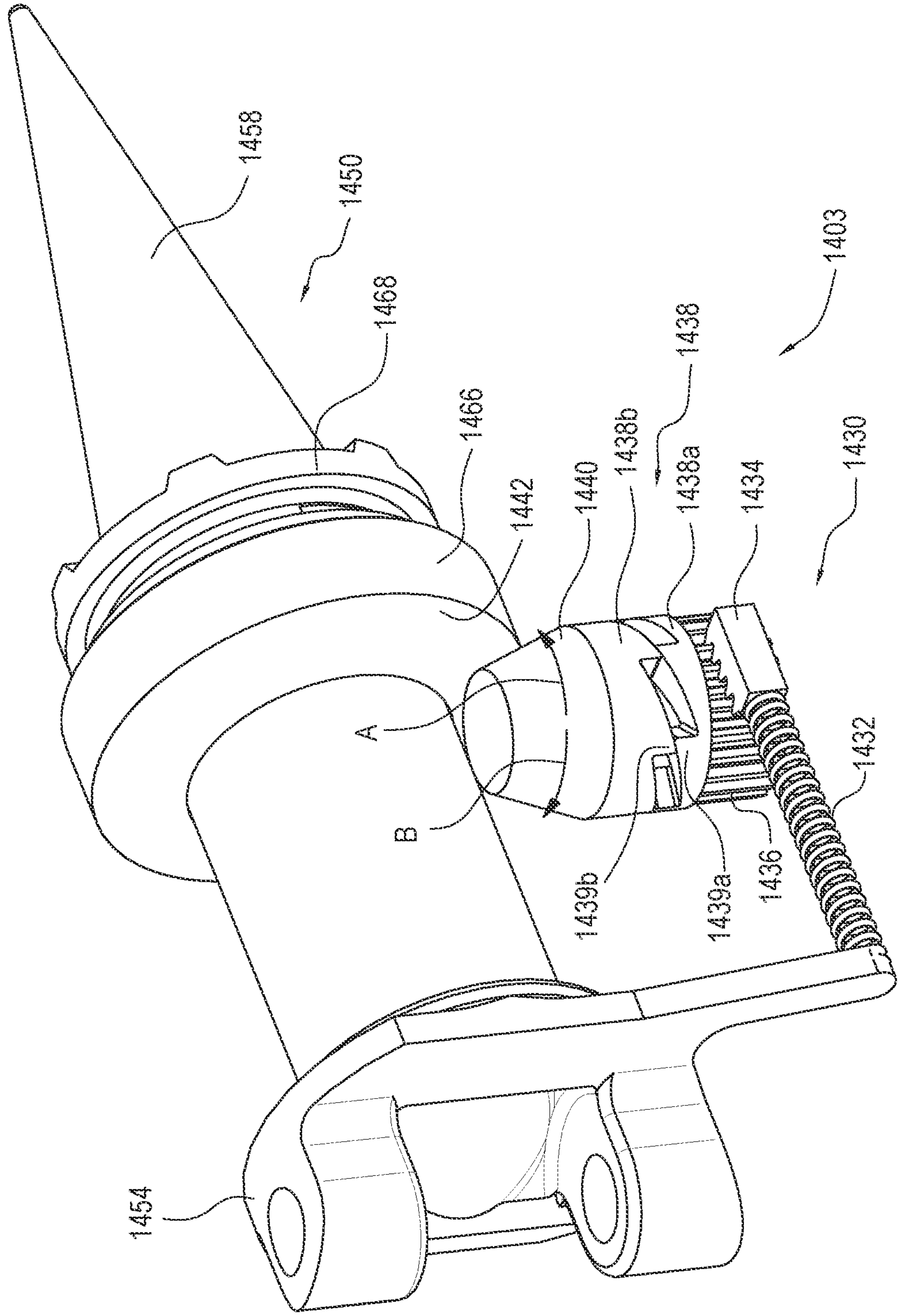
FIG. 25 is a perspective view of an automatic rotation assembly according to another embodiment of the present disclosure.

FIG. 25 illustrates an automatic rotation assembly 1403 according to another embodiment, which may be incorporated into an expansion tool, such as any of the expansion tools 10, 510, 910 described above. The illustrated automatic rotation assembly 1403 includes a rotating assembly 1430, a mandrel assembly 1450, a collar 1466, and a jaw mounting ring 1468.

The mandrel assembly 1450 includes a drive engaging portion 1454 and a jaw engaging portion 1458. The drive engaging portion 1454 is configured to be coupled to a drive assembly (not shown) of the expansion tool, which imparts a reciprocating motion to the drive engaging portion 1454. The jaw engaging portion 1458 is coupled to the drive engaging portion 1454 for reciprocation therewith relative to the collar 1466 and the jaw mounting ring 1468.

With continued reference to FIG. 25, the collar 1466 is coupled to the jaw mounting ring 1468 for co-rotation therewith. In some embodiments, the collar 1466 and the jaw mounting ring 1468 may be integrally formed together as a single component. The collar 1466 and the jaw mounting ring 1468 are rotatably coupled to a front portion of a housing of the expansion tool (not shown). The jaw mounting ring 1468 is coupled to the rear ends of a plurality of jaws (not shown), such that the jaws are rotationally fixed to the ring 1468 but movable in a radial direction relative to the ring 1468 (e.g., in response to reciprocation of the mandrel assembly 1450). Accordingly, rotation of the collar 1466 and the jaw mounting ring 1468 rotates the jaws relative to the housing.

In the illustrated embodiment, the rotating assembly 1430 includes a spring 1432, a rack gear 1434, a pinion 1436, a one-way clutch 1438, a first bevel gear 1440, and a second bevel gear 1442. The spring 1432 extends between and interconnects the drive engaging portion 1454 of the mandrel assembly 1450 and the rack gear 1434. As such, the rack gear 1434 is movable with the drive engaging portion 1454 unless the rack gear 1434 encounters resistance sufficient to compress the spring 1432, which protects the rotating assembly 1430 in case the rotating assembly 1430 jams or encounters a hard stop.

The rack gear 1434 is meshed with the pinion 1436, such that linear movement of the rack gear 1434 (in response to reciprocation of the mandrel assembly 1450) rotates the pinion 1436. The pinion 1436 includes a first portion 1438*a* of the clutch 1438 with a first plurality of teeth 1439*a*, and the first bevel gear 1440 includes a second portion 1438*b* of the clutch 1438 with a second plurality of teeth 1439*b*. The first bevel gear 1440 is meshed with the second bevel gear 1442 such that rotation of the first bevel gear 1440 rotates the collar 1466, the ring 1468, and the jaws.

The clutch 1438 includes a clutch spring (not shown) that biases the first and second portions 1438*a* 1438*b* of the clutch 1438 into engagement. The clutch 1438 is configured such that rotation of the pinion 1436 and the first portion 1438*a* in a first direction A causes the second portion 1438*b* and the first bevel gear 1440 to co-rotate in the first direction, via engagement of the teeth 1439*a*, 1439*b*. Rotation of the pinion 1436 and the first portion 1438*a* in a second direction B opposite the first direction causes the teeth 1439*a*, 1439*b* to slide relative to each other, displacing the second portion 1438*b* of the clutch 1438 against the biasing force of the clutch spring. Thus, the clutch 1438 transmits torque from the pinion 1436 to the first bevel gear 1440 (to rotate the jaws) only in the first direction A.

In operation, the mandrel assembly 1450 is driven forward by a drive assembly of the expansion tool. As the mandrel assembly 1450 moves forward, the spring 1432 moves the rack gear 1434 forward, which rotates the pinion 1436 in the first direction A. The teeth 1439*a*, 1439*b* engage to rotate the first bevel gear 1440 in the first direction A, which in turn rotates the collar 1366, the jaw mounting ring 1368, and the jaws an angular distance determined by the gear ratio of the bevel gears 1440, 1442. The jaw engaging portion 1458 of the mandrel assembly 1450 bears against the jaws to expand the jaws radially outward.

When the mandrel assembly 1450 reaches the end of its forward stroke, it reverses direction and begins to retract. As the mandrel assembly 1450 moves rearward, the spring 1432 moves the rack gear 1434 rearward, which rotates the pinion 1436 in the second direction B. The teeth 1439*a*, 1439*b* slip, such that the pinion 1436 can rotate relative to the first bevel gear 1440. As such, the angular position of the jaws remains unchanged until the mandrel assembly 1450 begins its next forward stroke.

The automatic rotation assembly 1403 thus provides for automatic incremental rotation of the jaws during the extension of the mandrel assembly 1450. In other embodiments, the clutch 1438 may be reversed, such that the automatic rotation assembly 1403 may provide for automatic incremental rotation of the jaws during retraction of the mandrel assembly 1450.

In some embodiments, the collar 1466, the bevel gears 1440, 1442, the jaw mounting ring 1468, and the jaws may all be part of a removable and interchangeable head (such as the interchangeable heads 915*a*, 915*b* described above with reference to FIG. 16). In such embodiments, the bevel gears 1440, 1442 may have a different gear ratios for each interchangeable head to provide a different amount of automatic rotation. As such, heads of different sizes (i.e. heads configured to expand PEX tubing of different nominal diameters) can be automatically rotated different amounts when coupled to the expansion tool to optimize performance.

Figure 26:
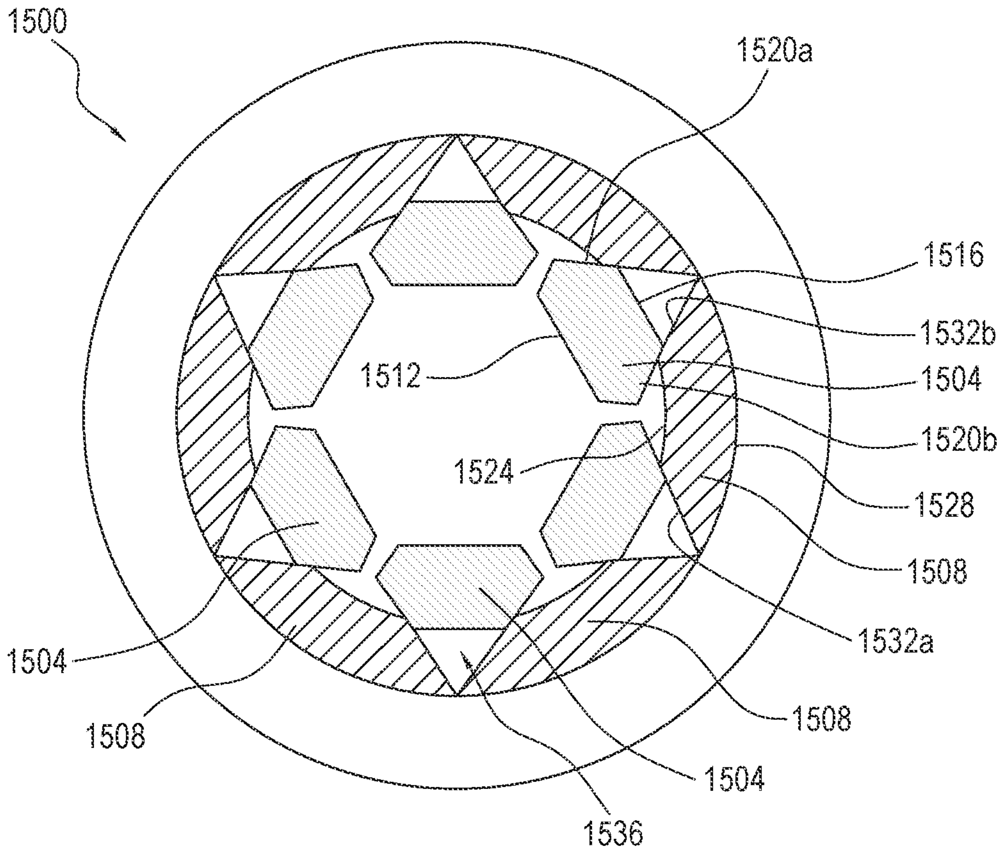
FIG. 26 is a cross-sectional view of a working element according to another embodiment of the present disclosure.

FIG. 26 illustrates a working element 1500 that may be incorporated into an expansion tool, such as any of the expansion tools 10, 510, 910 described above. The illustrated working element includes a plurality of first jaw segments 1504 and a plurality of second jaw segments 1508 arranged concentrically with the first jaw segments 1504. When the jaw segments 1504, 1508 are in a retracted position, as illustrated in FIG. 26, the first jaw segments 1504 are disposed radially inward of the second jaw segments 1508.

Each of the first jaw segments 1504 includes an inward facing surface 1512, an outward facing surface 1516, and first and second angled surfaces 1520*a*, 1520*b* that extend between the inward and outward facing surfaces 1512, 1516 at oblique angles. Each of the second jaw segments 1508 includes an inward facing surface 1524, an outward facing surface 1528, and first and second angled surfaces 1532*a*, 1532*b* that extend between the inward an outward facing surfaces 1524, 1528 at oblique angles.

During an expansion operation, a mandrel of an expansion tool (not shown) bears against the inward facing surfaces 1512 of the first jaw segments 1504 to force the first jaw segments 1504 radially outward. The angled surfaces 1520*a*, 1520*b* of each first jaw segment 1504 bear against and slide along the angled surfaces 1532*a*, 1532*b* of adjacent second jaw segments 1508 to force the second jaw segments 1508 radially outward. As the second jaw segments 1508 move radially outward, each of the first jaw segments 1504 fills a space 1536 defined between adjacent second jaw segments 1508.

Expansion continues until the outward facing surfaces 1512 of the first jaw segments 1504 are positioned substantially flush with the outward facing surfaces 1528 of the second jaw segments 1508, and the outward facing surfaces 1512, 1528 together engage an interior of a PEX tube to be expanded. That is, the outward facing surface 1512, 1528 together to form one, substantially continuous outer circumference of the working element 1500 when the working element 1500 is expanded. This advantageously provides for more even expansion (and therefore more consistent recovery and sealing of the PEX tube around an inserted fitting) compared to other working elements that have gaps between adjacent jaws when the jaws are expanded.

Figure 27:
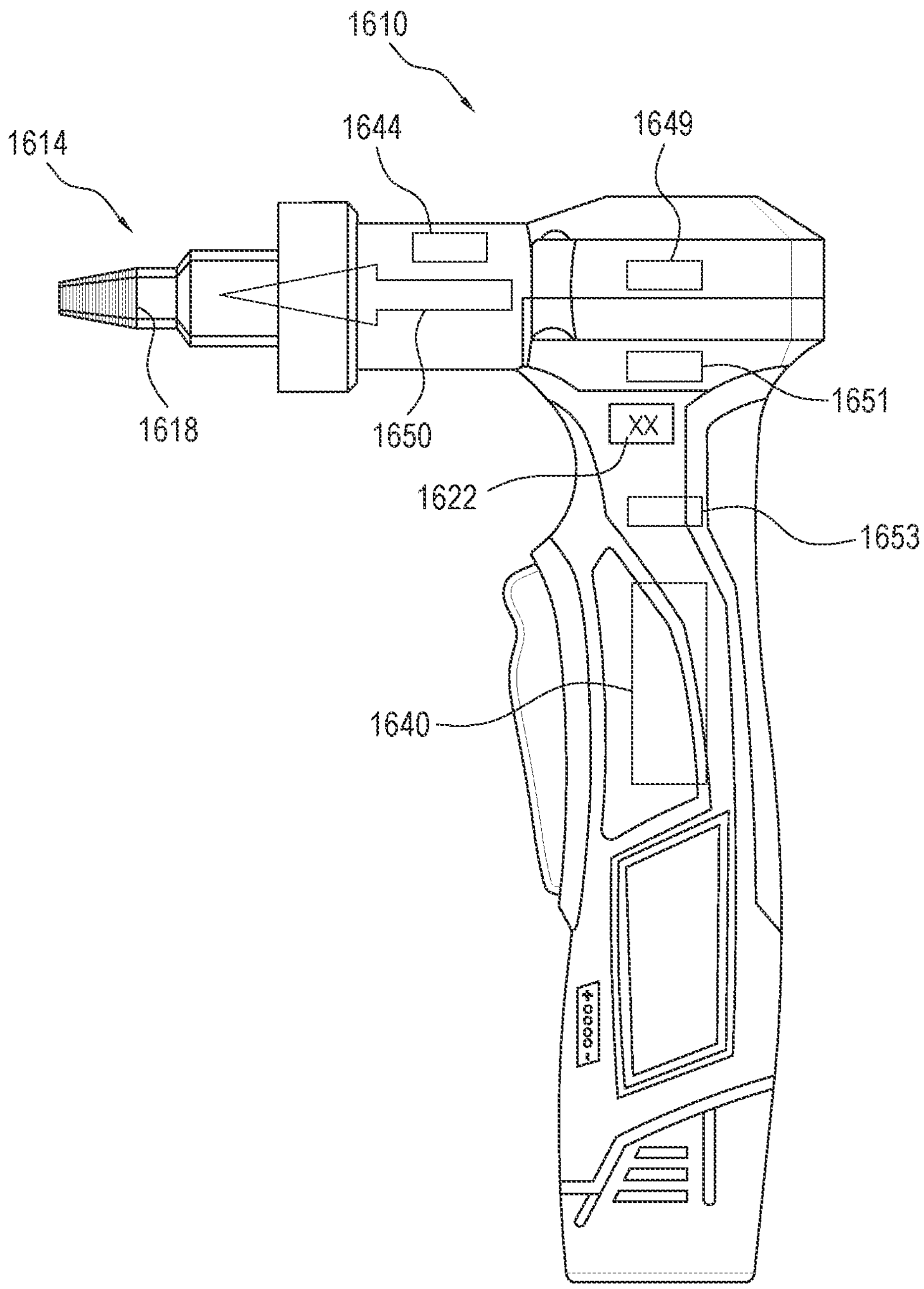
FIG. 27 is a side view of an expansion tool including a rotation counter according to an embodiment of the present disclosure.

FIG. 27 illustrates an expansion tool 1610 according to another embodiment of the present disclosure. The illustrated expansion tool 1610 is similar to the expansion tools 10, 510, 910 described above, and the following description focuses on certain differences between the expansion tool 1610 and the expansion tools 10, 510, 910. In addition, it should be understood that features and elements of the expansion tool 1610 may be incorporated into any of the other expansion tools 10, 510, 910 described herein.

The illustrated expansion tool 1610 includes a working element 1614 with a plurality of jaws 1618. A mandrel 1650 is driven in a reciprocating manner to gradually expand the jaws 1618, and the jaws 1618 are configured to incrementally rotate during operation of the expansion tool 1610. A rotation counter 1622 is provided on the expansion tool 1610 to provide an operator of the expansion tool 1610 with an indication of how many rotations the jaws 1618 have made or how many expansion cycles have occurred during an expansion operation. The operator may use this indication from the rotation counter 1622 in order to determine when the expansion operation is completed.

In some embodiments, the rotation counter 1622 may include a digital indicator that is incremented by a controller 1640 of the expansion tool 1610, in response to feedback from one or more sensors. For example, in some embodiments, a first sensor 1644 is located proximate the mandrel 1650 to detect when the mandrel 1650 reaches an extended position and/or returns to a home position. In some embodiments, the rotation counter 1622 may be incremented by the controller each time the mandrel 1650 returns to the home position, as determined by the sensor 1644. The first sensor 1644 may be a Hall effect sensor responsive to a magnetic element coupled to the mandrel 1650. In other embodiments, the first sensor 1644 may include an optical sensor, switch, or any other position sensor capable of determining when the mandrel 1650 reaches a particular position.

In some embodiments, the expansion tool 1610 may include a drive mechanism with a cam (e.g., the cam 689 described above with reference to FIG. 10). In such embodiments, a second sensor 1649 may be located proximate the cam 689 to detect rotation of the cam 689. For example, in some embodiments, the second sensor 1649 detects each complete rotation of the cam 689 and communicates the rotation of the cam 689 to the controller 1640, which then increments the rotation counter 1622 accordingly. The second sensor 1649 may be a Hall effect sensor responsive to a magnetic element coupled to the cam 689. In other embodiments, the second sensor 1649 may be a rotary encoder or any other sensor capable of detecting rotation of the cam 689.

In some embodiments, the drive mechanism of the expansion tool 1610 may include a third sensor 1651 (e.g., a Hall effect sensor, rotary encoder, optical sensor, switch, or the like) located proximate a transmission (e.g., the transmission 576 described above with reference to FIG. 11A), a motor (e.g., the motor 530 described above with reference to FIG. 9), or any other rotating part of the drive mechanism of the expansion tool 1610. In such embodiments, the controller 1640 may monitor the third sensor 1651 in order to increment the rotation counter 1622.

In some embodiments, the expansion tool 1610 may include a fourth sensor 1653 configured to monitor the current drawn by the motor 530 during an expansion operation. The controller 1640 may communicate with the fourth sensor 1653 to identify how many rotations or expansion cycles have been completed based on the current drawn by the motor 530, and then increment the counter 1622 accordingly. For example, the current may increase during the expansion stroke of the mandrel 1650, then decrease when the mandrel 1650 begins to retract. In some embodiments, the controller 1640 may determine an amount of current drawn by the motor 530 over a period of time during the expansion operation and compare this value with a predetermined value corresponding with a completed pressing operation.

The expansion tool 1610 may include any of the first sensor 1644, the second sensor 1649, the third sensor 1651, and the fourth sensor 1653 individually. In other embodiments, the expansion tool 1610 may include any combination of the sensors 1644, 1649, 1651, 1653, or the expansion tool 1610 may include all of the sensors 1644, 1649, 1651, 1653.

The number of rotations tracked by the controller 1640 and displayed on the rotation counter 1622 may be used to control aspects of the expansion tool 1610. For example, in one embodiment, the controller 1640 may automatically halt operation of the expansion tool 1610 when the number of rotations reaches a predetermined threshold, indicating that expansion is completed. In some embodiments, the rotation counter 1622 may be manually or automatically reset after the expansion operation is completed. In other embodiments, the rotation counter 1622 may be omitted, and the controller 1640 may still control aspects of the expansion tool 1610 based on feedback from any or all of the sensors 1644, 1649, 1651, 1653.

Figure 28:
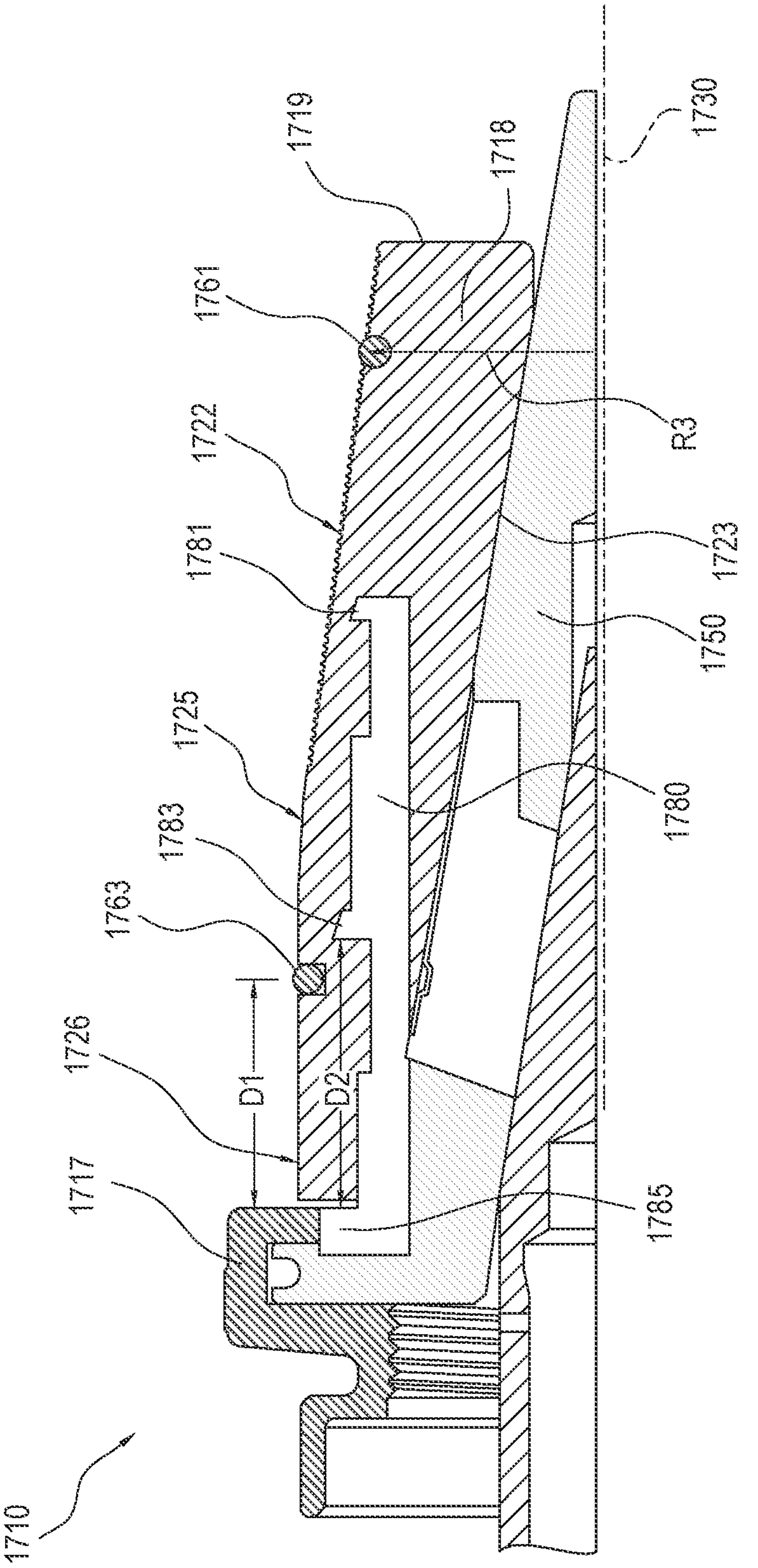
FIG. 28 illustrates a portion of a head assembly according to another embodiment of the present disclosure.

FIG. 28 illustrates a portion of working element or head 1700 according to another embodiment of the present disclosure. The head 1700 includes a plurality of jaws 1718 (only one of which is illustrated in FIG. 28) secured to an expansion tool (such as any of the expansion tools described above) by a collar 1717. Each of the jaws 1718 has a distal end 1719 configured to be inserted into the open end of a PEX tube to be expanded and an external tapered portion 1722 extending from the distal end 1719. An internal tapered portion 1723 extends along the interior of each jaw 1718, and the internal tapered portion 1723 is engageable with a mandrel 1750 of the expansion tool to expand the jaws 1718 during an expansion operation.

The mandrel 1750 is reciprocable along an axis 1730. The external tapered portion 1722 is sloped such that the outer surface of the external tapered portion 1722 increases in radial distance from the axis 1730 along a rearward direction (i.e. in a direction along the axis 1730 and away from the distal end 1719). Each of the jaws 1718 further includes a transition portion 1725 adjacent the external tapered portion 1722 and a sizing portion 1726 adjacent the transition portion. The sizing portion 1726 is not sloped. That is, the outer surface of the sizing portion 1726 extends parallel to the axis 1730. As such, the slope of the outer surface of the jaws 1718 in the transition portion 1725 decreases in the rearward direction from the external tapered portion 1722 to the sizing portion 1726 to provide a generally smooth or radiused transition between the tapered portion 1722 and the sizing portion 1726. The smooth transition portion 1725 reduces localized pressure points on the interior of the PEX tubing during an expansion operation, which advantageously improves sealing around an inserted PEX fitting.

The illustrated head 1700 further includes a first or front biasing member 1761 and a second or rear biasing member 1763 spaced from the front biasing member 1761 along the axis 1730. The biasing members 1761, 1763 may be formed as rings of resilient material, such as rubber, and surround the plurality of jaws 1718. The biasing members 1761, 1763 are configured to bias the jaws 1718 toward a closed position and to return the jaws 1718 to the closed position upon retraction of the mandrel 1750.

In the illustrated embodiment, the front biasing member 1761 is positioned such that a radius R3 of the jaws 1718 at the location of the front biasing member 1761 is less than the unexpanded inner radius of a segment of PEX tubing to be expanded. As such, the front biasing member 1761 does not catch on the PEX tubing and interfere with insertion of the jaws 1718 into the PEX tubing. The rear biasing member 1763 is positioned rearward of the transition portion 1725. That is, the rear biasing member 1763 is positioned on the sizing portion 1726. The rear biasing member 1763 is position an axial distance D1 from a front surface of the collar 1717.

The head 1700 is configured to expand PEX tubing to receive a fitting 1780 of a predetermined size, which may be a standard size specified under ASTM F1960. A schematic illustration of the fitting 1780 is overlaid on the jaw 1718 illustrated in FIG. 28. The fitting 1780 includes a front barb 1781, a rear barb 1783, and a rear shoulder 1785. The barbs 1781, 1783 are received inside the PEX tubing when the fitting 1780 is inserted into the tubing after an expansion operation. The front surface of the rear shoulder 1785 is configured to abut the end of the PEX tubing when the fitting 1780 is fully inserted.

In the illustrated embodiment, the distance D1 is less than an axial distance D2 defined between the front surface of the rear shoulder 1785 and the rear barb 1783. As such, the rear biasing member 1763 of the head 1710 does not create indentations in the PEX tubing during an expansion operation that would interfere with sealing against the barbs 1781, 1783. The head 1710 therefore advantageously provides improved sealing performance.

Figure 29:
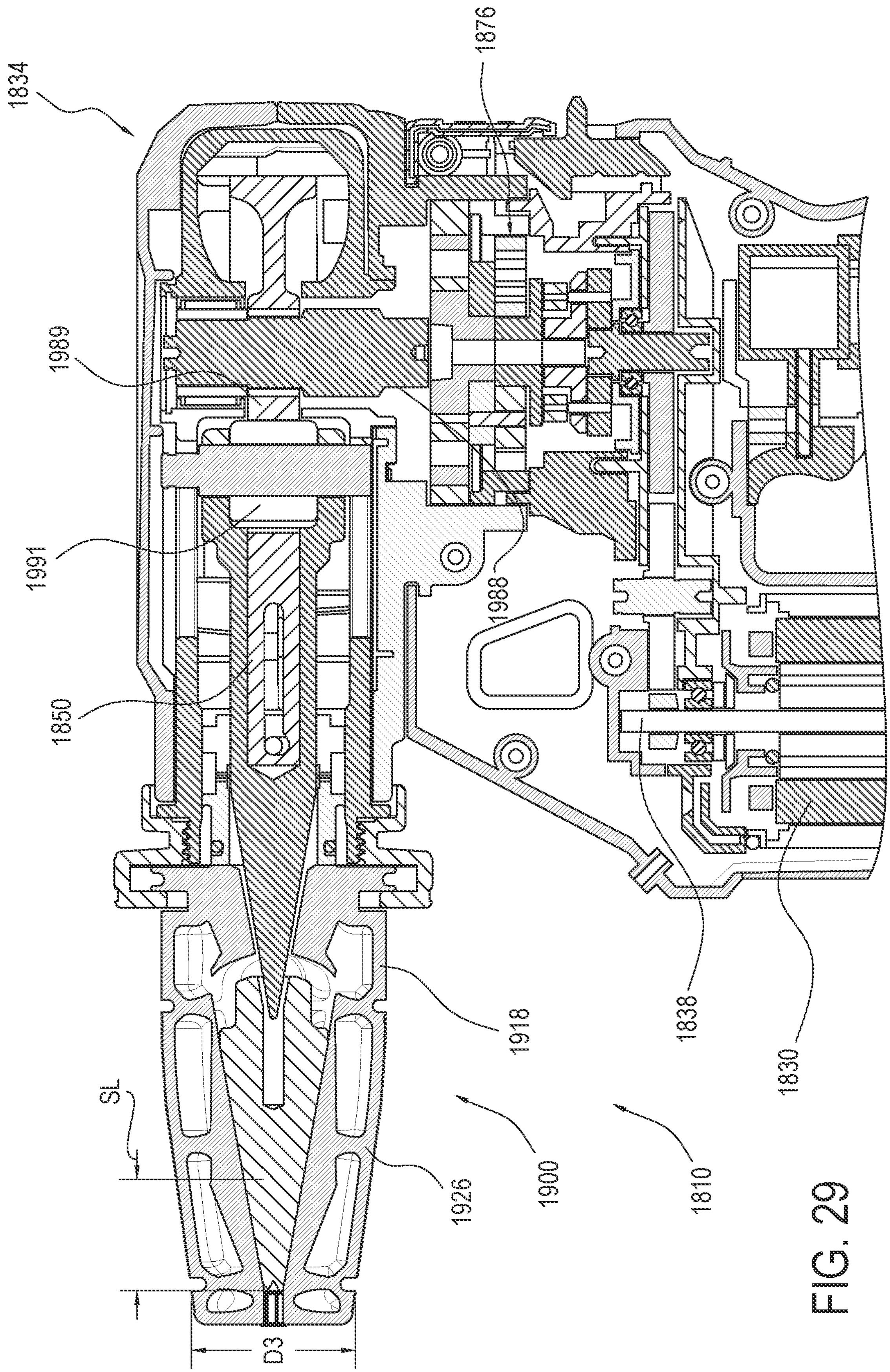
FIG. 29 is a cross-sectional view of an expansion tool according to another embodiment of the present disclosure.

FIG. 29 illustrates an expansion tool 1810 according to another embodiment. The expansion tool 1810 is similar in some aspects to the expansion tools 10, 510, 910, 1610 described above. In addition, features, elements, and control systems and methods described above with reference to the expansion tools 10, 510, 910, 1610 may be incorporated into the expansion tool 1810, and vice versa.

The expansion tool 1810 includes a motor 1830 (e.g., a brushless DC electric motor) with a motor shaft 1838 coupled to a drive mechanism 1834. A battery (not shown) is configured to provide electrical power to the motor 1830, and a controller (e.g., a microprocessor) and other electronics provide operational control for the expansion tool 1810. In the illustrated embodiments, the battery has nominal output voltage of about 12 volts. In other embodiments, the battery may have a nominal output voltage of about 18 volts. In other embodiments, the battery may have other nominal output voltages.

The drive mechanism 1834 converts the rotational input from the motor shaft 1838 into reciprocating movement of a mandrel 1850, and in the illustrated embodiment, the drive mechanism 1834 includes a multi-stage planetary transmission 1876. An output member 1988 of the transmission 1876 is coupled to a rotatable cam 1989. The cam 1989 is engageable with a follower 1991, which in turn is coupled to the mandrel 1850. Thus, rotation of the cam 1989 moves the follower 1991 to reciprocate the mandrel 1850. The mandrel 1850 is reciprocable between a retracted position, illustrated in FIG. 29, and an extended position. The axial distance that the mandrel 1850 travels from the retracted position to the extended position defines a stroke length SL of the expansion tool 1810.

With continued reference to FIG. 29, the expansion tool 1810 includes a head or working element 1900 with a plurality of jaws 1918. Each of the jaws 1918 includes a sizing portion 1926 that is insertable into an end of a tube to be expanded during an expansion operation. The jaws 1918 are movable between a closed position, illustrated in FIG. 29, and an expanded position in response to reciprocation of the mandrel 1850. That is, the mandrel 1850 is engageable with the jaws 1918 to move the jaws 1918 toward the expanded position as the mandrel 1850 moves toward the extended position. The sizing portions 1926 of the jaws 1918 collectively define a diameter or maximum cross-sectional dimension D3 when the jaws 118 are in the closed position. The dimension D3 is sized for proper expansion of PEX tubing of a particular nominal size when the jaws are inserted into an end of the PEX tubing.

The brushless DC motor 1830 and the drive mechanism 1834 of the expansion tool 1810 are capable of providing a high expansion force and larger radial expansion capacity compared to typical expansion tools, within a shorter stroke length SL of the mandrel 1850. For example, in some embodiments, the jaws 1918 are configured (e.g., the dimension D3 is sized) to expand PEX tubing with a nominal size between 1.25 inches or 32 millimeters and 1.5 inches or 40 millimeters. In such embodiments, the stroke length SL may be about 20 millimeters or less. For example, the stroke length SL may be about 10 millimeters to about 20 millimeters. In some embodiments, the stroke length SL may be about 15 millimeters. In other embodiments, the jaws 1918 are configured to expand PEX tubing with a nominal size of 2.0 inches or 50 millimeters. In such embodiments, the stroke length SL may be about 35 millimeters or less. For example, the stroke length SL may be about 20 millimeters to about 35 millimeters. In some embodiments, the stroke length SL may be about 25 millimeters.

In some embodiments, the stroke length SL may be between about 50% and about 70% of the diameter D3 of the PEX tube. Thus, the expansion tool 1810 is able to expand relatively large PEX tubing with a relatively short stroke length SL, which allows the expansion tool 1810 to have a more compact overall length in the reciprocating direction of the mandrel 1850 than typical expansion tools.

In some embodiments, the stroke length SL may be adjustable by an operator of the expansion tool 1810. For example, the controller may control the motor 1830 and drive mechanism 1834 to provide a particular stroke length SL. In other embodiments, one or more components of the expansion tool 1810 may be replaced by an operator with an interchangeable part to provide a particular stroke length SL. For example, in some embodiments, the mandrel 1850 may be interchangeable with one or more other mandrels to provide a particular stroke length SL suitable for expanding PEX tubing of a particular nominal size. In other embodiments, the cam 1989 may be interchangeable with one or more other cams to vary the stroke length SL.

FIGS. 30-39 illustrate drive mechanism 2000 for an expansion tool according to an embodiment of the present disclosure. In some embodiments, the drive mechanism 2000 may be incorporated into any of the expansion tools 10, 510, 910, 1610, 1810 described above.

Figure 30:
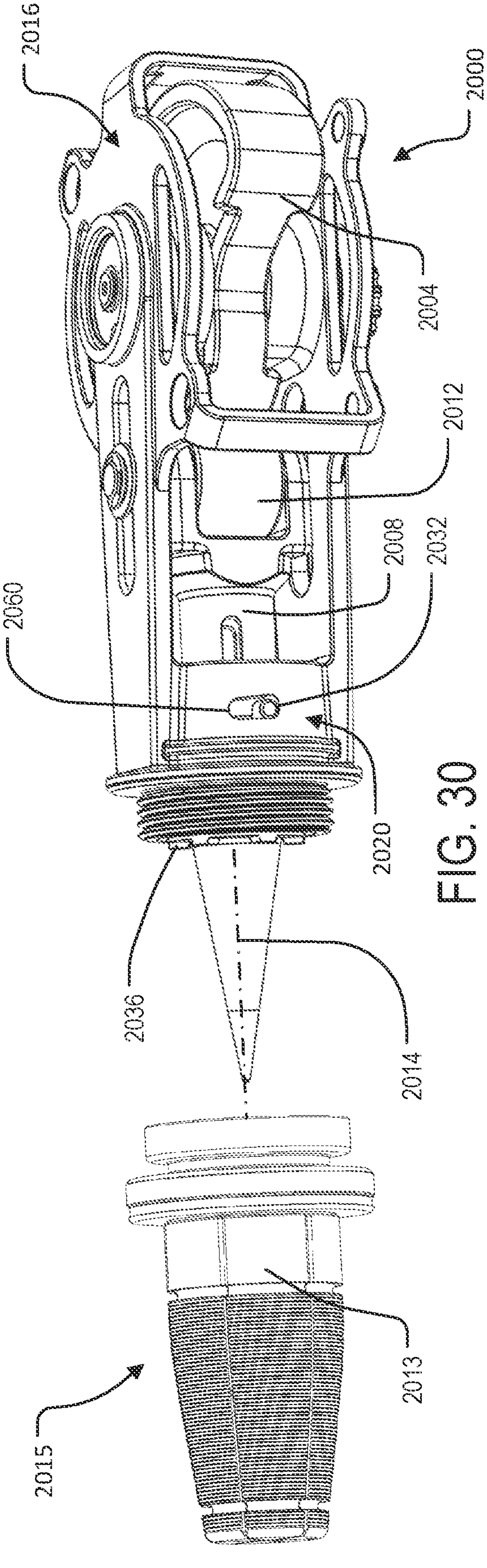
FIG. 30 is a perspective view of a drive mechanism including an automatic rotation assembly according to another embodiment of the present disclosure.
Figure 31:
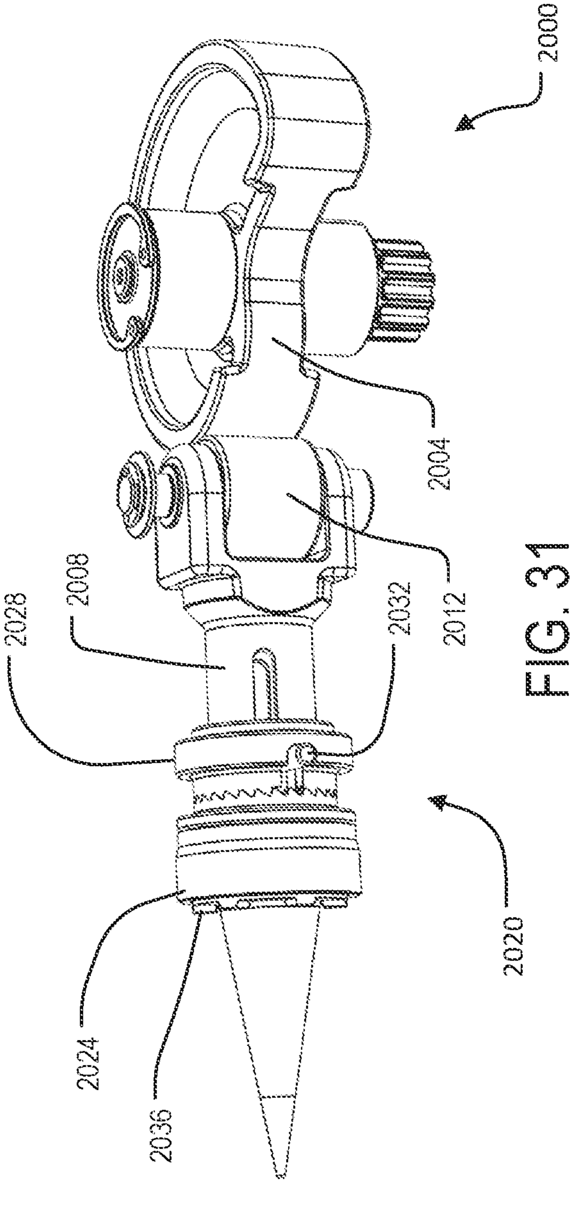
FIG. 31 is a perspective view of the drive mechanism of FIG. 30 with a frame hidden.

Referring to FIGS. 30-31, the drive mechanism 2000 includes a rotatable cam 2004 and a mandrel 2008 having a follower 2012 engageable with the cam 2004 to impart reciprocating motion to the mandrel 2008 along a mandrel axis 2014 in response to rotation of the cam 2004. The mandrel 2008 is engageable with a plurality of jaws 2013 of a working element 2015, such as the working element 100 described above with reference to FIGS. 5-6, to move the jaws 2013 from a closed position to an expanded position. The illustrated drive mechanism 2000 is supported by a frame 2016, such as the frame 627 described above with reference to FIGS. 13-14.

Figure 32:
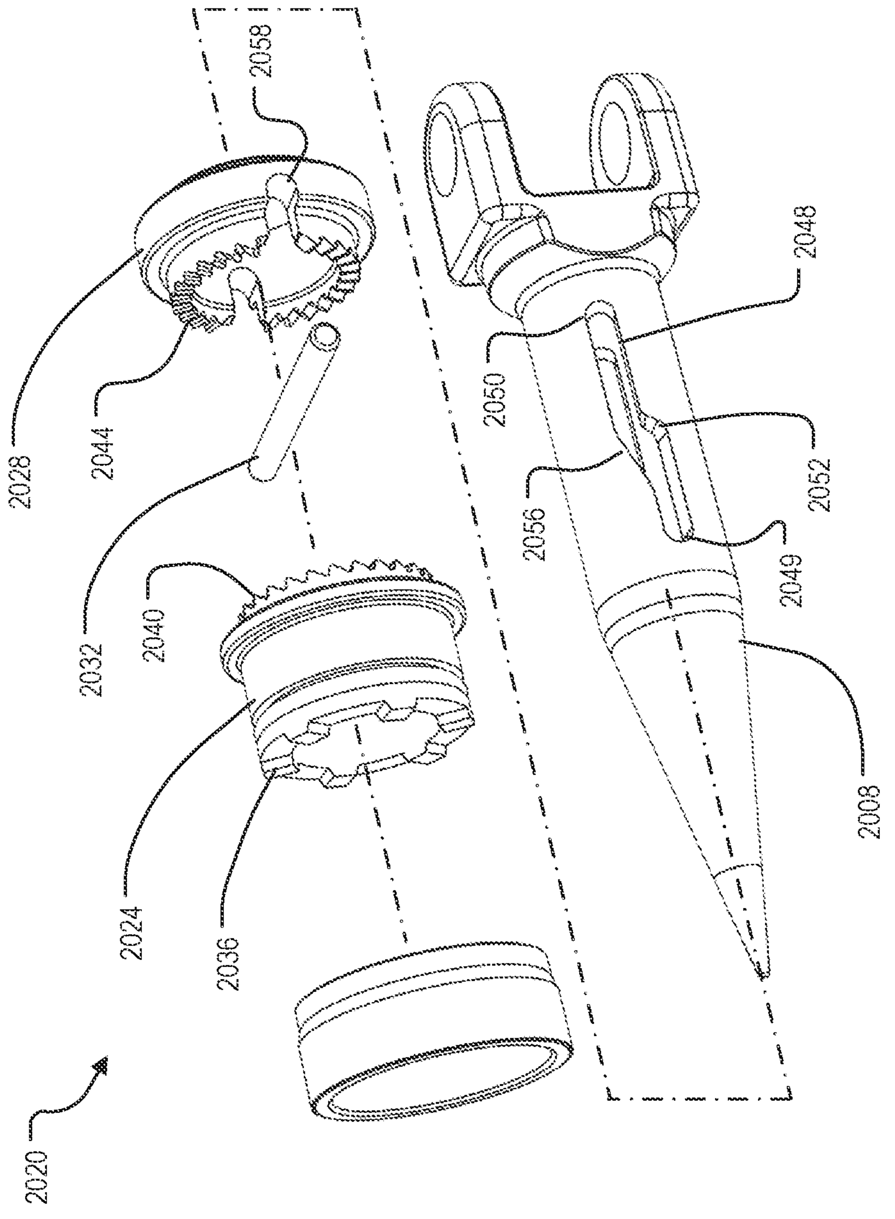
FIG. 32 is an exploded view illustrating the automatic rotation assembly of FIG. 30.

The drive mechanism 2000 further includes a rotation assembly 2020 configured to incrementally rotate the jaws 2013 in response to each movement of the mandrel 2008 toward the retracted position. The illustrated rotation assembly 2020 includes a rotation collar 2024, a shuttle 2028, and a pin 2032 (FIG. 32). The front end of the rotation collar 2024 includes a plurality of axial projections 2036 that engage the jaws 2013 to couple the jaws 2013 and the rotation collar 2024 together for co-rotation. The rear end of the rotation collar 2024 includes a first set of teeth 2040 that are engageable with a second set of teeth 2044 formed on the shuttle 2028.

With continued reference to FIG. 32, the mandrel 2008 includes a cam slot 2048 that receives the pin 2032. The cam slot 2048 has a first or front end 2049, a second or rear end 2050 opposite the first end 2049, and a first and second ramps 2052, 2056 between the ends 2049, 2050. The first ramp 2052 generally faces the front end of the mandrel 2008, and the second ramp 2056 generally faces the rear end of the mandrel 2008. In the illustrated embodiment, the first ramp 2052 is oriented at a steeper angle than the second ramp 2056.

The pin 2032 also extends through notches 2058 in the shuttle 2028 such that shuttle 2028 is coupled for co-rotation with the pin 2032. The ends of the pin 2032 are received in guide slots 2060 formed in the frame 2016 (FIG. 30).

Figure 33:
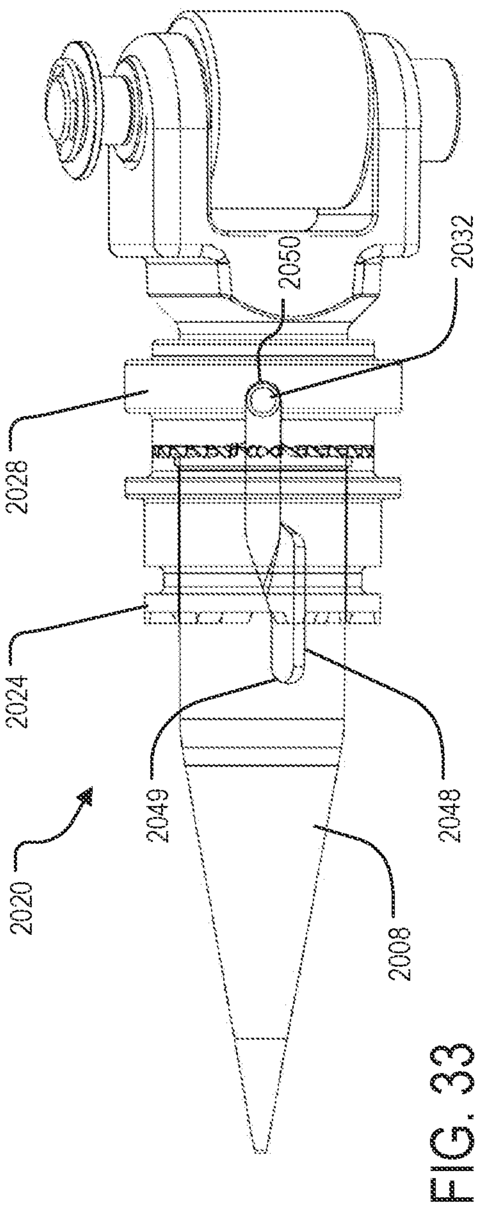
FIG. 33 is a side view illustrating a mandrel of the drive mechanism in an extended position.
Figure 34:
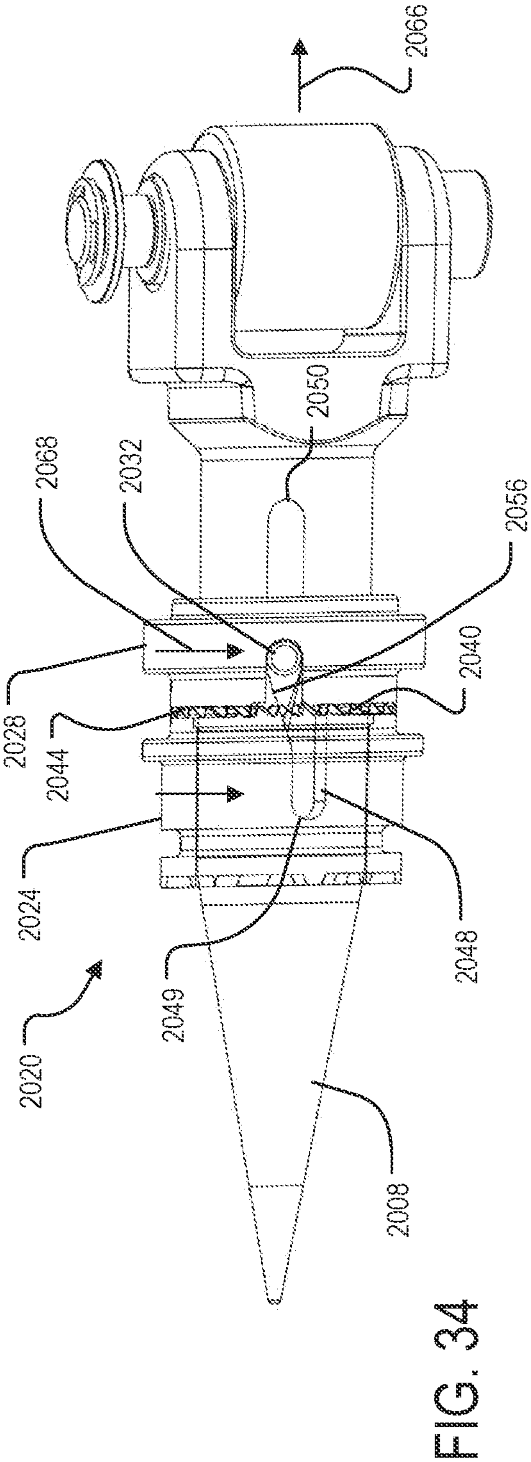
FIG. 34 is a side view illustrating movement of the mandrel of FIG. 33 toward a retracted position.

Operation of the rotation assembly 2020 will be described with reference to FIGS. 33-39. When the mandrel 2008 is in the extended position, as illustrated in FIG. 33, the pin 2032 is positioned at the second end 2050 of the cam slot 2048. As the mandrel 2008 begins to retract in the direction of arrow 2066 in FIG. 34, the pin 2032 moves along the cam slot 2048 toward the first end 2048. When the pin 2032 reaches the second ramp 2056, the second ramp 2056 bears against the pin 2032, causing the pin 2032 to pivot in a first direction (i.e. the direction of arrow 2068). The pivoting movement of the pin 2032 rotates the shuttle 2028 in the direction of arrow 2068, which also rotates the rotation collar 2024 in the direction of arrow 2068 due to the engagement between teeth 2040, 2044. The rotation collar 2024, in turn, rotates the jaws 2013.

As the mandrel 2008 continues to retract, the pin 2032 reaches the end of the second ramp 2056, completing the rotation of the shuttle 2028, collar 2024, and jaws 2013. The jaws 2013 thus occupy a new, rotated position when the mandrel 2008 reaches the retracted position, illustrated in FIG. 35. In some embodiments, the second ramp 2056 may be configured to rotate the jaws 2013 between about 15 degrees and about 45 degrees, or between about 20 degrees and about 40 degrees in some embodiments.

Figure 35:
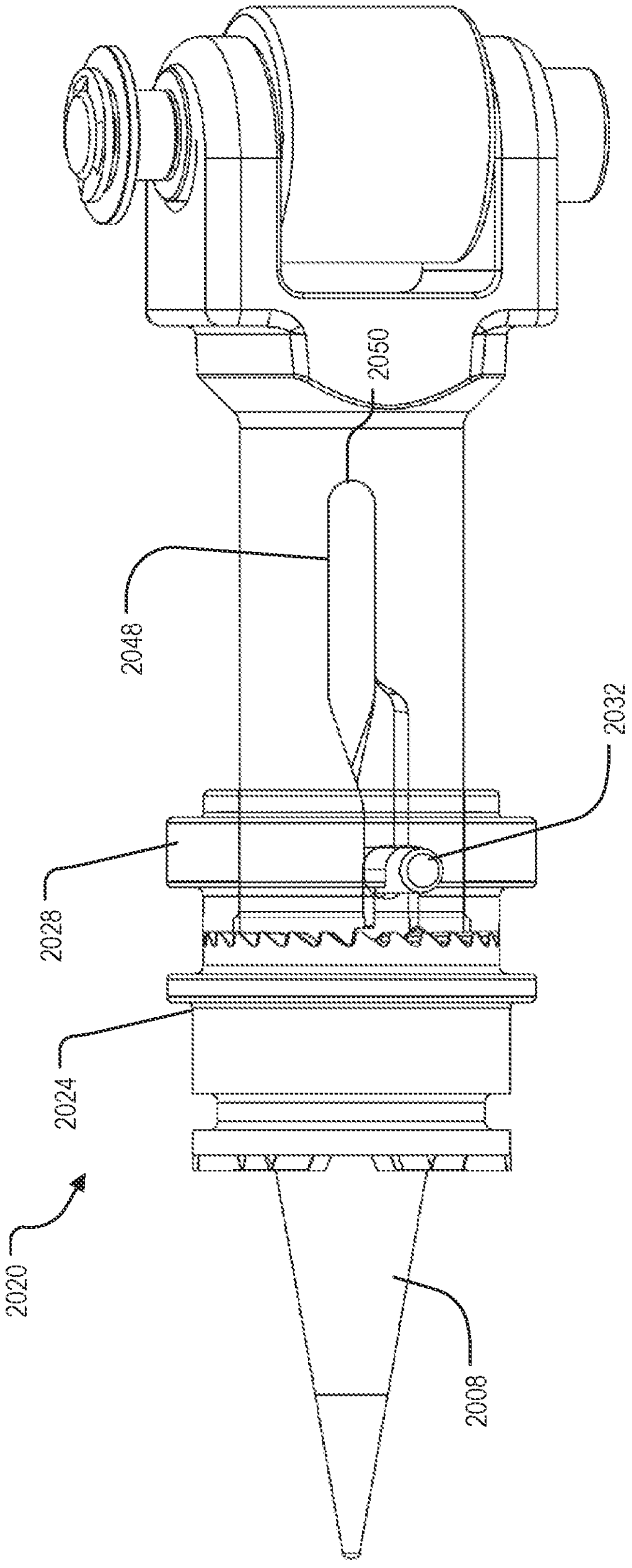
FIG. 35 is a side view illustrating the mandrel in the retracted position and a rotation collar of the automatic rotation assembly in a rotated position.
Figure 36:
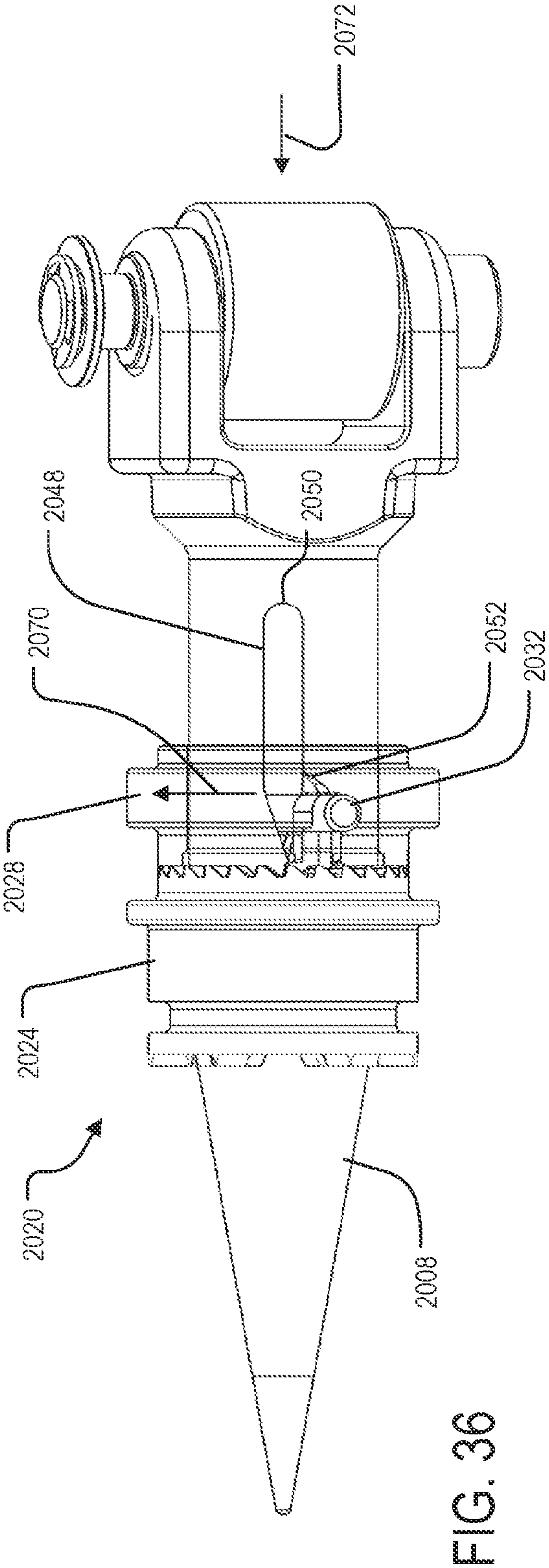
FIG. 36 is a side view illustrating movement of the mandrel toward the extended position.
Figure 37:
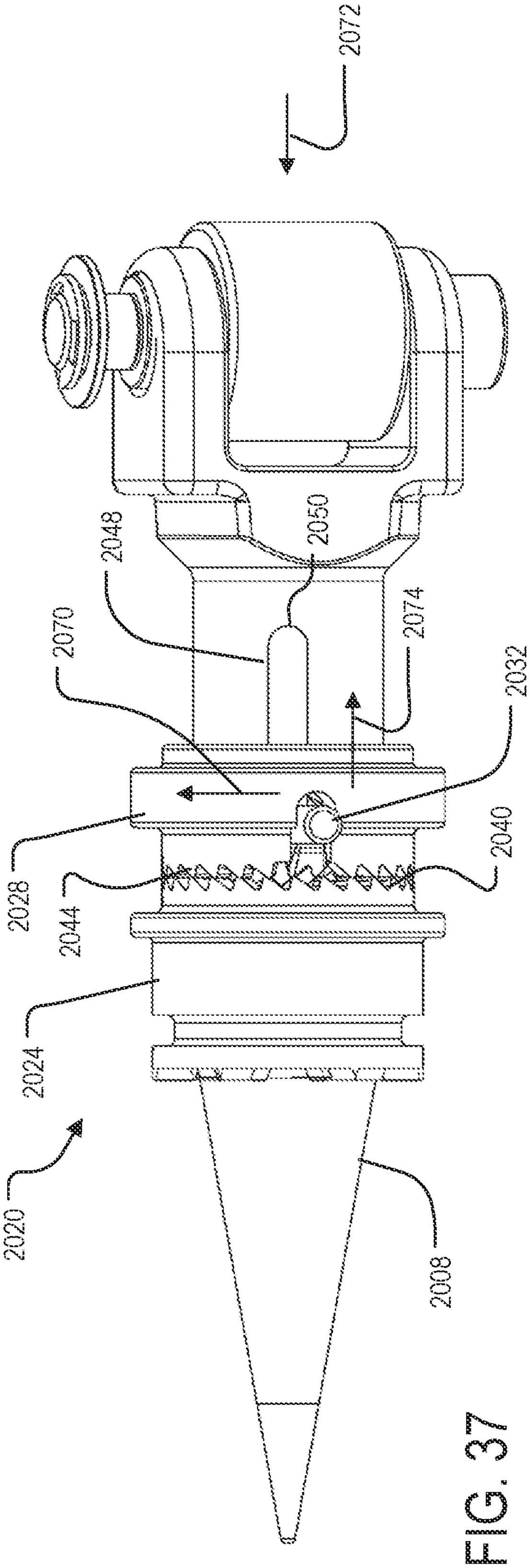
FIG. 37 is a side view illustrating further movement of the mandrel toward the extended position, with a shuttle of the automatic rotation assembly being rotated relative to the rotation collar.

The mandrel 2008 may then begin its next cycle, moving from the retracted position illustrated in FIG. 35 toward the extended position. In particular, the mandrel 2008 begins moving toward the extended position in the direction of arrow 2072 (FIG. 36). The pin 2032 moves along the cam slot 2048 toward the second end 2050. When the pin 2032 reaches the first ramp 2052, the first ramp 2052 bears against the pin 2032, causing the pin 2032 to pivot in a second direction (i.e. the direction of arrow 2070). The pivoting movement of the pin 2032 rotates the shuttle 2028 in the direction of arrow 2070. The teeth 2040, 2044 are configured to slip when the shuttle 2028 rotates in the direction of arrow 2070. The teeth 2044 slide along the teeth 2040 and force the shuttle 2028 backward in the direction of arrow 2074, as shown in FIG. 37. As such, the rotation collar 2024 (and the jaws 2013) remain stationary. The shuttle 2028 and the rotation collar 2024 thus act as a one-way clutch.

Figure 38:
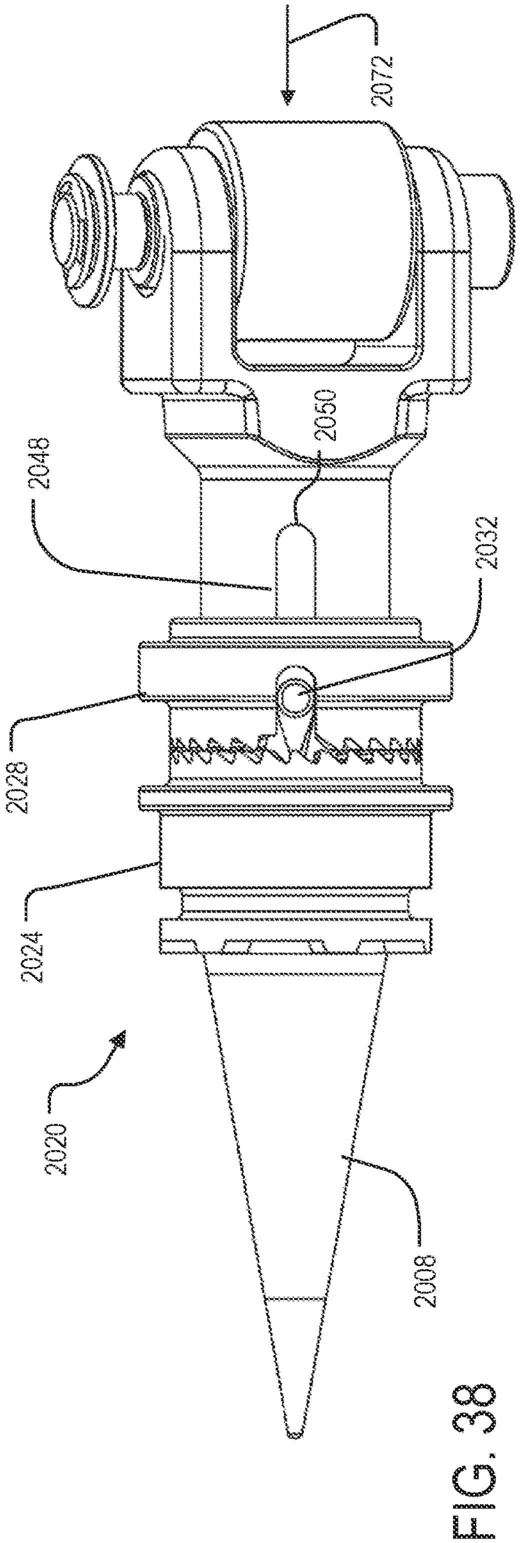
FIG. 38 is a side view illustrating further movement of the mandrel toward the extended position, with the shuttle in a rotated position.
Figure 39:
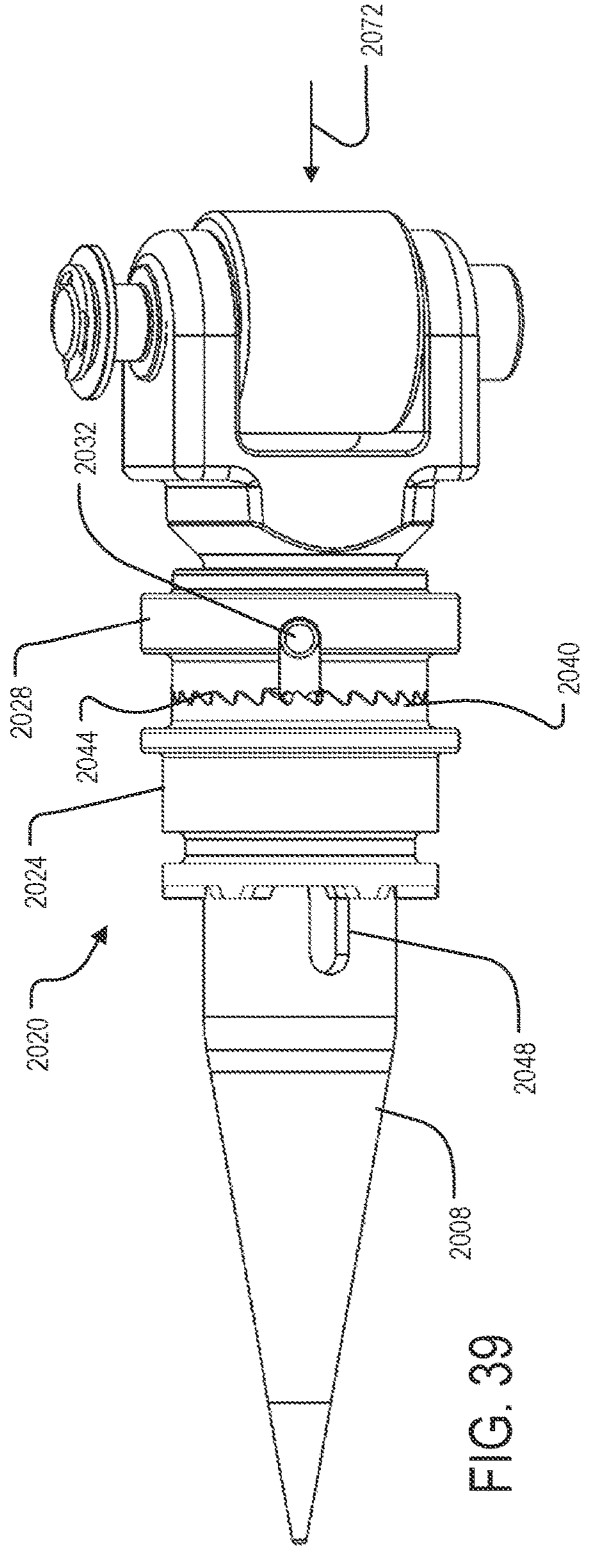
FIG. 39 is a side view illustrating the mandrel in the extended position.

As the mandrel 2008 continues to extend, the pin 2032 reaches the end of the first ramp 2052, which completes the rotation of the shuttle 2028 relative to the rotation collar 2024. (FIG. 38). The mandrel 2008 extends further, and friction between the shuttle 2028 and the mandrel 2008 moves the shuttle 2028 forward with the mandrel in the direction of arrow 2072, until the teeth 2044 of the shuttle 2028 reengage with the teeth 2040 of the rotation collar 2024. The automatic rotation cycle may then start again when the mandrel 2008 begins to retract.

In the illustrated embodiment, the second ramp 2056 is formed with a shallower angle than the first ramp 2052. This advantageously provides the rotation assembly 2020 with a larger mechanical advantage when rotating the jaws 2013 during the retraction stroke of the mandrel 2008. Rotation of the jaws 2013 may thus occur more reliably, even when the jaws are subjected to compressive forces from the tubing being expanded. On the other hand, the first ramp 2052 is formed with a steeper slope. This advantageously provides for a faster reset of the shuttle 2028 relative to the rotation collar 2024.

Various features and aspects of the invention are set forth in the following claims.

What is claimed is:

1. An expansion tool comprising:

a housing;

a motor supported by the housing and including a motor shaft;

a mandrel;

a transmission having an input member configured to receive a rotational input from the motor shaft and an output member rotatable in response to rotation of the input member; and a drive mechanism configured to convert rotation of the output member into translational movement of the mandrel, wherein the transmission is configured to provide a first gear ratio from the input member to the output member in response to rotation of the motor shaft in a first direction, and wherein the transmission is configured to provide a second gear ratio from the input member to the output member in response to rotation of the motor shaft in a second direction opposite the first direction, the second gear ratio being different than the first gear ratio.

2. The expansion tool of claim 1, wherein the expansion tool includes a first operating mode and a second operating mode, wherein the drive mechanism is configured to reciprocate the mandrel between a retracted position and a first extended position when the expansion tool is operated in the first operating mode, and wherein the drive mechanism is configured to reciprocate the mandrel between the retracted position and a second extended position different than the first extended position when the expansion tool is operated in the second operating mode.

3. The expansion tool of claim 2, wherein an axial distance from the retracted position to the first extended position is less than an axial distance from the retracted position to the second extended position.

4. The expansion tool of claim 2, further comprising a controller configured to switch between the first operating mode and the second operating mode in response to ambient temperature.

5. The expansion tool of claim 4, further comprising a temperature sensor configured to measure the ambient temperature, wherein the temperature sensor is in communication with the controller.

6. The expansion tool of claim 5, wherein the controller is configured to operate the expansion tool in the first operating mode when the measured ambient temperature is less than a threshold temperature, and wherein the controller is configured to operate the expansion tool in the second operating mode when the measured ambient temperature is greater than or equal to the threshold temperature.

7. The expansion tool of claim 6, wherein an axial distance from the retracted position to the first extended position is less than an axial distance from the retracted position to the second extended position.

8. The expansion tool of claim 6, wherein the threshold temperature is about 40 degrees Fahrenheit.

9. The expansion tool of claim 8, wherein the first operating mode is a cold operating mode and the second operating mode is a normal operating mode.

10. The expansion tool of claim 2, wherein the drive mechanism includes a power screw.

11. The expansion tool of claim 2, wherein the drive mechanism includes a multi-stage planetary transmission.

12. The expansion tool of claim 1, wherein the mandrel is movable between an extended position and a retracted position, wherein rotation of the motor shaft in the first direction moves the mandrel toward the extended position, and wherein rotation of the motor shaft in the second direction moves the mandrel toward the retracted position.

13. The expansion tool of claim 12, wherein the second gear ratio provides a lesser speed reduction from the input member to the output member than the first gear ratio.

14. The expansion tool of claim 1, wherein the transmission is a multi-stage planetary transmission.

15. The expansion tool of claim 14, wherein the transmission includes a first ring gear and a second ring gear, and wherein the second ring gear is supported by a one-way bearing.

16. The expansion tool of claim 14, wherein the transmission includes a first plurality of planet gears coupled to a first carrier and a second plurality of planet gears coupled to a second carrier, and wherein each of the second plurality of planet gears is supported by a one-way bearing.

17. The expansion tool of claim 1, wherein the first gear ratio is about 4.5:1.

18. The expansion tool of claim 17, wherein the second gear ratio is about 1:1.

19. The expansion tool of claim 1, wherein the first direction is a forward direction and the second direction is a reverse direction.

20. An expansion tool comprising:

a housing;

a motor supported by the housing and including a motor shaft;

a mandrel;

a transmission having an input member configured to receive a rotational input from the motor shaft, an output member rotatable in response to rotation of the input member, and a ring gear supported by a one-way bearing; and a drive mechanism configured to convert rotation of the output member into translational movement of the mandrel, wherein the transmission is configured to provide a first gear ratio from the input member to the output member in response to rotation of the motor shaft in a first direction, and wherein the transmission is configured to provide a second gear ratio from the input member to the output member in response to rotation of the motor shaft in a second direction opposite the first direction, the second gear ratio being different than the first gear ratio.

21. An expansion tool comprising:

a housing;

a motor supported by the housing and including a motor shaft;

a mandrel;

a multi-stage planetary transmission including a first stage at least partially defining an input member, a second stage, and a third stage at least partially defining an output member; and a drive mechanism configured to convert rotation of the output member into translational movement of the mandrel, wherein the second stage and the third stage of the multi-stage planetary transmission are configured to provide a first gear ratio from the input member to the output member in response to rotation of the motor shaft in a first direction, and wherein the second stage and the third stage of the multi-stage planetary transmission are configured to provide a second gear ratio from the input member to the output member in response to rotation of the motor shaft in a second direction opposite the first direction, the second gear ratio being different than the first gear ratio.

* * * * *